US012165133B2

(12) United States Patent
Filter et al.

(10) Patent No.: US 12,165,133 B2
(45) Date of Patent: *Dec. 10, 2024

(54) SCAN TO PAY PAYMENT MODE OF A DIGITAL ASSET PAYMENT NETWORK

(71) Applicant: Flexa Inc., New York, NY (US)

(72) Inventors: Trevor Filter, New York, NY (US); Zachary Kilgore, Brooklyn, NY (US); Tyler Robert Spalding, New York, NY (US)

(73) Assignee: Flexa Inc., New York, NY (US)

( * ) Notice: Subject to any disclaimer, the term of this patent is extended or adjusted under 35 U.S.C. 154(b) by 107 days.

This patent is subject to a terminal disclaimer.

(21) Appl. No.: 17/446,141

(22) Filed: Aug. 26, 2021

(65) Prior Publication Data

US 2022/0245625 A1 Aug. 4, 2022

Related U.S. Application Data

(63) Continuation of application No. 17/248,588, filed on Jan. 29, 2021, now Pat. No. 12,073,385.

(51) Int. Cl.
*G06Q 20/38* (2012.01)
*G06K 7/10* (2006.01)
(Continued)

(52) U.S. Cl.
CPC ....... *G06Q 20/3674* (2013.01); *G06K 7/1095* (2013.01); *G06K 7/1413* (2013.01);
(Continued)

(58) Field of Classification Search
CPC ............ G06Q 20/3674; G06Q 20/204; G06Q 20/208; G06Q 20/3274; G06Q 20/3678;
(Continued)

(56) References Cited

U.S. PATENT DOCUMENTS 10,540,639 B2    1/2020   Brock
10,540,654 B1 *  1/2020   James ................. G06Q 20/223
(Continued)

*Primary Examiner* — Fahd A Obeid
*Assistant Examiner* — Reva R Moore
(74) *Attorney, Agent, or Firm* — Garlick & Markison; Patricia M. Healy

(57) ABSTRACT

A method includes initiating, by a merchant computing entity, a digital asset-based payment from a user computing device and sending merchant real-time payment information to a digital asset payment computing entity. The method further includes generating, by the digital asset payment computing entity, a scannable charge code and sending the scannable charge code to the merchant computing entity. The method further includes providing, by the merchant computing entity, the scannable charge code to the user computing device. When the scannable charge code is scanned by the user computing device, the method further includes sending, by the user computing device, user computing device real-time payment information to the digital asset payment computing entity, locking, by the digital asset payment computing entity, an amount of network digital assets, and providing, by the digital asset payment computing entity, a confirmation to the merchant computing entity.

20 Claims, 31 Drawing Sheets

(51) Int. Cl.
  *G06K 7/14*   (2006.01)
  *G06K 19/06*  (2006.01)
  *G06Q 20/20*  (2012.01)
  *G06Q 20/32*  (2012.01)
  *G06Q 20/36*  (2012.01)
  *G06Q 20/40*  (2012.01)
  *G06Q 20/06*  (2012.01)

(52) U.S. Cl.
  CPC ..... *G06K 7/1417* (2013.01); *G06K 19/06028* (2013.01); *G06K 19/06037* (2013.01); *G06Q 20/204* (2013.01); *G06Q 20/208* (2013.01); *G06Q 20/3274* (2013.01); *G06Q 20/3678* (2013.01); *G06Q 20/381* (2013.01); *G06Q 20/387* (2013.01); *G06Q 20/4014* (2013.01); *G06Q 20/405* (2013.01); *G06Q 20/0655* (2013.01); *G06Q 20/326* (2020.05); *G06Q 2220/00* (2013.01)

(58) Field of Classification Search
  CPC ............... G06Q 20/381; G06Q 20/387; G06Q 20/4014; G06Q 20/405; G06Q 20/0655; G06Q 20/326; G06Q 2220/00; G06Q 20/36; G06Q 20/065; G06K 7/1095; G06K 7/1413; G06K 7/1417; G06K 19/06028; G06K 19/06037
  See application file for complete search history.

(56) References Cited

U.S. PATENT DOCUMENTS

2017/0286951 A1* 10/2017 Ignatchenko ...... G06Q 20/3823
2018/0204195 A1*  7/2018 Kang ..................... G06Q 20/36
2022/0405752 A1* 12/2022 Davies ................ G06Q 20/065

* cited by examiner digital asset payment network 10

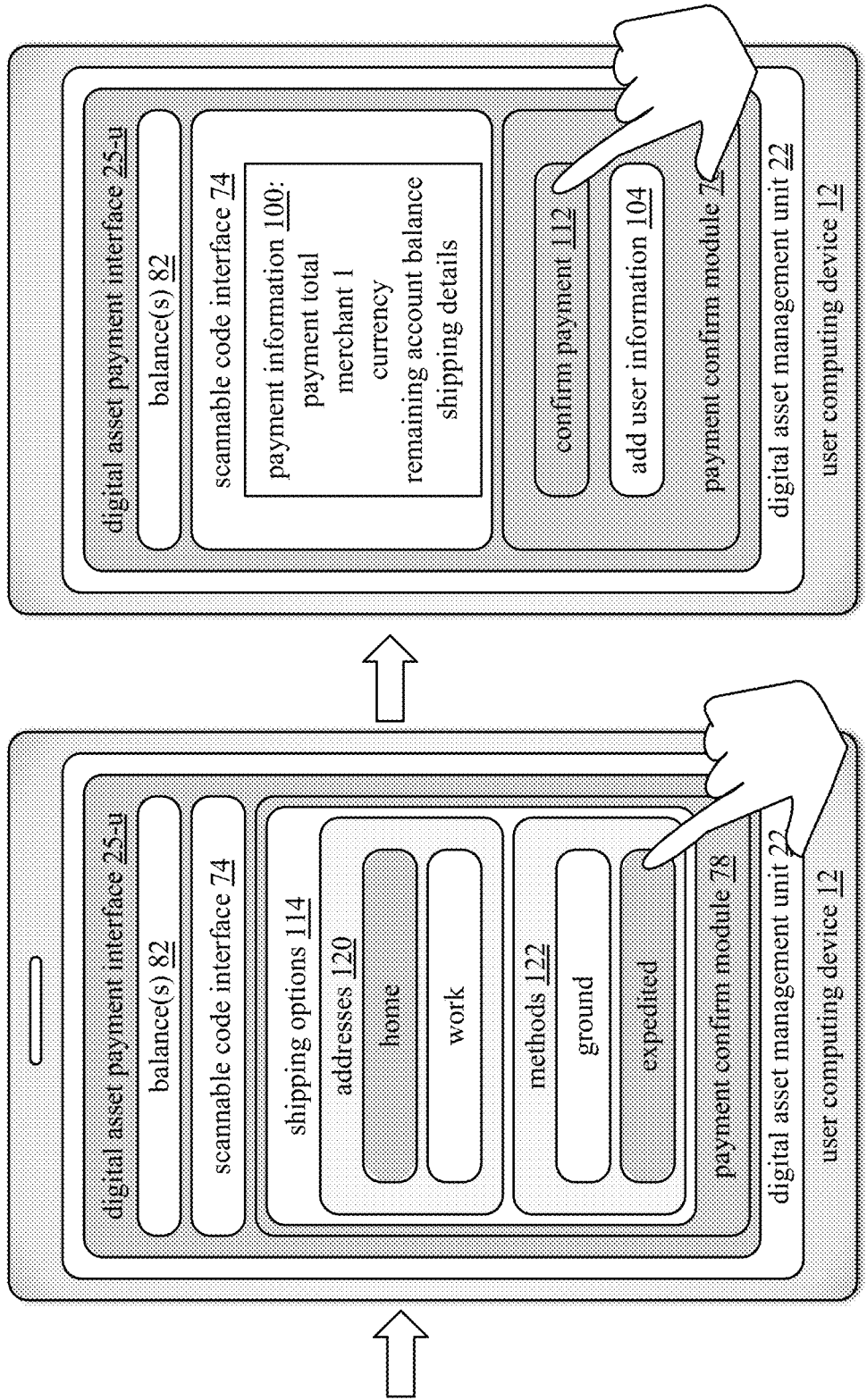

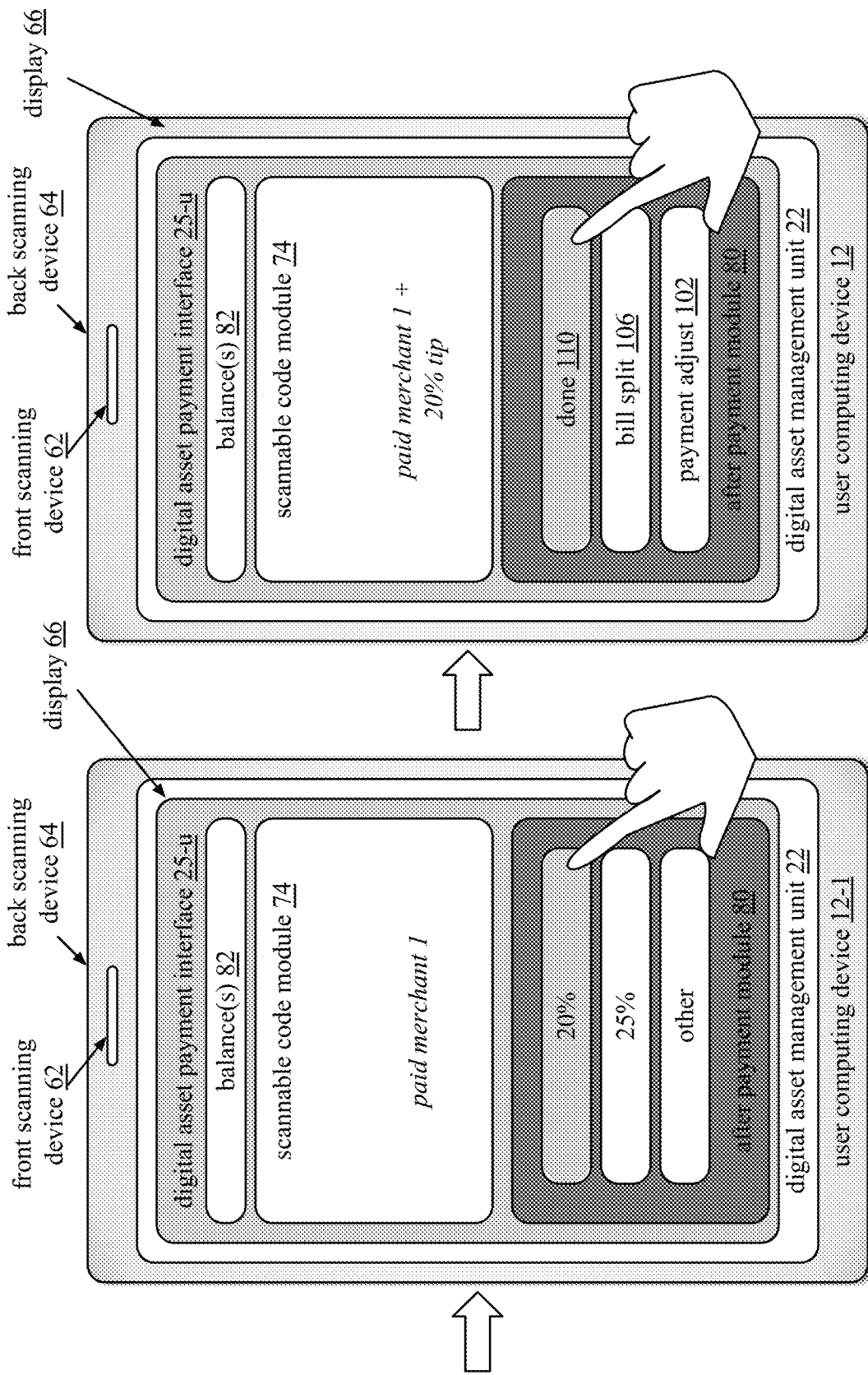

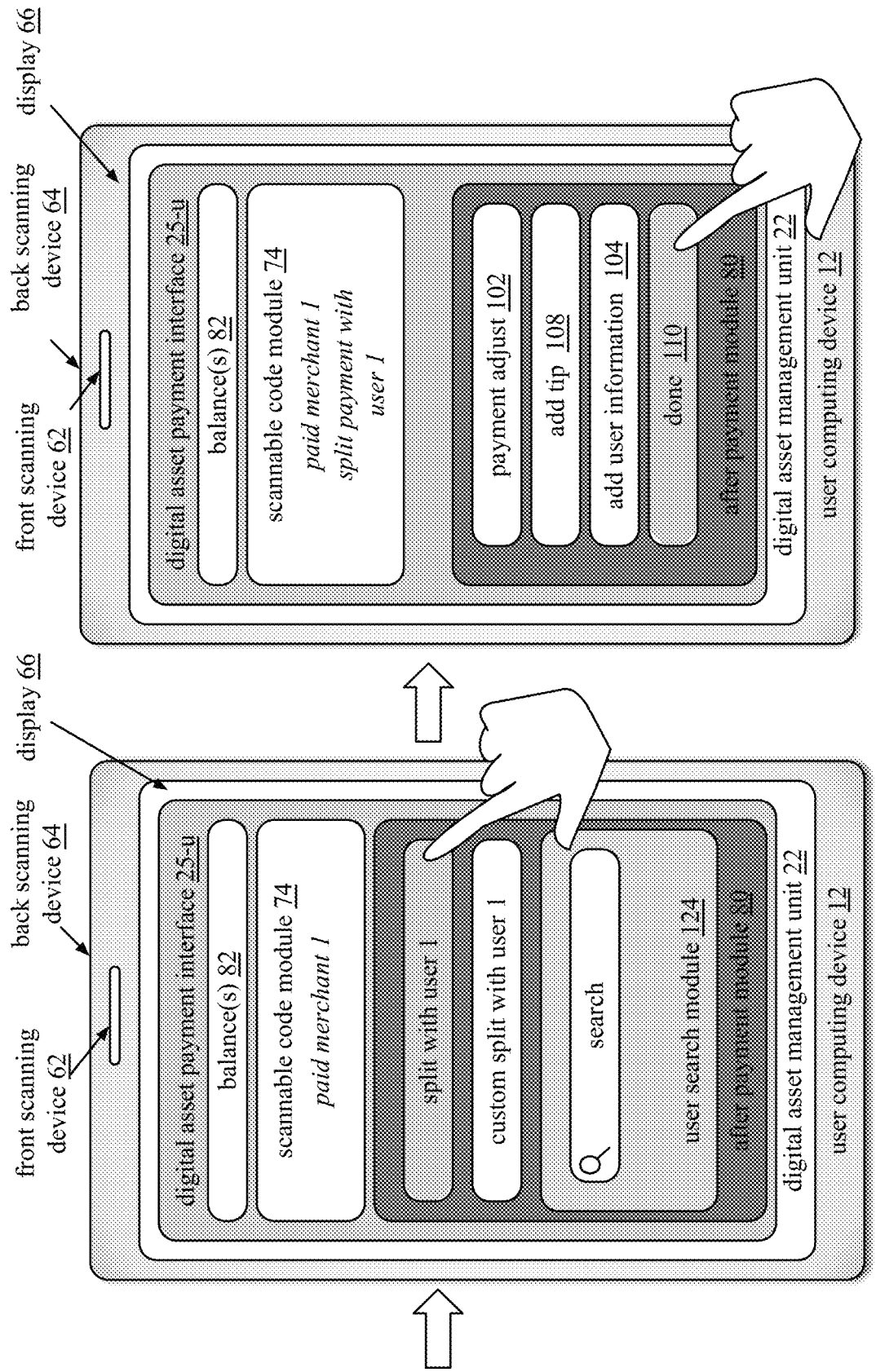

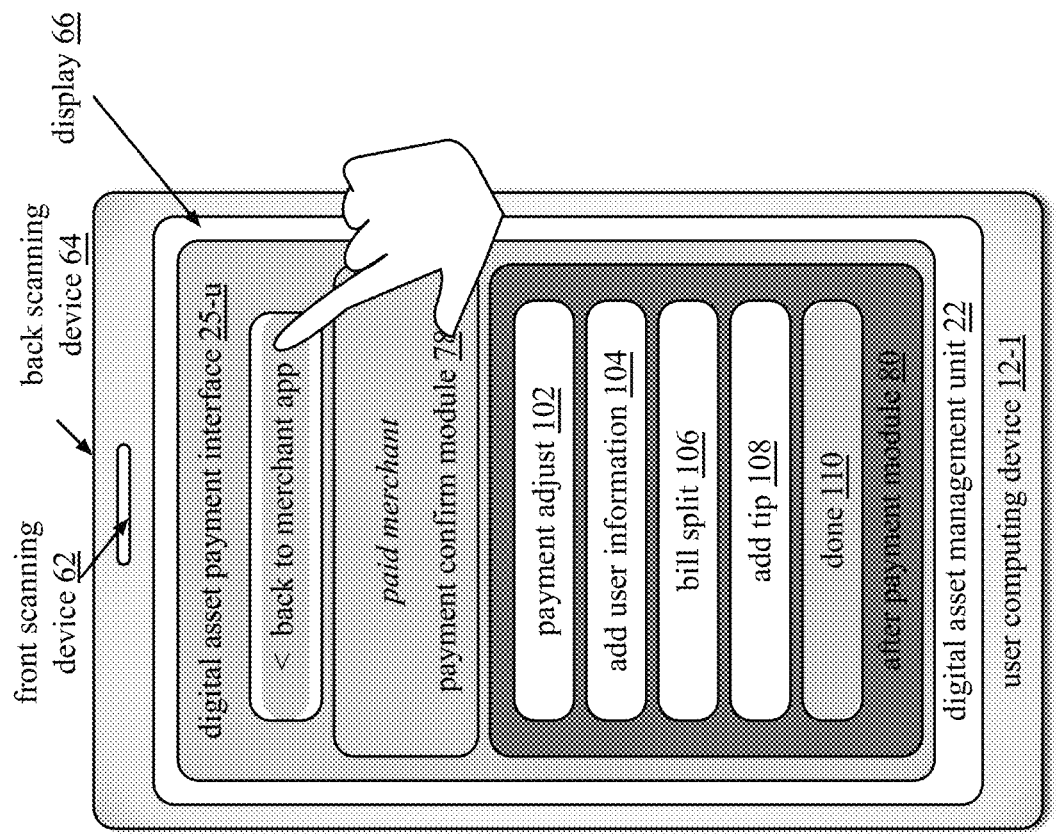
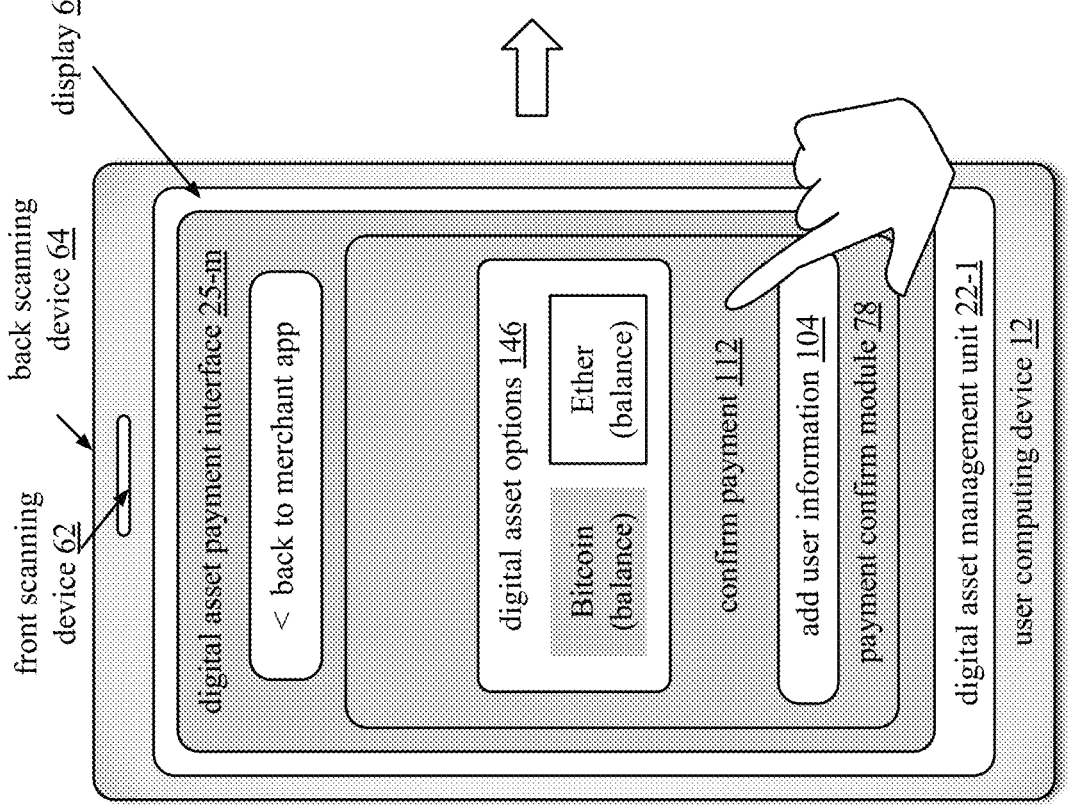
FIG. 23C
FIG. 23D

SCAN TO PAY PAYMENT MODE OF A DIGITAL ASSET PAYMENT NETWORK

CROSS-REFERENCE TO RELATED APPLICATIONS

The present U.S. Utility Patent Application claims priority pursuant to 35 U.S.C. § 120 as a continuation of U.S. Utility application Ser. No. 17/248,588, entitled "DIGITAL ASSET PAYMENT NETWORK PAYMENT MODES" filed Jan. 29, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This disclosure relates generally to electronic payments more specifically to payment modes of a universal digital payment network.

Description of Related Art

Current payment systems are vulnerable to security breaches, fraud, and identity theft. A typical payment card transaction with a merchant involves several steps (e.g., payment card authorization, clearing, and settlement) and the participation of various entities (e.g., financial institutions, payment card companies, and payment processing networks). Each step and each entity has its own varying security problems (e.g., hacking).

The steps involved are also inconvenient, time consuming, and expensive. For example, payment card authorization (e.g., credit or debit card authorization) begins with the cardholder presenting the payment card to a merchant for goods or service. The payment card is issued by a particular financial institution (e.g., a bank) and is associated with a payment card company (e.g., Visa, Mastercard, etc.). The merchant uses a payment card machine, software, or gateway to transmit transaction data to their acquiring bank (or its processor). The acquiring bank routes the transaction data to a payment processing network and the payment processing network sends the transaction data to the cardholder's issuing bank. The issuing bank validates that the card has not been reported stolen or lost, confirms whether funds are available, and sends a response code back through the payment processing network to the acquiring bank as to whether the transaction is approved.

The transaction data typically includes the payment card number, transaction amount, date, merchant's name, merchant's location, merchant category code, and an encrypted personal identification number (PIN) if entered. The response code reaches the merchant's terminal and is stored in a file until it is settled. The merchant sends the stored, approved transactions to its acquiring back (e.g., at the end of the day) and the acquiring bank reconciles and transmits approved transactions through the appropriate card-processing network. The acquiring bank deposits funds from sales into the merchant's account. The payment processing network debits the issuing bank account and credits the acquiring bank account for the amount of the transaction.

Merchants pay substantial payment card processing fees and those costs are passed along to consumers. Most merchants pay an interchange rate on a total transaction and a flat fee to the payment card company involved (e.g., Visa, Mastercard, etc.). Rates vary based on the payment card company, the payment card type (e.g., credit, debit, business, etc.), processing type (e.g., online payment, swiped, through a mobile device, card not present, etc.), and a Merchant Category Code (MCC) that classifies a merchant's type of business. Further, merchants typically pay a commission and a flat fee to the payment processing network.

Mobile wallet applications allow cardholders to store payment card data on a computing device via a digital wallet for convenient transactions. For example, some mobile wallet apps use near field communication (NFC) for contactless payments (e.g., exchange of data by holding device over a payment reader). NFC chips are specifically designed to manage financial security and only store data needed to initiate and complete a transaction. Mobile wallets use types of tokenization to assign a device account number (DAN) in place of an account or card number so that the DAN is passed to the merchant rather than the actual account/card number. As another security measure, digital wallets rely on digital certificates to verify identity. However, using a digital wallet on a device means data passes through not only the device's hardware and operating system but then also a specific payment app, and then finally the source of payment. Further, user fraud via mobile wallets is possible.

Digital assets are digitally stored content that comes with a right to use. As a few examples, digital assets include images, audio, videos, documents (e.g., contracts, legal documents, etc.), cryptocurrency, cryptocurrency tokens, stocks, and intellectual property rights.

Distributed ledger technology (DLT) is a digital system that provides a consensus of replicated, shared, and synchronized digital data spread across several nodes. Unlike traditional databases, DLTs lack central authority. The nodes of a DLT implement a consensus protocol to validate the authenticity of transactions recorded in the ledger.

Distributed ledger technology reduces the risk of fraudulent activity. For example, a blockchain is a type of DLT consisting of a continuously growing list of blocks (i.e., groups of transactions) that are securely linked, continually reconciled, and shared among all network participants (i.e., a decentralized network). Transactions are validated and added to blocks via hashing algorithms, and then permanently written to the chain via consensus of the entire network. Once recorded on the blockchain, transactions cannot be altered.

A cryptocurrency is a digital asset that is securely created and transferred via cryptography. Many cryptocurrencies are distributed networks based on distributed ledger technology (e.g., a blockchain). Decentralized networks like Bitcoin use pseudo-anonymous transactions that are open and public (i.e., anyone can join, create, and view transactions). To minimize fraudulent activity and deter malicious network activity, cryptocurrency transactions can be recorded by "miners" using "proof of work" secure hashing algorithms (SHA-256) that require significant computing power. While many cryptocurrencies are blockchain based, other distributed ledger technologies may be used. For example, asynchronous consensus algorithms enable a network of nodes to communicate with each other and reach consensus in a decentralized manner. This method does not need miners to validate transactions and uses directed acyclic graphs for time-sequencing transactions without bundling them into blocks.

BRIEF DESCRIPTION OF THE SEVERAL VIEWS OF THE DRAWING(S)

FIGS. 15A-15D are schematic block diagrams of an embodiment of a scan to pay payment mode with shipping options in accordance with the present disclosure;

FIGS. 16A-16D are schematic block diagrams of an embodiment of a scan to pay payment mode with tip options in accordance with the present disclosure;

FIGS. 17A-17D are schematic block diagrams of an embodiment of a scan to pay payment mode with bill splitting options in accordance with the present disclosure;

FIGS. 23A-23E are schematic block diagrams of an embodiment of a deep link payment mode of a digital asset payment network in accordance with the present disclosure.

DETAILED DESCRIPTION OF THE INVENTION

Figure 1:
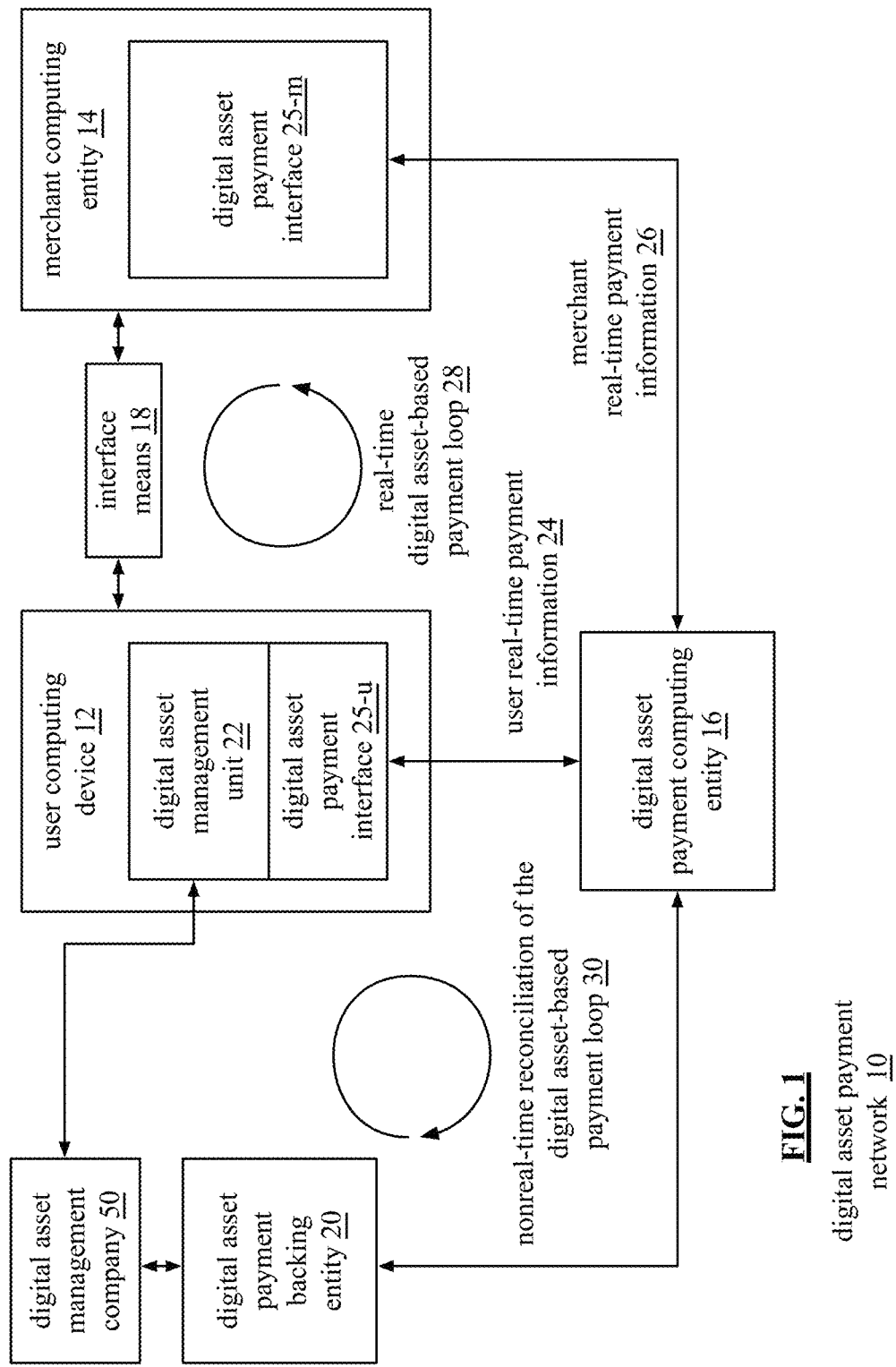
FIG. 1 is a schematic block diagram of an embodiment of a digital asset payment network in accordance with the present disclosure.

FIG. 1 is a schematic block diagram of an embodiment of a digital asset payment network 10 that includes a user computing device 12, a merchant computing entity 14, a digital asset payment computing entity 16, an interface means 18, and a digital asset payment backing entity 20. The digital asset payment network 10 facilitates a payment from the user computing device 12 paying with a digital asset (e.g., cryptocurrency) to a merchant computing entity 14 accepting a desired digital asset (e.g., fiat currency, a different cryptocurrency) and overcomes the following issues.

At the filing of this application, digital assets such as cryptocurrency are not widely accepted by merchants as a form of payment for a variety of reasons. For one, many merchants do not want to hold cryptocurrency. Holding cryptocurrency involves several issues merchants are unfamiliar with and/or unequipped to deal with. These issues include holding private key information, legal compliance, government regulation, timing issues such as waiting for transaction confirmations, etc. Accepting digital assets such as cryptocurrency presents operational security issues and includes a level of technical complexity outside the scope of general merchant capabilities. Additionally, the value of cryptocurrency can be volatile, sometimes fluctuating dramatically in the course of one day. As another reason, merchants are reluctant to invest in expensive point-of-sale upgrades to accommodate cryptocurrency payments directly. As yet another reason, many cryptocurrency payments are public and expose sensitive merchant/customer information.

While some digital wallet applications enable retail blockchain payments, they are universally dependent on existing payment networks and thus are susceptible to the fraud attacks of the existing payment networks. For example, a cryptocurrency is linked to a payment card (e.g., a credit card, debit card, gift card, etc.), where a cryptocurrency payment is converted and conducted as a payment card transaction and, thus susceptible to the same fraud attacks as the payment card. Further, a billing address and/or other personal customer information may be required for a merchant to verify traditional payment card payments. A merchant may store this information which consumes data storage space and renders additional private customer information vulnerable to theft and fraud. Additionally, the costs of the existing payment network (e.g., payment transaction costs, fees, etc.) are maintained. Adding a digital asset payment option within an existing payment network only increases those costs.

Even though digital asset payments such as cryptocurrency payments significantly reduce fraudulent activity as compared to traditional payment systems, fraudulent digital asset transactions are possible. For example, malicious users can manipulate a cryptocurrency blockchain to "double spend" (e.g., create one transaction within a block to transfer an amount to a merchant and create another block without that transaction such that the transfer to the merchant does not exist). As another example, malicious or faulty digital wallet software can prevent a digital asset transaction from being authorized and completed correctly.

Within the digital asset payment network 10, the merchant computing entity 14, the digital asset payment computing entity 16, and the digital asset payment backing entity 20 may be one or more computing devices, one or more distributed computing devices, and/or a module executing on one or more computing devices.

The user computing device 12, the merchant computing entity 14, the digital asset payment computing entity 16, and the digital asset payment backing entity 20 may be portable computing devices and/or fixed computing devices. A portable computing device may be a social networking device, a gaming device, a cell phone, a smart phone, a digital assistant, a digital music player, a digital video player, a laptop computer, a handheld computer, a tablet, a video game controller, a virtual reality (VR) computing device, a portable merchant point-of-sale (POS) device (e.g., a mobile device with POS capabilities) and/or any other portable device that includes a computing core. A fixed computing device may be a computer (PC), a computer server, a cable set-top box, a satellite receiver, a television set, a printer, a fax machine, home entertainment equipment, a video game console, a fixed merchant point-of-sale (POS) device (e.g., attended cash register, unattended register, etc.), and/or any type of home or office computing equipment.

The digital asset payment computing entity 16 is operable to convert (i.e., exchange) a digital asset (e.g., a cryptocurrency) to a desired digital asset (e.g., fiat currency, another cryptocurrency, etc.). The digital asset payment computing entity 16 may be or may be associated with an entity specially licensed for exchange when licensing is required. In an embodiment, the digital asset payment computing entity 16 may be or may be associated with one or more digital asset holding companies. A digital asset holding company stores sensitive materials and has insurance policies to protect against theft and fraud. A digital asset holding company may be specially licensed for holding digital assets.

The digital asset payment computing entity 16 may be associated with a stored value account (SVA) device where the SVA device is associated with the merchant computing entity 14 (e.g., the merchant computing entity has an SVA account with the SVA device) such that an SVA is generated for payment. In another embodiment, the digital asset payment computing entity 16 is operable to generate stored value accounts (SVAs). Generation of SVAs for transactions is described in co-pending patent application Ser. No. 16/376,911, entitled, "SECURE AND TRUSTED DATA COMMUNICATION SYSTEM," filed Apr. 5, 2019.

The digital asset payment backing entity 20 stores network digital assets (e.g., network cryptocurrency, network tokens, etc.) as collateral to back digital asset payments of the digital asset payment network 10. The network digital assets may be any digital asset that the digital asset payment network chooses to use. For example, the network digital asset is a token on the Ethereum blockchain specifically created for use in the digital asset payment network. As another example, the network digital asset is an already established and trusted cryptocurrency.

The digital asset payment backing entity 20 is associated with the user computing device 12, the merchant computing entity 14, and/or a type of digital asset. Most commonly, the digital asset payment backing entity 20 is associated with the user computing device 12. As an example, the digital asset payment backing entity 20 is associated with a digital asset management unit 22 of the user computing device 12.

The digital asset management unit 22 is a digital wallet application or a network enabled smart contract application installed on or otherwise usable by the user computing device 12 that functions to store and manage (e.g., buy, sell, trade, custody, etc.) digital assets. Digital assets are digitally stored content that comes with a right to use. As a few examples, digital assets include images, audio, videos, documents (e.g., contracts, legal documents, etc.), cryptocurrency, cryptocurrency tokens, stocks, and intellectual property rights.

The digital asset management unit 22 may be a custodial digital wallet application associated with a digital asset management company 50 that may be specially licensed and insured to hold digital assets (e.g., a digital asset holding and management company, a cryptocurrency holding company, a cryptocurrency holding and exchange company, etc.). Alternatively, the digital asset management unit 22 may be a non-custodial digital wallet application associated with a non-custodial digital asset management company 50 (e.g., a digital asset exchange company) where the digital asset management unit 22 stores digital assets and the user computing device 12 manages the private key to the digital asset management unit 22.

Alternatively, the digital asset management unit 22 may be a custodial or non-custodial digital wallet application associated with the digital asset payment computing entity 16 (e.g., where the digital asset payment computing entity 16 is a digital asset management company 50). Alternatively, the digital asset management unit 22 is a network enabled smart contract application. A network enabled smart contract application allows a user to upload digital assets to a network enabled smart contract using a private key (e.g., non-custodial) and eliminates double spending issues associated with non-custodial wallets.

The digital asset management company 50 is associated with the digital asset payment backing entity 20 via an account and is operable to deposit network digital asset into its account to back digital asset-based payments made by users of its associated digital asset management unit 22. The digital asset management company 50 is incentivized to back digital asset management unit 22 payments by receiving rewards from the digital asset payment backing entity 20 such as a percentage of network digital asset back on successful transactions. Further, the network digital asset provides payment utility such as lower foreign exchange rates.

Further, because the digital asset management company 50 is backing the digital asset management unit payments, the digital asset management company 50 is incentivized to produce a quality digital asset management unit that prevents user fraud and to remedy faulty software that affects transaction success.

The digital asset management unit 22 includes a digital asset payment interface 25-$u$ operable to interface with the digital asset payment computing entity 16. The digital asset payment interface 25-*u* is included in the digital asset management unit 22 when the digital asset management company 50 deposits the network digital asset on behalf of its users (e.g., the digital asset management unit 22 is digital asset payment network 10 compatible). The user computing device 12 is operable to establish an account with the digital asset payment computing entity 16 to use the digital asset payment interface 25-*u*. The user computing device 12 is operable to access features of the digital asset payment computing entity 16 via the digital asset payment interface 25-*u* (e.g., via a direct link or by signing in for temporary use).

For example, the digital asset payment interface 25-*u* is a digital asset payment computing entity application programming interface (API) integrated into existing or digital asset payment computing entity specific digital asset management unit 22 software and hardware that allows the user computing device 12 to connect to the digital asset payment computing entity for digital asset-based payments. The digital asset payment interface 25-*u* facilitates digital asset payment network 10 payments and will be discussed in greater detail with reference to FIGS. 6A-6B.

The merchant computing entity 14 is associated with a particular merchant and facilitates payments from a user computing device to the merchant. For example, the merchant computing entity 14 may be a fixed POS computing device, a merchant e-commerce website, a merchant mobile application ("app"), etc. The merchant computing entity 14 includes payment features tailored to the type of merchant computing entity 14 involved in the payment. For example, when the merchant computing entity 14 is a fixed POS computing device (e.g., a register), the merchant computing entity includes features for in-person payment interaction (e.g., a scanning device, a touchscreen, a receipt printer, etc.).

As another example, when the merchant computing entity 14 is an e-commerce website or merchant mobile application ("app") the merchant computing entity 14 may include a variety of existing payment processing features (e.g., existing hardware and/or software) for processing online payments within existing payment networks (e.g., an Secure Socket Layers (SSL) certificate, e-commerce shopping cart software, order and product management features, customer profile management capabilities, a payment gateway, an e-commerce merchant account with a processing bank to accept credit and debit card payments, etc.).

The merchant computing entity 14 includes a digital payment interface 25-*m* that interfaces with the digital asset payment computing entity 16. For example, the merchant computing entity 14 establishes an account with the digital asset payment computing entity 16 to use the digital asset payment interface 25-*m*. The merchant computing entity 14 can access features of the digital asset payment computing entity 16 via the digital asset payment interface 25-*m* to facilitate digital asset payment network 10 payments. For example, the digital asset payment interface 25-*m* is a digital asset payment computing entity application programming interface (API) integrated into existing or digital asset payment computing entity specific merchant computing entity software and hardware that allows the merchant computing entity to connect to the digital asset payment computing entity for digital asset-based payments. The digital asset payment interface 25-*m* will be discussed in greater detail with reference to FIGS. 7A-7C.

The user computing device 12 and the merchant computing entity 14 interact via the interface means 18. The interface means 18 is one or more of: a direct link and a network connection. The direct link includes one or more of: a scanning device (e.g., video, camera, infrared (IR), barcode scanner, etc.), radio frequency (RF), and/or near-field communication (NFC). The network connection includes one or more local area networks (LAN) and/or one or more wide area networks (WAN), which may be a public network and/or a private network. A LAN may be a wireless-LAN (e.g., Wi-Fi access point, Bluetooth, ZigBee, etc.) and/or a wired LAN (e.g., Firewire, Ethernet, etc.). A WAN may be a wired and/or wireless WAN. For example, a LAN is a personal home or business's wireless network and a WAN is the Internet, cellular telephone infrastructure, and/or satellite communication infrastructure.

As an example, the user computing device 12 is a smart phone, the merchant computing entity 14 is a fixed merchant POS device (e.g., a POS register) and the interface means 18 is the fixed merchant POS device's scanning device (e.g., camera, barcode scanner, etc.). As another example, the user computing device 12 is a smart phone, the merchant computing entity 14 is a fixed merchant POS device (e.g., a POS register) and the interface means 18 is the smart phone's scanning device (e.g., a front or back camera).

As another example, the user computing device 12 is a smart phone, the merchant computing entity 14 is an online POS connection device (e.g., an e-commerce website or e-commerce mobile app) and the interface means is a network connection. For example, a smart phone uses an internet browser application (via cellular or wireless internet connection) to access a merchant's e-commerce website. As another example, a smart phone uses a network connection to connect to an installed merchant e-commerce mobile app.

As yet another example, a combination of interface means 18 is possible. For example, a user computing device 12 is a smart phone and the merchant computing entity 14 is an online POS connection device (e.g., an e-commerce website). The e-commerce website is accessed via a network connection interface means 18 on another computing device associated with the user of the user computing device 12 (e.g., a laptop or desktop computer). The laptop or desktop computer displays information for use by the user computing device's scanning device (e.g., front or back camera).

In an example of operation, the user computing device 12 and the merchant computing entity 14 interact via the interface means 18 to initiate a payment. For example, the user computing device 12 displays a unique scannable code to the merchant computing entity 14 when the interface means 18 is the merchant computing entity 14 scanning device. As another example, the merchant computing entity 14 displays a unique scannable code for the user computing device 12 when the interface means 18 in the user computing device 12 scanning device. Scannable codes will be discussed in greater detail with reference to FIGS. 8-19D. As another example, the user computing device 12 connects to the merchant computing entity 14 via a network connection interface means 18 to initiate a payment (e.g., when the merchant computing entity 14 is an e-commerce web site).

During the payment initiation, the user computing device 12 sends user real-time payment information 24 to the digital asset payment computing entity 16 via the digital asset payment interface 25-*u* and the merchant computing entity 14 sends merchant real-time payment information 26 to the digital asset payment computing entity 16 via its digital asset payment interface 25-*m* (e.g., from requesting a scannable code, from scanning a scannable code, from an e-commerce website checkout option selection, etc.).

The user real-time payment information 24 includes a user identifier (ID) and a type of digital asset it wishes to use in a real-time payment to the merchant computing entity 14. The merchant real-time payment information 26 includes a merchant identifier (ID) and a type of desired digital asset (e.g., a fiat currency, a different cryptocurrency, etc.) it wishes to receive in the real-time payment from the user computing device 12. One or more of the user real-time payment information 24 and the merchant real-time payment information 26 includes the amount of the real-time payment. The user real-time payment information 24 and the merchant real-time payment information 26 may include further information and/or metadata such as loyalty information, personal information (address, name, etc.), shipping details, bill splitting information, a request for additional information, etc.

When the digital asset payment computing entity 16 receives the user and merchant real-time payment information, the digital asset payment computing entity 16 initiates 1) a real-time digital asset-based payment process (e.g., the real-time digital asset-based payment loop 28) and 2) a nonreal-time reconciliation process to reconcile the digital asset-based payment with the digital asset payment backing entity 20 (e.g., the nonreal-time reconciliation of the digital asset-based payment loop 30). The reconciliation of the digital asset-based payment with the digital asset payment backing entity 20 occurs within a time frame that is longer than the time frame of the real-time digital asset-based payment (also referred to herein as "real-time payment"). For example, the reconciliation of the digital asset-based payment with the digital asset payment backing entity 20 occurs over the course of minutes whereas the time frame of the real-time digital asset-based payment takes a few seconds.

Within the nonreal-time reconciliation of the digital asset-based payment loop 30, when the user and merchant real-time payment information is received, the digital asset payment computing entity 16 instructs the digital asset payment backing entity 20 to lock an amount of network digital asset associated with the real-time digital asset-based payment. When the digital asset payment computing entity 16 locks the network digital asset, a rate quote for the amount of digital asset used by the user computing device 12 may be locked. An exchange rate is a price at which one digital asset will be exchanged for another. A rate quote is an exchange rate at a given point in time as determined by a digital asset exchange (e.g., cryptocurrency exchange) based on the buying and selling activity of the digital assets within the exchange. Locking the rate quote is discussed in more detail with reference to FIG. 2A.

Within the real-time digital asset-based payment loop 28, when the digital asset payment computing entity 16 receives an amount of digital asset from the user computing device 12 to use in the real-time digital asset-based payment, a network acknowledgment (ACK) of the receipt of the amount of the digital asset is generated.

In an alternative embodiment, the ACK is generated after the network digital asset is locked and prior to receiving the amount of the digital asset from the user computing device 12. For example, locking the network digital asset implies authorization of the payment and the digital asset payment computing entity 16 allows a time period (e.g., up to five minutes) prior to pulling funds from the user computing device 12 (e.g., the user computing device has time to add tip, split the payment with another user, adjust type of digital asset used, etc.). The merchant computing entity is provided a confirmation of this ACK. For example, when the merchant computing entity is a POS computing device such as an attended register, this ACK may successfully end the in-person transaction such that the merchant and customer can part ways. However, the merchant computing entity receives the payment up to a few minutes later. This embodiment is discussed in more detail with reference to FIG. 2A.

In another example, the ACK is generated after the amount of digital asset is received as previously discussed but the user computing device 12 is provided a time period to provide the amount of the digital asset (e.g., the real-time payment takes up to 5 minutes for the merchant to confirm). For example, in a restaurant setting, a merchant POS computing device may provide a user computing device 12 a check to initiate a payment, however; the user computing device is given time to add tip, split the bill, etc., prior to the merchant receiving funds.

If the payment initiation is terminated (e.g., payment initiation fails and/or is cancelled by the user and/or the merchant computing entity) within a certain amount of time prior to the digital asset payment computing entity 16 continues with the following steps of the real-time digital asset-based payment loop 28 (e.g., paying the merchant computing entity), the ACK is not generated, and the real-time payment is terminated. Within the nonreal-time reconciliation of the digital asset-based payment loop 30, when the ACK is not generated, the digital asset payment computing entity 16 instructs the digital asset payment backing entity 20 to release the amount of locked network digital asset.

Sending the amount of digital asset to the digital asset payment computing entity 16 is a transaction added to the digital asset blockchain of the digital asset used by the user computing device 12 (e.g., this information is published). However, other details related to the payment (e.g., the identity of the merchant computing entity 14, transaction fees owed by the merchant computing entity 14, etc.) are managed privately by the digital asset payment computing entity 16 off-chain. Therefore, the digital asset payment network 10 keeps confidential merchant computing entity 14 related information (e.g., revenue, consumer spending behavior, etc.) and confidential user computing device 12 related information (e.g., consumer identity of purchases, amount spent at a particular merchant, payees/merchants frequented, etc.) private (i.e., not published on a blockchain for anyone to see).

Continuing with the real-time digital asset-based payment loop 28, when the ACK is generated and receipt of the amount of digital asset is received, the digital asset payment computing entity 16 exchanges the amount of the digital asset received from the user computing device 12 to an amount of the desired digital asset. Digital asset exchange is done quickly (e.g., 30 seconds to a few minutes) to account for exchange rate volatility. The exchange can also be performed in real time on a credit-based account to eliminate any pricing volatility. The digital asset payment computing entity 16 sends the amount of the desired digital asset to the merchant computing entity 14 to complete the real-time digital asset-based payment.

Continuing with the nonreal-time reconciliation of the digital asset-based payment loop 30, the digital asset payment computing entity 16 verifies the amount of the digital asset received from the user computing device 12. For example, the digital asset payment computing entity 16 connects to a consensus network that verifies the amount of the digital asset received from the user computing device 12. The consensus network implements a verification process that may take minutes to hours of time.

For example, in the Bitcoin blockchain, miners record new transactions into blocks that verify all previous transactions within the blockchain. At the filing of this application, it takes a miner ten minutes, on average, to write a block on the Bitcoin blockchain. The average block time depends on a total hash power of the Bitcoin network. Once a block is created and a new transaction is verified and included in a block, the transaction will have one confirmation. Each subsequent block (which verifies the previous state of the blockchain) provides one additional network confirmation.

Typically, between 5-10 transaction confirmations (depending on the monetary value of the transaction) are acceptable for cryptocurrency exchanges to avoid losses due to potential fraud. Therefore, if the user computing device 12 is using Bitcoin, the digital asset payment computing entity 16 seeks a desired number of confirmations of the amount of the cryptocurrency received by the user computing device from the consensus network 16 (e.g., via Bitcoin miners). The transaction may not be verified by the digital asset payment computing entity for an hour or more. As such, the nonreal-time reconciliation of the digital asset-based payment loop 30 takes longer than the real-time digital asset-based payment loop 28.

When the digital asset payment computing entity 16 verifies the amount of the digital asset received by the user computing device 12, the digital asset payment computing entity 16 instructs the digital asset payment backing entity 20 to release the amount of network digital asset associated with the real-time digital asset-based payment. When the digital asset payment computing entity 16 does not verify the amount of the digital asset received by the user computing device 12, the digital asset payment computing entity 16 instructs the digital asset payment backing entity 20 to consume the amount of network digital asset associated with the real-time digital asset-based payment.

For example, if fraudulent activity occurs (e.g., the user computing device acts maliciously to spend at two merchants simultaneously, software of the digital asset management unit 22 is corrupted, etc.) the digital asset payment computing entity 16 consumes the amount of network digital asset associated with the real-time digital asset-based payment. As a specific example, if the user computing device 12 attempts to double spend a transaction, the verification (e.g., the desired number of confirmations in a Bitcoin blockchain example) will not be received and the digital asset payment computing entity 16 will not be able to verify the amount of the digital asset received by the user computing device 12.

If the verification is not received, the digital asset payment computing entity 16 withdraws (e.g., consumes) the amount of network digital asset locked by the digital asset payment backing entity 20 to cover the real-time payment that occurred with the merchant computing entity 14. Consuming the amount of network digital asset means that the amount of network digital asset is transferred (e.g., via an on-chain transaction) from an address associated with the digital asset management company 50 to an address associated with the digital asset payment computing entity 16.

Figure 2:
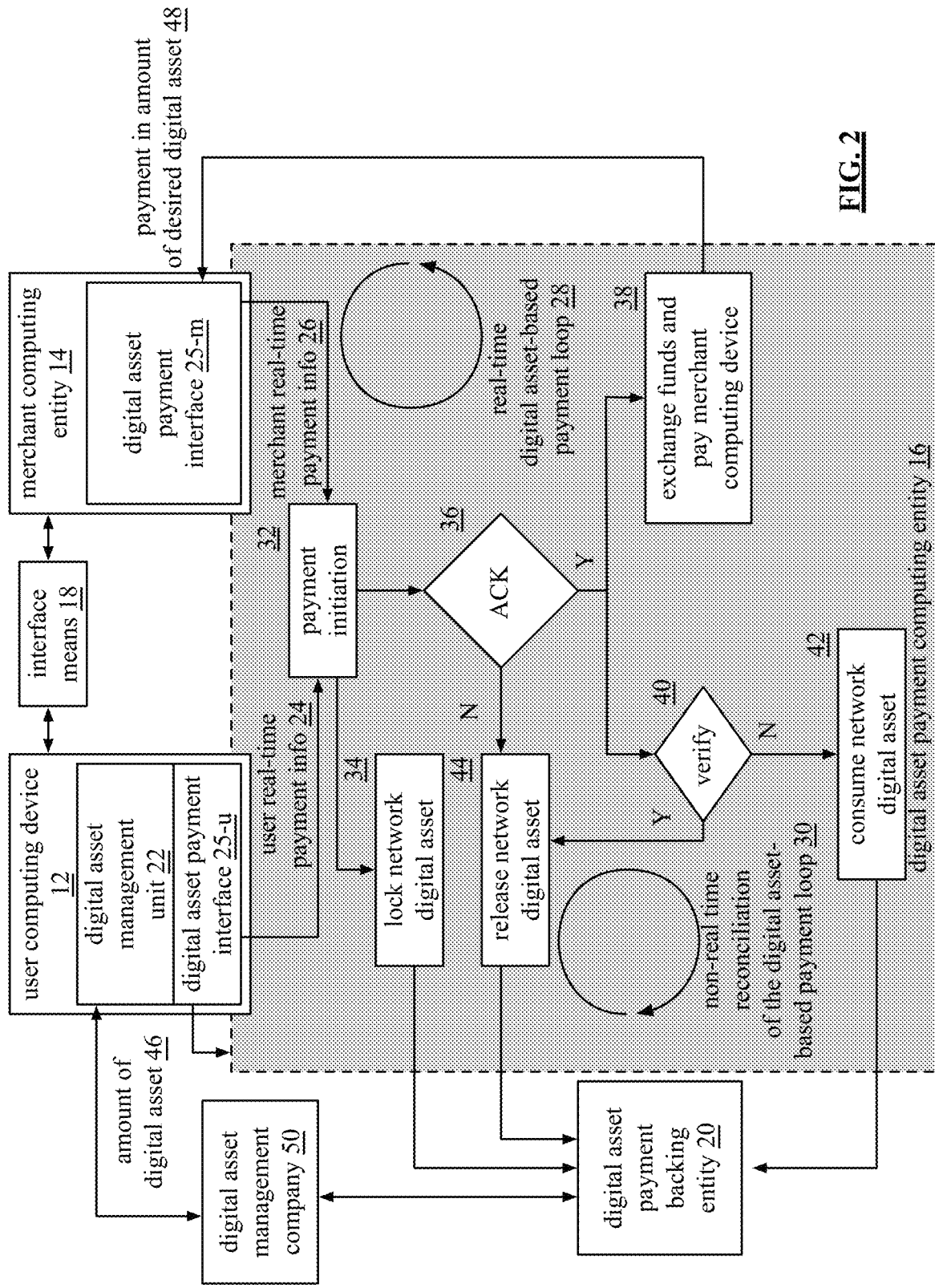
FIG. 2 is a flowchart of an example of a method for execution by a digital asset payment computing entity of the digital asset payment network in accordance with the present disclosure.

FIG. 2 is a flowchart of an example of a method for execution by a digital asset payment computing entity 16 of the digital asset payment network 10 of FIG. 1. FIG. 2 includes a user computing device 12, a merchant computing entity 14, a digital asset payment computing entity 16, an interface means 18, a digital asset payment backing entity 20, and a digital asset management company 50. The user computing device 12 includes a digital asset management unit 22. The digital asset management unit 22 is a digital wallet application associated with a digital asset management company (e.g., digital asset management company 50) installed on the user computing device 12 that functions to store and/or manage (e.g., buy, sell, trade, custody, etc.) digital assets.

The digital asset management unit 22 includes a digital asset payment interface 25-u that interfaces with the digital asset payment computing entity 16. For example, the user computing device 12 establishes an account with the digital asset payment computing entity 16 and the user computing device 12 is operable to access features of the digital asset payment computing entity 16 via the digital asset payment interface 25-u (e.g., via a direct link or by signing in).

The merchant computing entity 14 is operable to process payments from a user computing device and includes features tailored to the type of merchant computing entity 14 it is (e.g., a scanning device, a touchscreen, mobile payment features, online payment features, etc.). The merchant computing entity 14 includes a digital asset payment interface 25-m that interfaces with the digital asset payment computing entity 16. For example, the merchant computing entity 14 establishes an account with the digital asset payment computing entity 16 and the merchant computing entity 14 is operable to access features of the digital asset payment computing entity 16 via the digital asset payment interface 25-m to facilitate digital asset payment network 10 payments.

The digital asset management company 50 is associated with the digital asset payment backing entity 20 via an account and is operable to deposit network digital asset (e.g., network digital asset) into its account to back digital asset-based payments made by users of its associated digital asset management unit 22. The user computing device 12 and the merchant computing entity 14 interact via the interface means 18. For example, the interface means 18 is a scanning device of the user computing device 12 and/or the merchant computing entity 14.

The method begins with step 32 where a payment is initiated with the digital asset payment computing entity 16. A payment is initiated when the digital asset payment computing entity 16 receives user real-time payment information 24 and merchant real-time payment information 26 regarding a digital asset payment from a user computing device 12 to a merchant computing entity 14 accepting a desired digital asset.

For example, the user computing device 12 sends user real-time payment information 24 to the digital asset payment computing entity 16 via the digital asset payment interface 25-u of the digital asset management unit 22 and the merchant computing entity 14 sends merchant real-time payment information 26 to the digital asset payment computing entity 16 via the digital asset payment interface 25-m (e.g., from either requesting or scanning a scannable code). As another example, the digital asset payment interface of the user computing device 12 or the merchant computing entity 14 may send the user and merchant real-time payment information 24-26 to the digital asset payment computing entity 16 (e.g., the user computing device 12 sends the merchant computing entity 14 and the user real-time payment information 24).

The user real-time payment information 24 includes a user identifier (ID) and a type of digital asset (e.g., a cryptocurrency) it wishes to use in a real-time payment to the merchant computing entity 14. The merchant real-time payment information 26 includes a merchant identifier (ID) and a type of desired/selected digital asset (e.g., a fiat currency, another cryptocurrency) it wishes to receive in the real-time payment from the user computing device 12. One or more of the user real-time payment information 24 and the merchant real-time payment information 26 includes the amount of the real-time payment. The user real-time payment information 24 and the merchant real-time payment information 26 may include further information and/or metadata such as loyalty information, personal information (address, name, etc.), shipping details, bill splitting information, a request for additional information, etc.

When the digital asset payment computing entity 16 receives the real-time payment information 24-26, the digital asset payment computing entity 16 initiates 1) a real-time digital asset-based payment process (e.g., the real-time digital asset-based payment loop 28) and 2) a nonreal-time reconciliation process to reconcile the digital asset-based payment with the digital asset payment backing entity 20 (e.g., the nonreal-time reconciliation of the digital asset-based payment loop 30) (i.e., "payment initiation"). The reconciliation of the digital asset-based payment with the digital asset payment backing entity 20 occurs within a time frame that is longer than the time frame of the real-time digital asset-based payment.

The method continues with step 34 where, within the nonreal-time reconciliation of the digital asset-based payment loop 30, the digital asset payment computing entity 16 instructs the digital asset payment backing entity 20 to lock an amount of network digital asset associated with the real-time digital asset-based payment. The amount of network digital asset locked may be based on one or more of the payment amount, the type of item purchased, the user computing device 12 (e.g., a typical amount the user computing device 12 spends, an account balance, etc.), and the merchant computing entity 14 (e.g., the type of merchant the merchant computing entity 14 is associated with, the type of goods the merchant sells, a default amount set by the merchant, etc.).

When the digital asset payment computing entity 16 locks the network digital asset, a rate quote for the amount of digital asset used by the user computing device 12 may be locked. The method continues with step 36 where a network acknowledgment (ACK) of the receipt of the amount of the digital asset is or is not generated. For example, when the digital asset payment computing entity 16 receives an amount of digital asset 46 from the user computing device 12 to use in the real-time digital asset-based payment, the ACK is generated and the method continues to steps 38 and 40. If the payment initiation is terminated (e.g., payment initiation fails and/or is cancelled by the user and/or the merchant computing entity) within a certain amount of time prior to the digital asset payment computing entity 16 continues with the following steps of the real-time digital asset-based payment loop 28, the ACK is not generated, and the real-time payment terminates. Within the nonreal-time reconciliation of the digital asset-based payment loop 30, when the ACK is not generated, the method continues with step 44 where the digital asset payment computing entity 16 instructs the digital asset payment backing entity 20 to release the amount of locked network digital asset.

Within the real-time digital asset-based payment loop 28, when the ACK is generated, the method continues with step 38 where the digital asset payment computing entity 16 exchanges (or connects to a digital asset exchange to exchange) the amount of the digital asset 46 received from the user computing device 12 to an amount of the desired digital asset. Digital asset exchange is done quickly (e.g., 30 seconds to a few minutes) to account for exchange rate volatility. The digital asset payment computing entity 16 sends the payment in the amount of the desired digital asset 48 to the merchant computing entity 14 to complete the real-time digital asset-based payment.

Within the nonreal-time reconciliation of the digital asset-based payment loop 30, when the ACK is generated at step 36, the method continues with step 40 where the digital asset payment computing entity 16 verifies the amount of the digital asset 46 received from the user computing device 12. For example, when the digital asset is cryptocurrency, the digital asset payment computing entity 16 connects to a consensus network that verifies the amount of the cryptocurrency received from the user computing device 12. The consensus network implements a verification process that may take minutes to hours of time.

When the digital asset payment computing entity 16 verifies the amount of the digital asset received by the user computing device 12 at step 40, the method continues to step 44 where the digital asset payment computing entity 16 instructs the digital asset payment backing entity 20 to release the amount of network digital asset locked for the real-time digital asset-based payment. When the digital asset payment computing entity 16 does not verify the amount of the digital asset received by the user computing device 12 at step 40, the method continues to step 42 where the digital asset payment computing entity 16 instructs the digital asset payment backing entity 20 to consume the amount of network digital asset locked for the real-time digital asset-based payment. Consuming the amount of network digital asset means that the digital asset payment backing entity 20 transfers the amount of network digital asset to an address controlled by the digital asset payment computing entity 16 in order to cover the amount of the real-time digital asset-based payment.

Figure 2A:
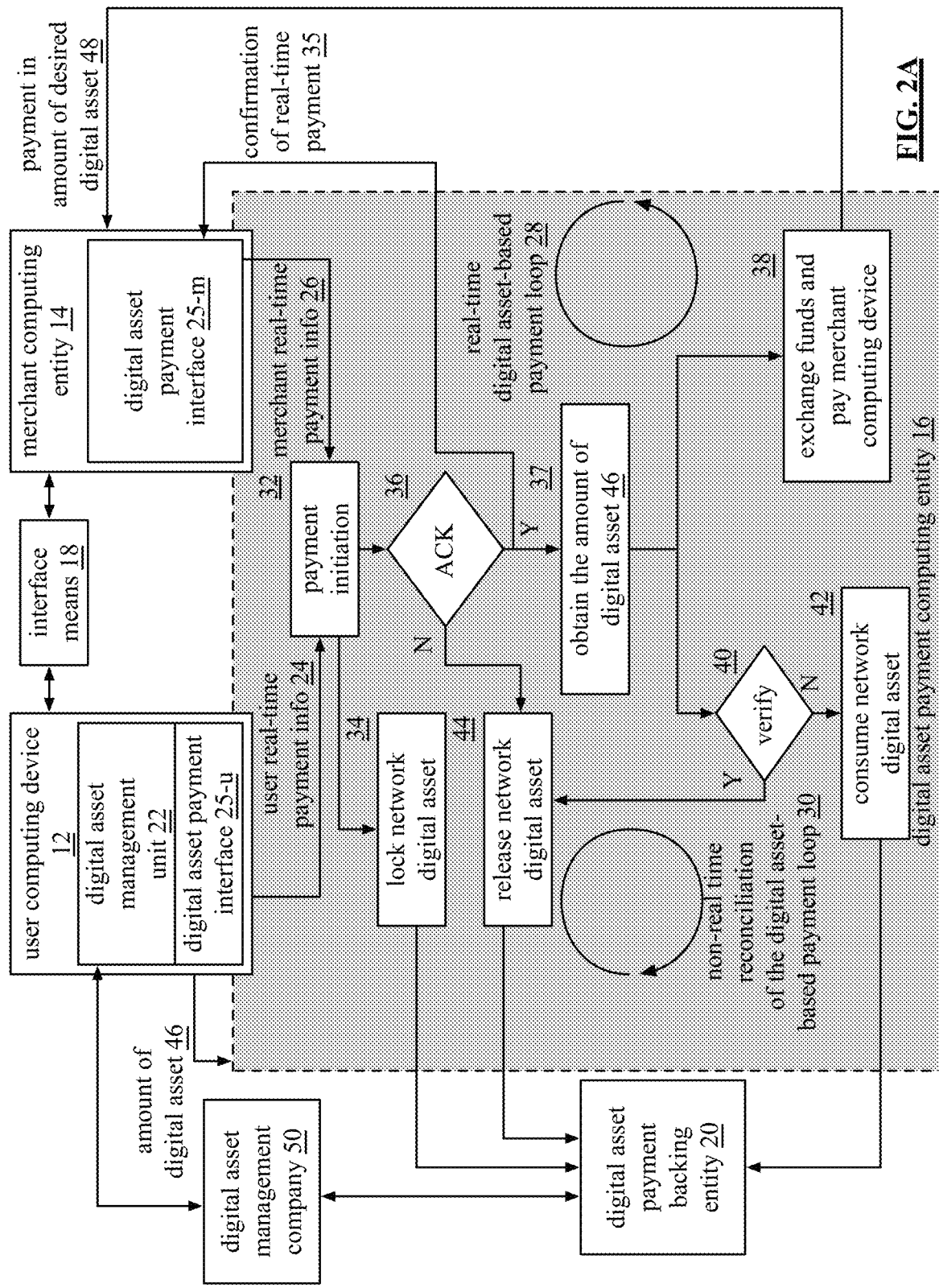
FIG. 2A is a flowchart of another example of a method for execution by a digital asset payment computing entity of the digital asset payment network in accordance with the present disclosure.

FIG. 2A is a flowchart of an example of a method for execution by a digital asset payment computing entity 16 of the digital asset payment network 10 of FIG. 1. FIG. 2A is similar to FIG. 2 except that the ACK at step 36 is generated after the network digital asset is locked but prior to receiving the amount of the digital asset from the user computing device 12. Locking the network digital asset implies authorization of the payment and the digital asset payment computing entity 16 allows a time period (e.g., up to five minutes) prior to pulling funds from the user computing device 12 (e.g., the user computing device has time to add tip, split the payment with another user, adjust type of digital asset used, etc.). The merchant computing entity is provided a confirmation of this ACK. For example, when the merchant computing entity is a POS computing device such as an attended register, this ACK may successfully end the in-person transaction such that the merchant and customer can part ways. However, the merchant computing entity receives the payment up to a few minutes after the in-person transaction.

When the digital asset payment computing entity 16 locks the network digital asset, a rate quote for the amount of digital asset used by the user computing device 12 is locked. The digital asset payment computing entity 16 locks the rate quote based on a tolerance window acceptable to the user. For example, the rate quote may be higher than the current rate quote if the window of time provided to receive funds is longer. The digital asset payment computing entity 16 has knowledge of the fluctuations on the digital asset exchange used and is operable to adjust the rate quotes according to a digital asset's availability on the exchange. Further, once a user authorizes a payment, the digital asset indicated in the payment may be exchanged by the digital asset payment computing entity 16 on credit (even if it has not been received yet) with the exchange to ensure a particular rate quote. Once the digital asset is received from the user, the accounting is balanced within the digital asset payment computing entity 16.

As another example, the digital asset payment computing entity 16 may utilize a smart contract based decentralized pool with a reserve of one or more smart contract compatible tokens (e.g., Ethereum Request for Comment ("ERC20") tokens) for real-time digital asset exchanges to ensure a particular rate quote. For example, the digital asset payment computing entity 16 exchanges smart contract compatible tokens from the reserve (e.g., a substantial equivalent to the amount of digital asset used in the real-time digital asset payment) for a substantially equivalent amount of the desired digital asset. When the amount of digital asset is received by the digital asset payment computing entity 16, the digital asset payment computing entity 16 is operable to exchange the amount of digital asset to the substantially equivalent amount of the smart contract compatible token used to cover the real-time digital asset exchange.

When the ACK is generated, the digital asset payment computing entity 16 sends the merchant computing entity a confirmation of the real-time payment 35. If the payment initiation is terminated (e.g., payment initiation fails and/or is cancelled by the user and/or the merchant computing entity) within a certain amount of time prior to the digital asset payment computing entity 16 continues with the following steps of the real-time digital asset-based payment loop 28, the ACK is not generated, and the confirmation of the real-time payment 35 is not sent.

Within the nonreal-time reconciliation of the digital asset-based payment loop 30, when the ACK is not generated, the method continues with step 44 where the digital asset payment computing entity 16 instructs the digital asset payment backing entity 20 to release the amount of locked network digital asset.

Within the real-time digital asset-based payment loop 28, when the ACK is generated, the method continues with step 37 where, after a time period (e.g., up to 5 minutes), the amount of digital asset 46 is obtained. For example, an initial amount of digital asset is received at a time 1, and an additional amount of digital asset (e.g., tip is added) is received at a time 2 where the initial amount and the additional amount equal the amount of digital asset 46.

The method continues with step 38 where the digital asset payment computing entity 16 exchanges (or connects to a digital asset exchange to exchange) the amount of the digital asset 46 received from the user computing device 12 to an amount of the desired digital asset. Alternatively, if the locked network digital asset is used for the exchange, the digital asset payment computing entity 16 exchanges the amount of the digital asset 46 received from the user computing device 12 to an amount of network digital asset. The digital asset payment computing entity 16 sends the payment in the amount of the desired digital asset 48 to the merchant computing entity 14 to complete the real-time digital asset-based payment.

Within the nonreal-time reconciliation of the digital asset-based payment loop 30, after the amount of digital asset 46 is obtained at step 37, the method continues with step 40 where the digital asset payment computing entity 16 verifies the amount of the digital asset 46 received from the user computing device 12. For example, the digital asset payment computing entity 16 connects to a consensus network that verifies the amount of the digital asset received from the user computing device 12. The consensus network implements a verification process that may take minutes to hours of time.

When the digital asset payment computing entity 16 verifies the amount of the digital asset received by the user computing device 12 at step 40, the method continues to step 44 where the digital asset payment computing entity 16 instructs the digital asset payment backing entity 20 to release the amount of network digital asset locked for the real-time digital asset-based payment. When the digital asset payment computing entity 16 does not verify the amount of the digital asset received by the user computing device 12 at step 40, the method continues to step 42 where the digital asset payment computing entity 16 instructs the digital asset payment backing entity 20 to consume the amount of network digital asset locked for the real-time digital asset-based payment. Consuming the amount of network digital asset means that the digital asset payment backing entity 20 transfers the amount of network digital asset to an address controlled by the digital asset payment computing entity 16 in order to cover the amount of the real-time payment.

Figure 3:
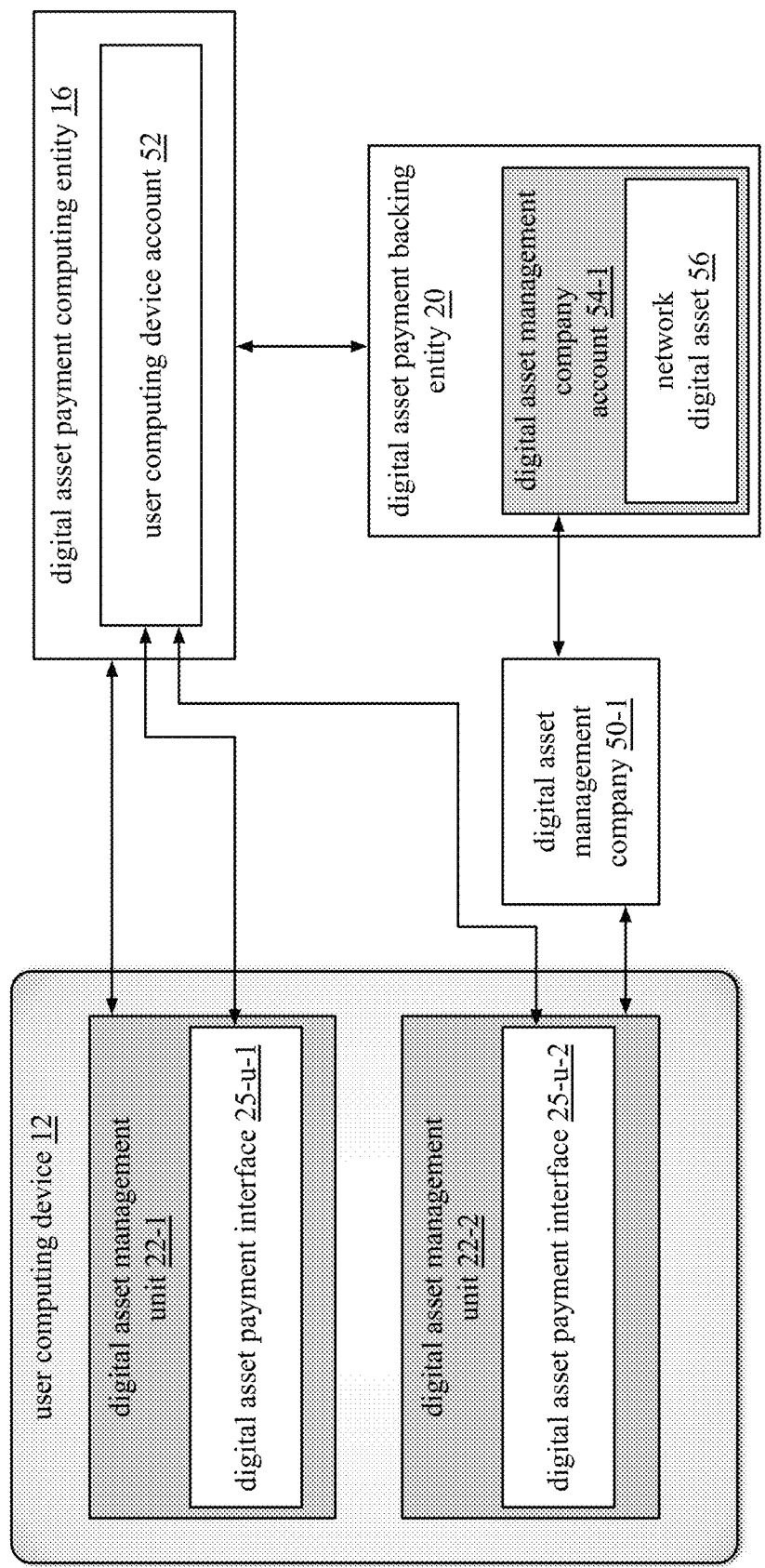
FIG. 3 is a schematic block diagram of an embodiment of a user computing device of a digital asset payment network in accordance with the present disclosure.

FIG. 3 is a schematic block diagram of an embodiment of a user computing device 12 of a digital asset payment network that includes a digital asset management unit 22-1 and a digital asset management unit 22-2. The digital asset management units 22-1 and 22-2 may be a custodial digital wallet application and/or a non-custodial digital wallet application installed on the user computing device 12 that are each associated with a digital asset management company (e.g., a digital asset holding and management company, a cryptocurrency holding company, a cryptocurrency holding and exchange company, a digital asset exchange company, etc.). Alternatively, one or more of the digital asset management units 22-1 and 22-2 may be a network enabled smart contract application associated with a digital asset management company that allows a user to deposit digital assets to a network enabled smart contract with a private key. In this example, the digital asset payment computing entity 16 is a digital asset management company that is operable (e.g., specially licensed) to custody (e.g., hold, move, and protect) digital assets such as cryptocurrency, cryptocurrency tokens, etc. The digital asset management unit 22-1 is associated with the digital asset payment computing entity 16 and the digital asset management unit 22-2 is associated with a digital asset management company 50-1.

The digital asset management company 50-1 is associated with the digital asset payment backing entity 20 via a digital asset management company account 54-1. For example, the digital asset management company 50-1 establishes the digital asset management company account 54-1 to make the digital asset management unit 22-2 compatible with the digital asset payment network. The digital asset management company 50-1 deposits network digital asset 56 into the digital asset management company account 54-1 to back digital asset payment network payments made by users of the digital asset management unit 22-2.

Even though the digital asset payment computing entity 16 is a custodial digital asset management company in this example and holds digital assets on behalf of the user computing device 12, the digital asset payment computing entity 16 provides network digital asset to back payments made by users of the digital asset management unit 22-1.

The digital asset management unit 22-1 includes a digital asset payment interface 25-$u$-1 that interfaces with the digital asset payment computing entity 16. The digital asset management unit 22-2 includes a digital asset payment interface 25-$u$-2 that interfaces with the digital asset payment computing entity 16.

For example, when the user computing device 12 installs/downloads the digital asset management unit 22-1, the user computing device 12 creates the user computing device account 52 to custody digital assets with the digital asset payment computing entity 16 and to interface with the digital asset payment computing entity 16 via the digital asset payment interface 25-u-1.

As another example, when the user computing device 12 installs/downloads the digital asset management unit 22-2 (or at some point after installation), the user computing device 12 creates or signs into the user computing device account 52 to use the digital asset payment network via the digital asset payment interface 25-u-2. In this example, the digital asset management unit 22-2 maintains an active link to the digital asset payment computing entity 16 via the digital asset payment interface 25-u-2 (e.g., the user computing device 12 does not need to sign in to the user computing device account 52 every time the digital asset payment interface 25-u-2 is accessed).

Figure 4:
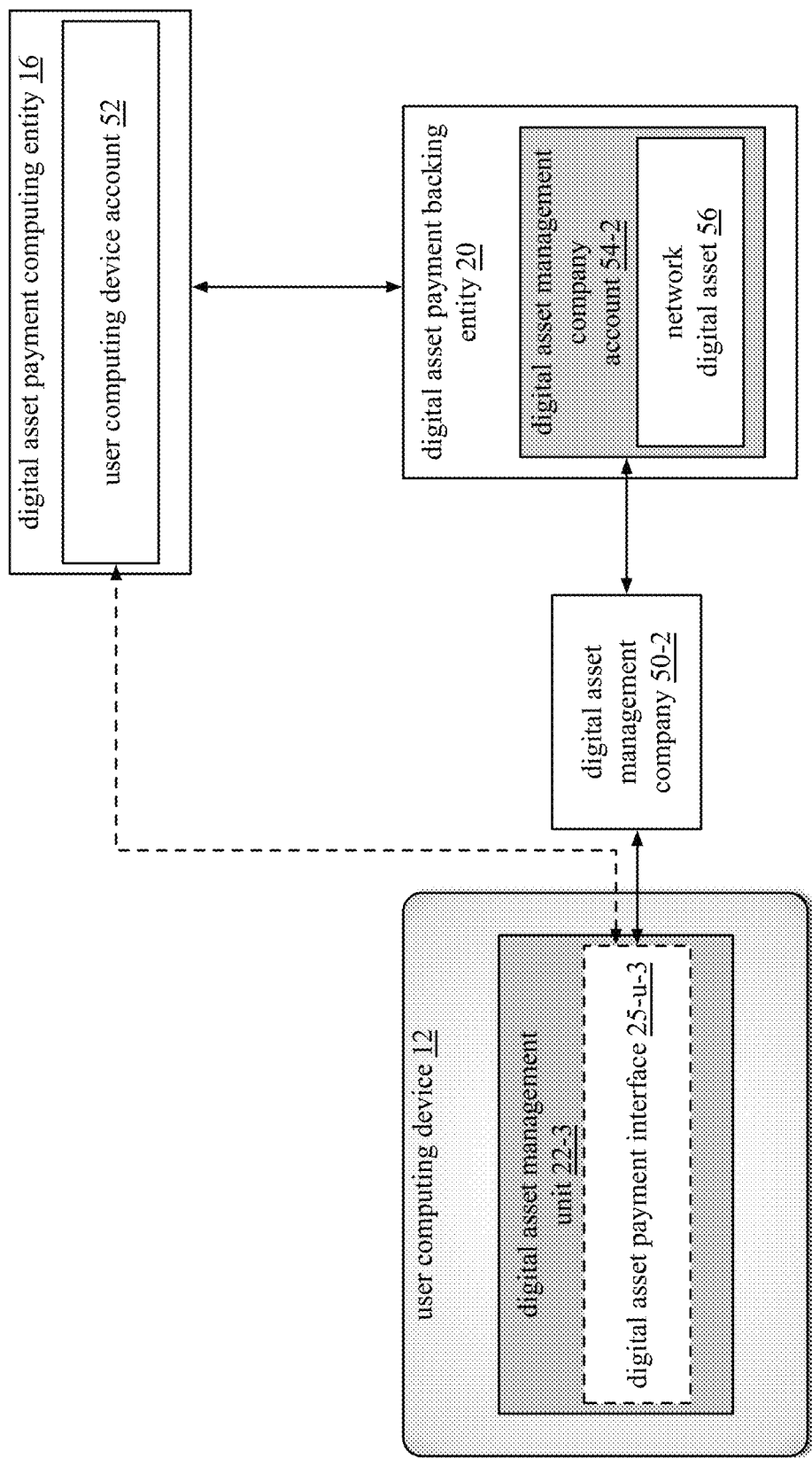
FIG. 4 is a schematic block diagram of an embodiment of a user computing device of a digital asset payment network in accordance with the present disclosure.

FIG. 4 is a schematic block diagram of an embodiment of a user computing device 12 of a digital asset payment network that includes a digital asset management unit 22-3. The digital asset management unit 22-3 may be a custodial or non-custodial digital wallet application associated with a digital asset management company (e.g., a digital asset holding and management company, a cryptocurrency holding company, a cryptocurrency holding and exchange company, a digital asset exchange company, etc.). Alternatively, the digital asset management unit 22-3 may be a network enabled smart contract application associated with a digital asset management company that allows a user to deposit digital assets to a network enabled smart contract with a private key. In this example, the digital asset management unit 22-3 is associated with a digital asset management company 50-2.

The digital asset management company 50-2 is associated with the digital asset payment backing entity 20 via a digital asset management company account 54-2. For example, the digital asset management company 50-2 establishes the digital asset management company account 54-2 to make the digital asset management unit 22-3 compatible with the digital asset payment network. The digital asset management company account 54-2 deposits network digital asset 56 into the digital asset management company account 54-2 to back digital asset payment network payments made by users of the digital asset management unit 22-3.

The digital asset management unit 22-3 includes a digital asset payment interface 25-u-3 that interfaces with the digital asset payment computing entity 16. For example, when or after the user computing device 12 installs/downloads the digital asset management unit 22-3, the user computing device 12 creates or signs into the user computing device account 52 to interface with the digital asset payment computing entity 16 via the digital asset payment interface 25-u-3. In this example, the digital asset management unit 22-3 does not maintain an active link to the digital asset payment computing entity 16 via the digital asset payment interface 25-u-3 (e.g., the user computing device 12 is prompted to sign into the user computing device account 52 every time the user computing device 12 is making a digital asset payment network payment).

Figure 5A:
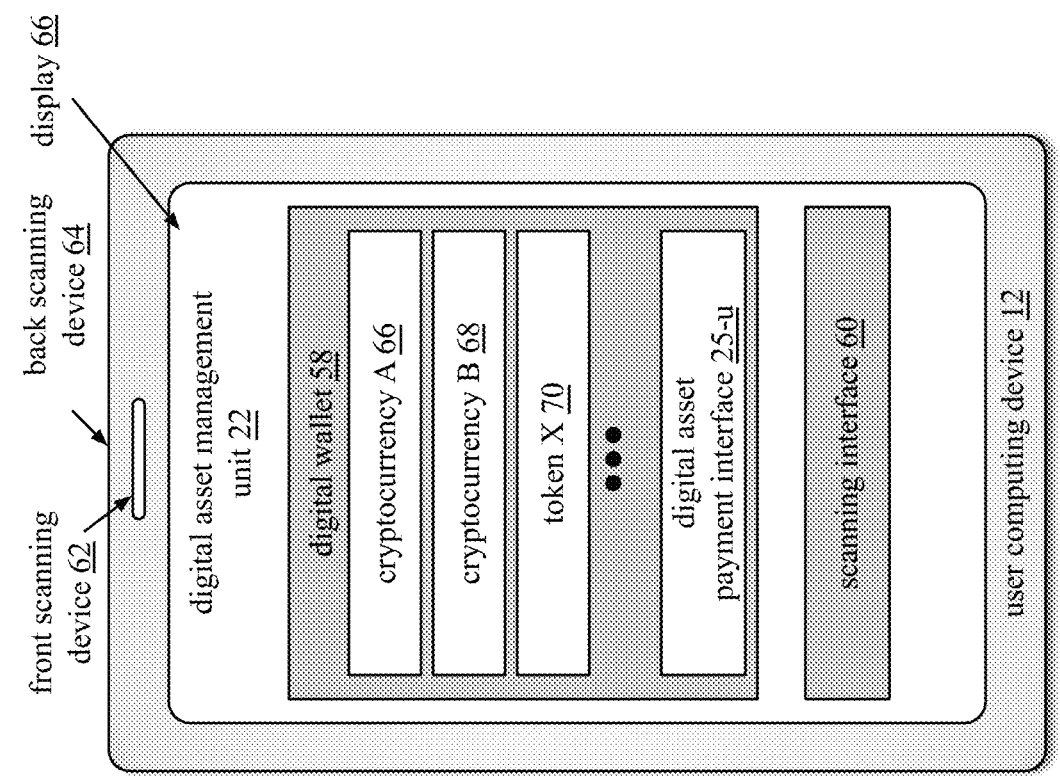
FIGS. 5A-5B are schematic block diagrams of an embodiment of a user computing device of a digital asset payment network in accordance with the present disclosure.
Figure 5B:
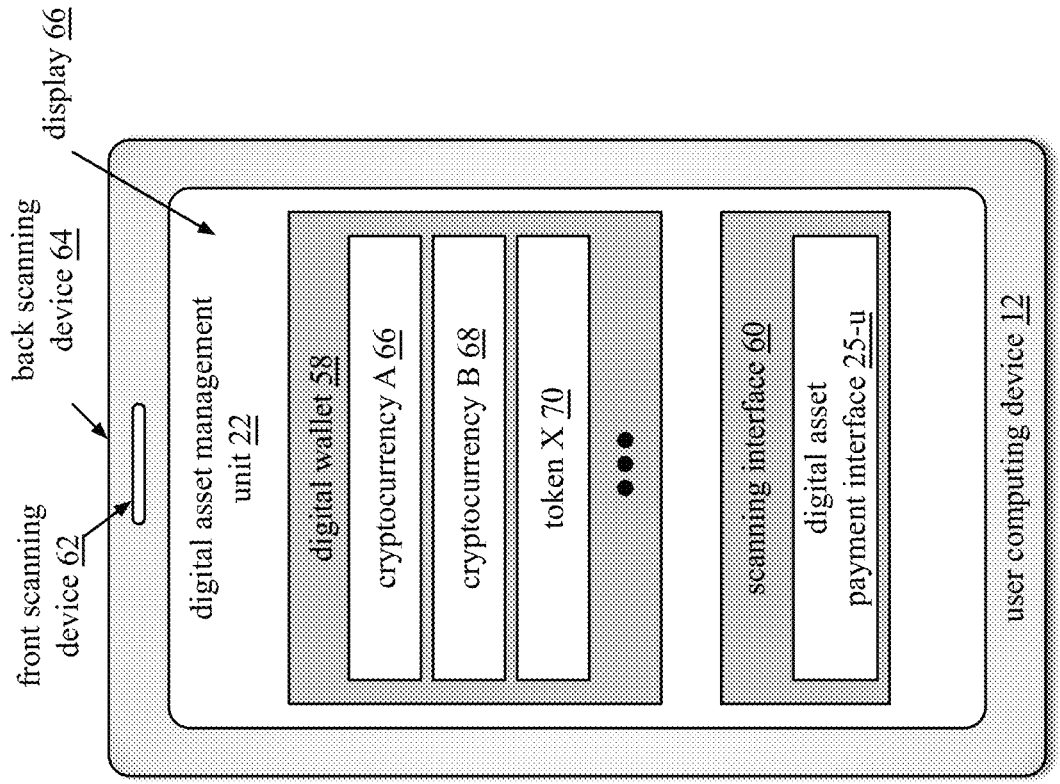

FIGS. 5A-5B are schematic block diagrams of an embodiment of a user computing device 12 of a digital asset payment network. The user computing device 12 includes a digital asset management unit 22, a display 66, a front scanning device 62 (e.g., a front camera), and a back scanning device 64 (e.g., a back camera). A scanning device may be a video device, a camera, an infrared (IR) device, a barcode scanner, etc. The user computing device 12 may have more or less scanning devices than shown. Further, the scanning devices may be located in different positions on the user computing device 12 than what is shown. The display 66 may be a liquid crystal display (LCD), a light emitting diode (LED), and/or other type of display technology. In this example, the display 66 is a touchscreen. The touchscreen functionality may be implemented by 5-wire resistive, thin film transistor (TFT), in-place switching (IPS), surface capacitive, surface acoustic wave (SAW), infrared, and/or any other type of touch screen technology.

The digital asset management unit 22 includes a digital wallet 58 and a scanning interface 60 coupled to one or more of the front and/or back optical scanners 62-64. The digital wallet 58 stores and/or shows a representation of stored digital assets (e.g., when the digital assets are custodied by the digital asset management company associated with the digital asset management unit 22). Here, the digital wallet 58 stores cryptocurrency A 66, cryptocurrency B 68, and token X 70. The digital wallet 58 could store more or less digital assets and may include additional features for digital asset management. For example, the digital wallet 58 may include functions and/or features for trading, exchange, deposit, withdrawal, market information, digital asset news, etc.

In FIG. 5A, the digital wallet 58 includes a digital asset payment interface 25-u. For example, a "pay" icon and/or button within the digital wallet 58 links to the digital asset payment interface 25-u. The digital asset payment interface 25-u may automatically open when the "pay" icon is selected (e.g., when the digital asset management unit 22 maintains an active link to the digital asset payment computing entity 16) or the user may be prompted to sign into the digital asset payment network (e.g., when the digital asset management unit 22 does not maintain an active link to the digital asset payment computing entity 16).

As an alternative example, in FIG. 5B, the scanning interface 60 includes the digital asset payment interface 25-u such that when a scan function is initiated by the scanning interface 60, the digital asset payment interface 25-u is accessed. A scan function may be initiated by selecting a scan icon or automatically when certain scannable codes are detected and an automatic scan function is enabled. The digital asset payment interface 25-u may automatically open when the scan function is initiated (e.g., when the digital asset management unit 22 maintains an active link to the digital asset payment computing entity 16) or the user may be prompted to sign into the digital asset payment network (e.g., when the digital asset management unit 22 does not maintain an active link to the digital asset payment computing entity 16).

Figure 6B:
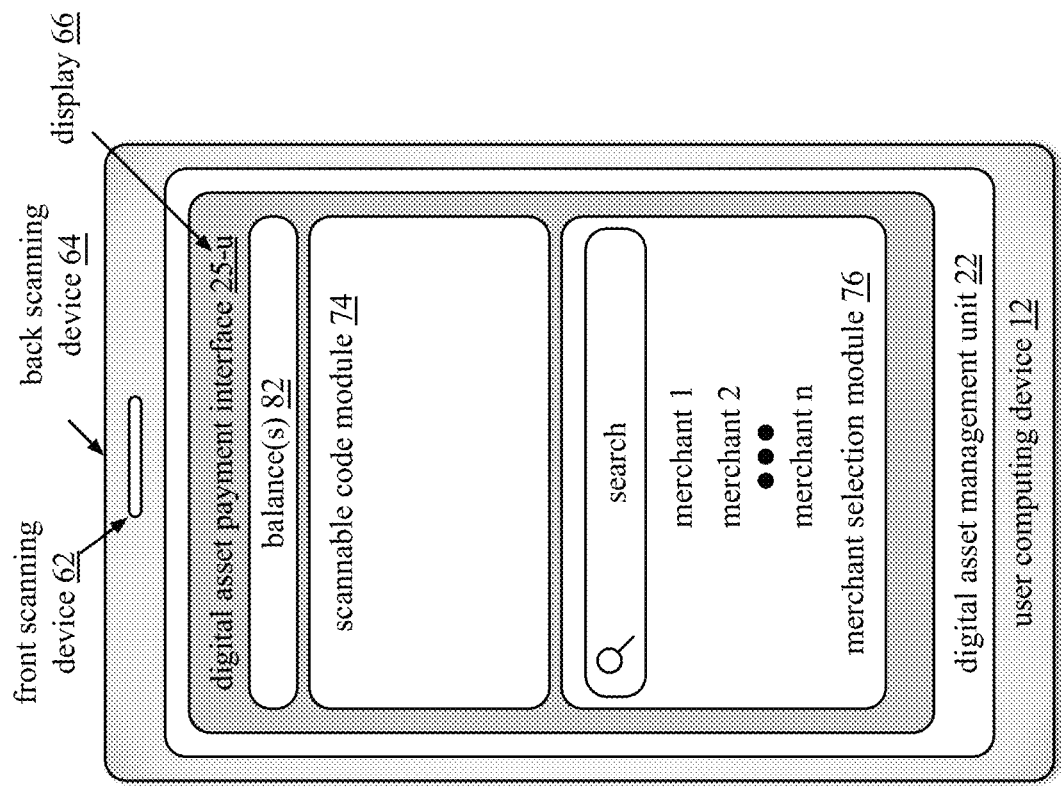
FIGS. 6A-6B are schematic block diagrams of an embodiment of a user computing device of a digital asset payment network in accordance with the present disclosure.
Figure 6A:
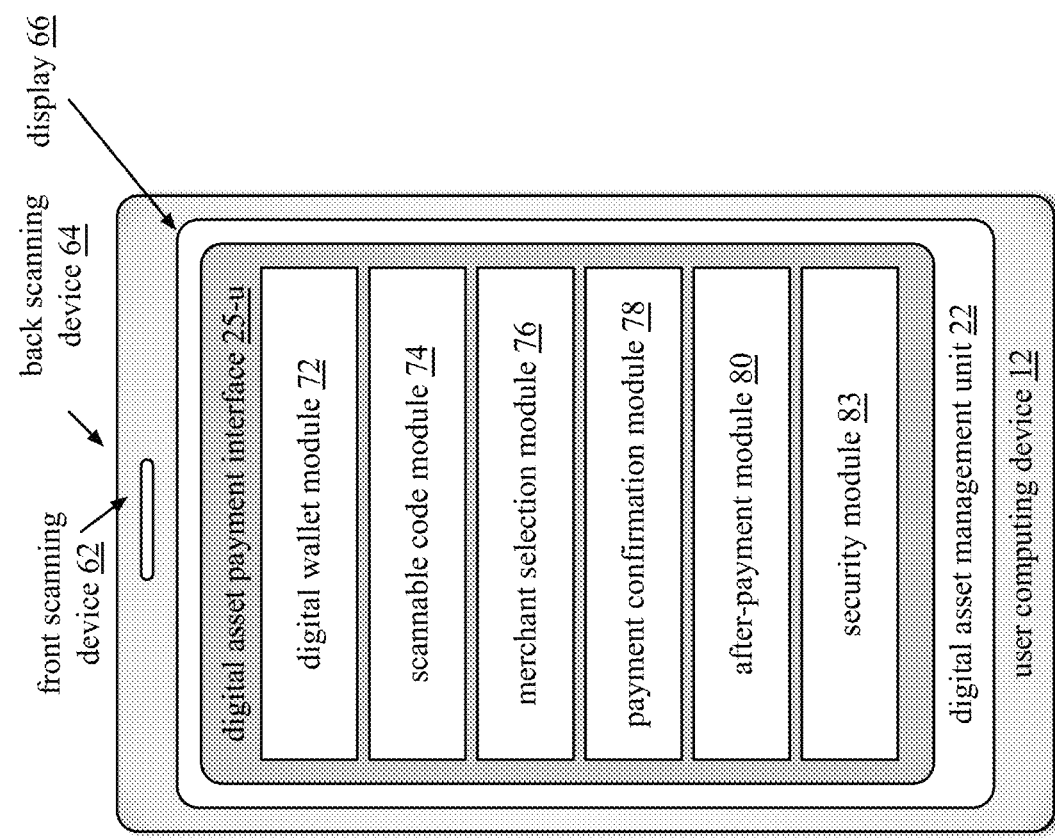

FIGS. 6A-6B are schematic block diagrams of an embodiment of a user computing device 12 of a digital asset payment network that includes a digital asset management unit 22, a display 66, a front scanning device 62 (e.g., a front camera), and a back scanning device 64 (e.g., a back camera). FIGS. 6A-6B show the digital asset payment interface 25-u opened within the digital asset management unit 22 (e.g., via the digital wallet or the scanning interface).

FIG. 6A depicts modules of the digital asset payment interface 25-u that include a digital wallet module 72, a scannable code module 74, a merchant selection module 76, a payment confirmation module 78, an after-payment module 80, and a security module 83. More or less modules are possible. For example, the merchant selection module 76 may not be necessary when the merchant selection functionality is included in other features and/or components. The digital wallet module 72 is coupled to the digital wallet of the digital asset management unit 22. The digital wallet module 72 displays balance information of the digital assets in the digital wallet (or a default digital asset selected for use in digital asset payment network payments) and is operable to communicate with the digital wallet to adjust digital assets (e.g., withdrawal, deposit, etc.) based on digital asset payment network payments.

The scannable code module 74 is coupled to the front and/or back scanning devices 62-64 of the user computing device 12 and includes software for detecting and analyzing scannable codes captured by the front and/or back scanning devices 62-64. The scannable code module 74 is operable to receive scannable codes (e.g., from the digital asset payment computing entity), scan scannable codes (e.g., capture via the front and/or back optical scanner 62-64, digitize, and bring into a frame of reference), display scannable codes on the display 66, interpret scannable codes to determine payment information, and display the payment information interpreted from the scanned scannable codes. The scannable code module 74 may be a function of the scanning interface 60 that is tailored for scanning and interpreting scannable codes associated with digital asset payment network payments.

The merchant selection module 76 is operable to connect to the digital asset payment computing entity and/or a database associated with the digital asset payment computing entity to receive digital asset payment network merchant data (e.g., a list of merchants associated with the digital asset payment network). The merchant selection module 76 may display a list of merchants that are associated with the digital asset payment network for selection by the user computing device 12. The merchant selection module 76 includes a search function to allow a user to search for a desired merchant. The displayed list of merchants may be based on location (e.g., nearby merchants are listed), category (e.g., restaurant merchants are listed), and/or availability (e.g., according to hours of operation). In another embodiment, the user computing device 12 is able to locate and initiate a payment with another user computing device of the digital asset payment network (e.g., where the merchant selection module 76 further includes a user computing device selection function).

The payment confirmation module 78 includes options for confirming a payment and adding additional information (e.g., shipping information, bill splitting options, etc.) prior to confirming a payment. The payment confirmation module 78 will be discussed in more detail with reference to FIGS. 14-23D. The after-payment module 80 includes after-payment options that can be selected after a payment is authorized and/or confirmed. For example, the after-payment includes functions for a payment adjustment (e.g., change wallets, change digital asset, etc.), adding additional user information (e.g., a shipping address), bill splitting, and adding tip. The after-payment module 80 will be discussed in more detail with reference to FIGS. 14-23D.

The security module 83 includes security mechanisms for authenticating the user and/or user activity of the user computing device 12 for a digital asset-based payment. For example, the security module 83 uses facial recognition technology to perform a facial scan prior to initiating a payment. As another example, the security module 83 stores and/or verifies usernames, passcodes, and/or keys related to authorization of digital asset-based payments by the user computing device 12.

FIG. 6B depicts a user interface perspective of the digital asset payment interface 25-$u$ (e.g., what a user of the user computing device 12 might view and interact with). The user interface perspective displays one or more balance(s) 82 from the digital wallet module 72. The balance(s) 82 may include account balances for a variety of digital assets (e.g., cryptocurrencies, fiat, etc.).

The balance(s) 82 are based on rate quotes determined by a digital asset exchange used by the digital asset payment computing entity 16 at a point in time (e.g., a current exchange rate, an average exchange rate for a time period, etc.). The digital asset payment computing entity 16 is operable to exchange a variety of digital assets (e.g., fiat currency, cryptocurrency, etc.) and to facilitate exchange across jurisdictions (e.g., for foreign currency exchange). The balance(s) 82 are updated as exchange rates fluctuate and/or based on a predetermined time (e.g., every 30 minutes, once a day, every time the user computing device 12 opens the digital asset payment interface 25-$u$, etc.). The balance(s) 82 may be shown in terms of US dollars or in any other desired digital asset.

For example, a current balance of one or more frequently used cryptocurrencies are shown in US dollars and updated every few minutes on the display 66. As another example, a current balance of one or more default currencies are shown in US dollars and updated every few minutes on the display 66. As another example, current balances of all digital assets are shown in terms of US dollars and updated every few minutes on the display 66.

The user interface perspective of the digital asset payment interface 25-$u$ also displays an area of the display for the scannable code module 74 (e.g., a viewfinder area showing a view from the back or front camera of the user computing device 12) and the merchant selection module 76 displaying a list of merchants 1-$n$ and a search bar. The search bar can be used to search for specific merchants and/or categories of merchants. The list of merchants 1-$n$ may be based on a searched merchant category (e.g., a user types in "Mexican food" and Mexican restaurant merchants are listed), merchants nearby, favorite merchants based on user history, an alphabetical listing, a default list, etc.

More or less features/icons may be shown in the user interface perspective and based on the modules of FIG. 6A. For example, a merchant list of the merchant selection module 76 may be shown after a link to display a merchant list is selected. As another example, a user computing device list may be selected when user wishes to find and pay a non-merchant. As another example, the scannable code module 74 may cover a large portion or all of the display 66 (e.g., remove other features or show features underneath with the scannable code module 74 as a transparent layer) such that when the user accesses the digital asset payment interface 25-$u$, the view through one of the scanning devices is shown on a large portion of the display 66 or all of the display 66.

Figure 7B:
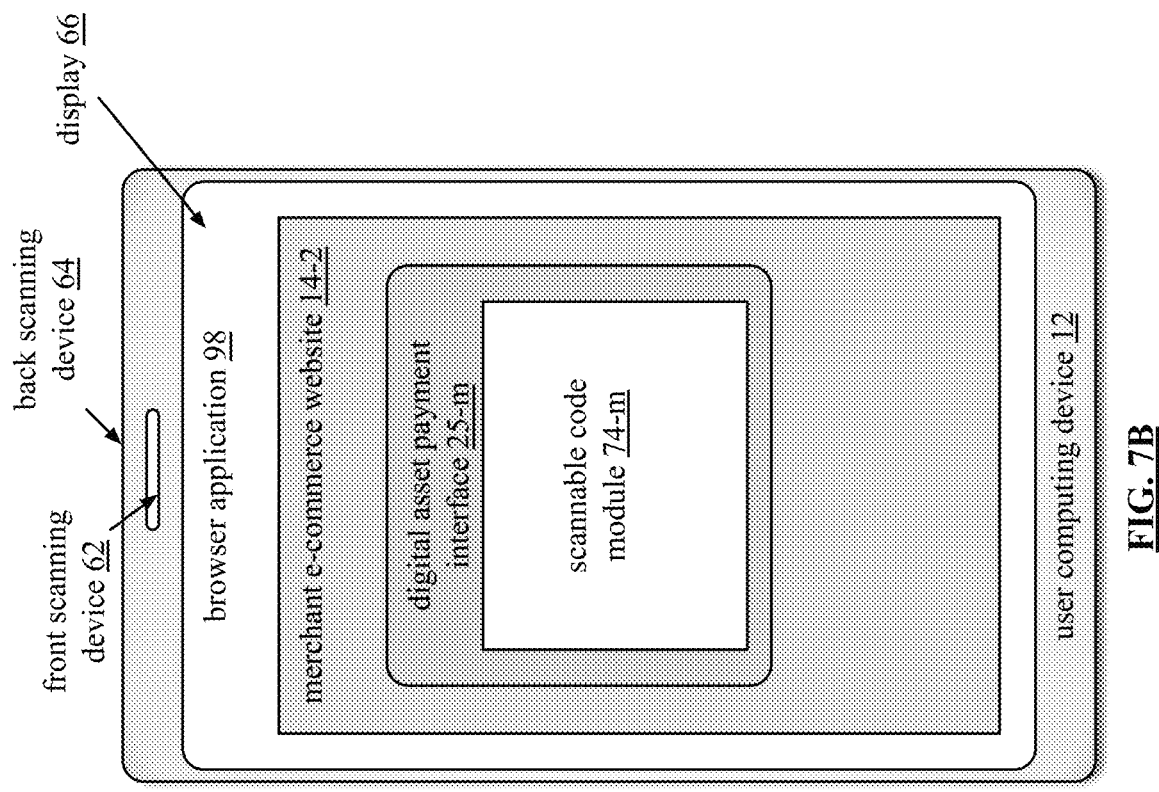
FIGS. 7A-7C are schematic block diagrams of an embodiment of a merchant computing entity of a digital asset payment network in accordance with the present disclosure.
Figure 7A:
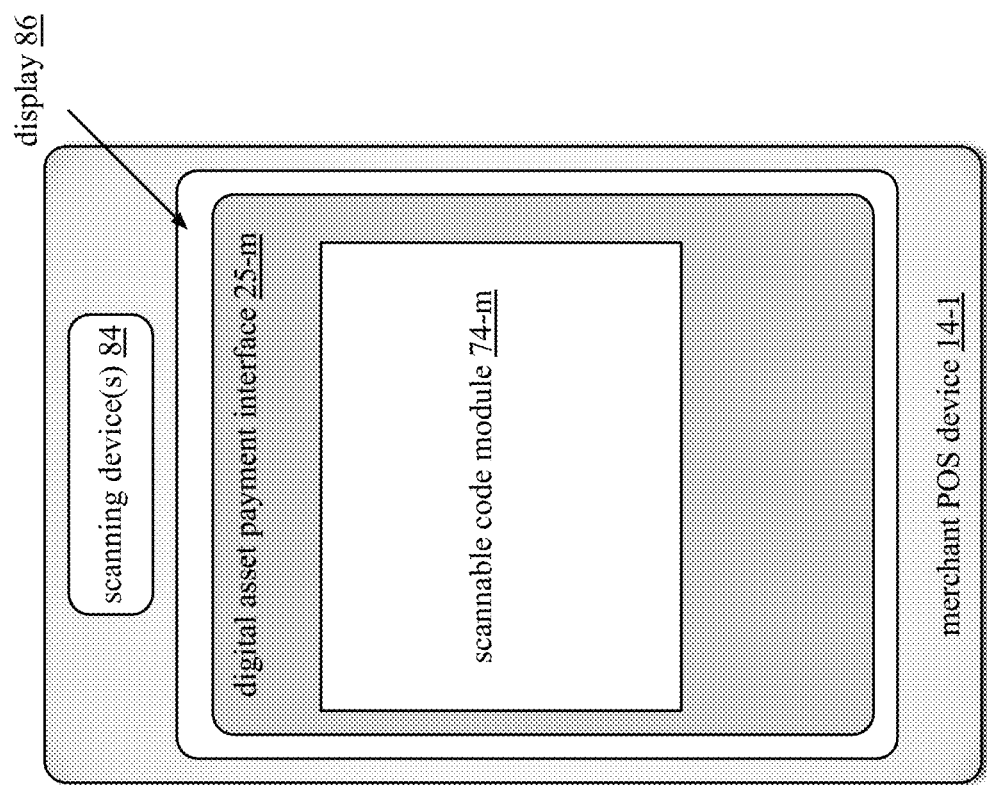

FIGS. 7A-7B are schematic block diagrams of an embodiment of a merchant computing entity 14 of a digital asset payment network that includes a digital asset payment interface 25-$m$. In FIG. 7A, the merchant computing entity is a merchant point-of-sale (POS) device 14-1 that includes the digital asset payment interface 25-$m$, scanning device(s) 84, and a display 86.

The merchant POS device 14-1 is operable to process payments from a user computing device and includes features for in-person payment interaction (e.g., scanning device(s) 84, a touchscreen display, etc.). The merchant POS device 14-1 may include a variety of existing payment processing features for processing payments within existing payment networks. The digital asset payment interface 25-$m$ interfaces with the digital asset payment computing entity. For example, the merchant POS device 14-1 establishes an account with the digital asset payment computing entity (e.g., a merchant establishes an account with the digital asset payment computing entity such that various merchant computing entities associated with the merchant can access the account) and the merchant computing entity 14 can access the digital asset payment computing entity via the digital asset payment interface 25-m to facilitate digital asset payment network payments.

The digital asset payment interface 25-m includes a scannable code module 74-m coupled to the scanning device (s) 84. The scannable code module 74-m is operable to receive scannable codes (e.g., from the digital asset payment computing entity), scan scannable codes (e.g., capture via the scanning device(s) 84, digitize, and bring into a frame of reference), display scannable codes on the display 86, and interpret scannable codes to determine payment information.

In FIG. 7B, the merchant computing entity is a merchant e-commerce website 14-2. In this example, the user computing device 12 accesses the merchant e-commerce website 14-2 via a browser application 98 and a network connection. The merchant e-commerce website 14-2 processes payments from a user computing device via the network connection with the user computing device 12. The merchant e-commerce website 14-2 may include a variety of existing payment processing features for processing payments within existing payment networks.

The merchant e-commerce website 14-2 includes the digital asset payment interface 25-m. The digital asset payment interface 25-m interfaces with the digital asset payment computing entity. For example, the merchant e-commerce website 14-2 establishes an account with the digital asset payment computing entity and the merchant e-commerce website 14-2 can access the digital asset payment computing entity via the digital asset payment interface 25-m to facilitate digital asset payment network payments.

The digital asset payment interface 25-m includes a scannable code module 74-m operable to receive scannable codes (e.g., from the digital asset payment computing entity) and display scannable codes (e.g., on a display 66 of the user computing device) for interaction with a user computing device.

Figure 7C:
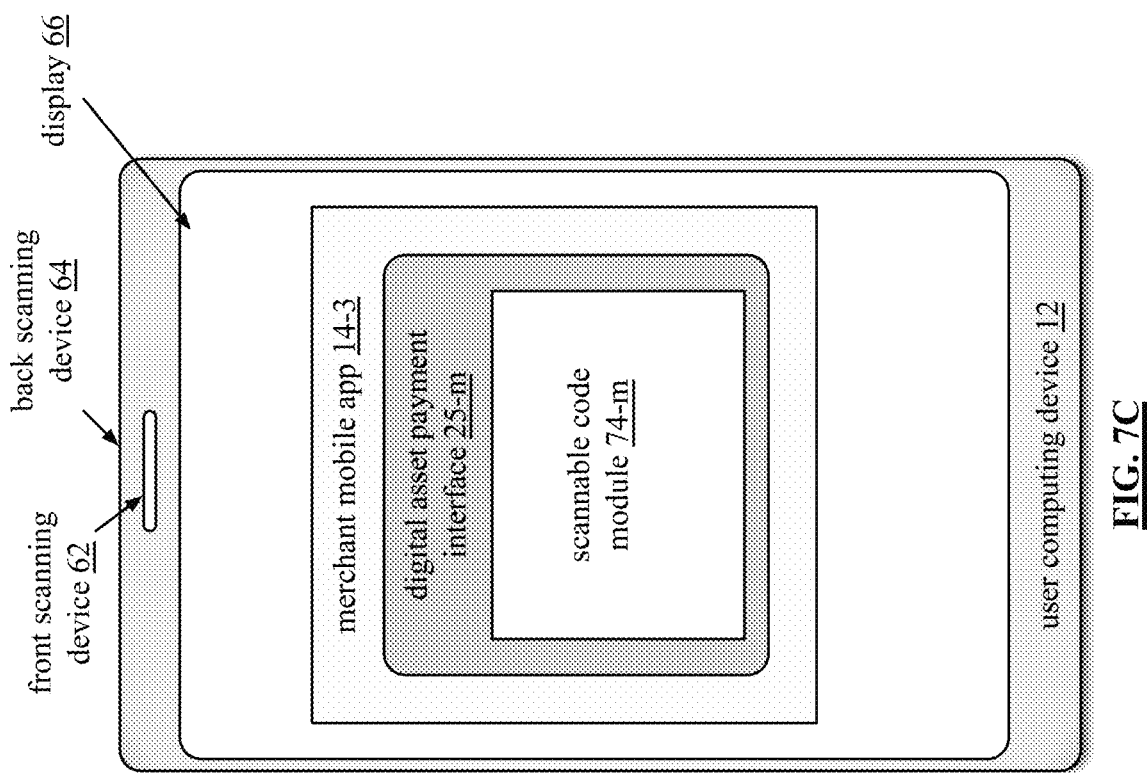

In FIG. 7C, the merchant computing entity is a merchant mobile application ("app") 14-3. In this example, the merchant mobile app 14-3 is installed on the user computing device 12 and the user computing device 12 connects to the merchant mobile app 14-3 via a network connection. The merchant mobile app 14-3 processes payments with the user computing device 12 similar to the merchant e-commerce website 14-2 but may include mobile app specific features.

For example, the merchant mobile app 14-3 may have access to user computing device 12 information via other applications installed on the user computing device 12 (e.g., calendar, address book, other digital asset management unit(s), etc.) to customize and streamline app purchases. As another example, the merchant mobile app 14-3 may include features to send push notifications alerting the user computing device 12 to discounts, sales, new inventory, etc. As another example, through a security mechanism of the user computing device (e.g., entering a username and password), a user of the user computing device 12 can stay signed into their account on the merchant mobile app 14-3 for convenience.

The merchant mobile app 14-3 includes the digital asset payment interface 25-m. The digital asset payment interface 25-m interfaces with the digital asset payment computing entity. For example, the merchant mobile app 14-3 establishes an account with the digital asset payment computing entity and the merchant mobile app 14-3 can access the digital asset payment computing entity via the digital asset payment interface 25-m to facilitate digital asset payment network payments.

The digital asset payment interface 25-m includes a scannable code module 74-m operable to receive scannable/graphical codes (e.g., from the digital asset payment computing entity) and display scannable codes (e.g., on a display 66 of the user computing device) for interaction with a user computing device (the user computing device 12 or another user computing device).

Figure 8:
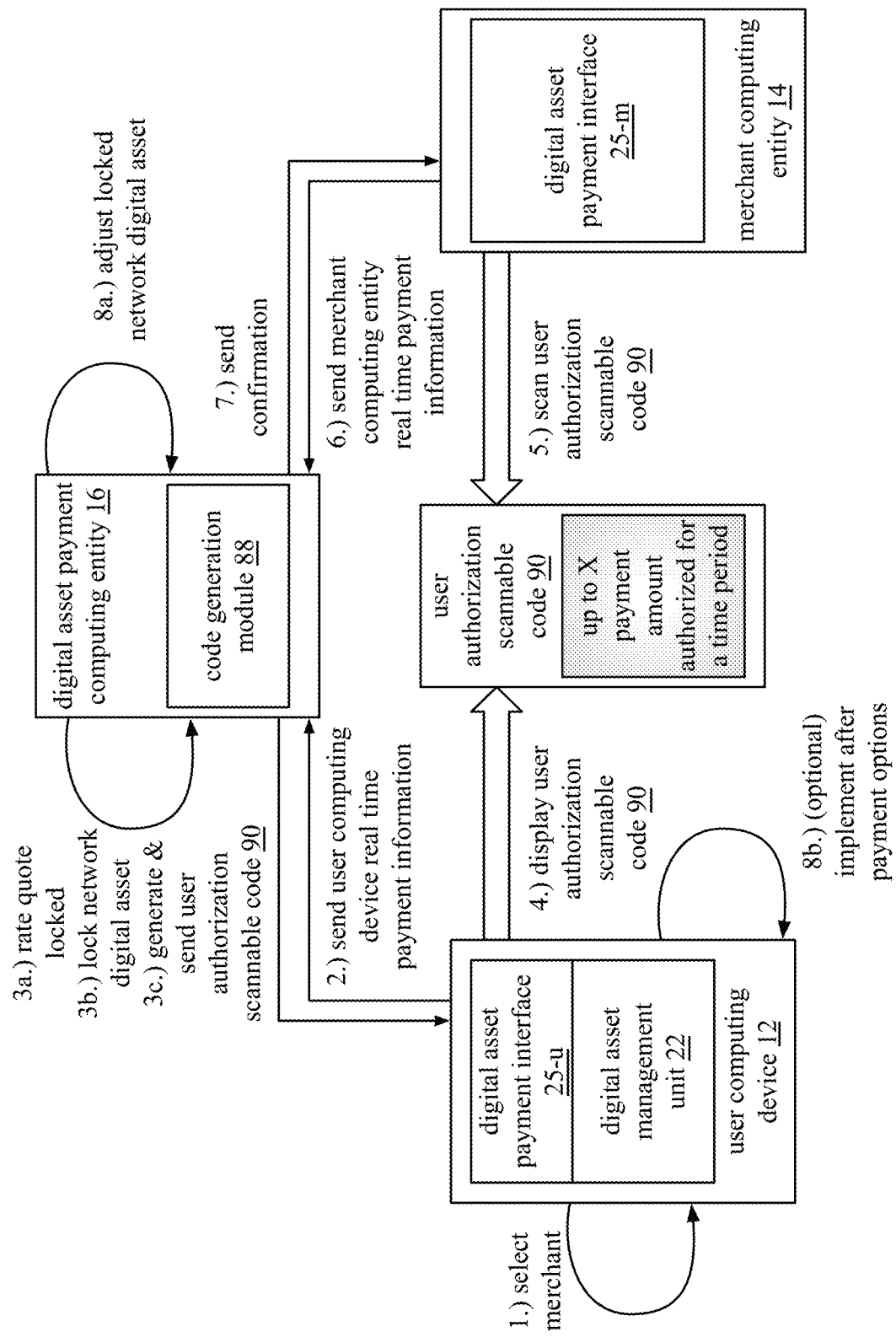
FIG. 8 is a flowchart of an example of a method for a show to pay payment mode of a digital asset payment network in accordance with the present disclosure.

FIG. 8 is a flowchart of an example of a method for a show to pay payment mode of a digital asset payment network. FIG. 8 includes the user computing device 12, the merchant computing entity 14, and the digital asset payment computing entity 16 of a digital asset payment network. The user computing device 12 includes a digital asset management unit 22 that includes a digital asset payment interface 25-u that interfaces with the digital asset payment computing entity 16 and is coupled to one or more scanning devices.

The merchant computing entity 14 includes a digital asset payment interface 25-m that interfaces with the digital asset payment computing entity 16. In this example, the merchant computing entity 14 is a merchant POS device that includes one or more scanning devices.

The digital asset payment computing entity 16 includes a code generation module 88 operable to generate and send scannable codes containing digital asset payment authorization information to one or more of the user computing device 12 and the merchant computing entity 14. A scannable code may be a one-dimensional barcode, a two-dimensional barcode (e.g., a QR code), or any type of scannable/graphical code that can be scanned and/or read.

For a show to pay payment mode, the method begins with step 1 where the user computing device 12 selects a merchant to pay via a merchant selection module of the digital asset payment interface 25-u. For example, the user computing device is in a merchant's brick and mortar store and selects the merchant from a merchant list displayed based on user computing device GPS information (e.g., closest merchants are listed first). The method continues with step 2 where selecting the merchant sends user computing device real-time payment information to the digital asset payment computing entity 16.

The user computing device real-time payment information includes a user identifier (ID) and a type of digital asset to use in a real-time payment to the merchant computing entity 14. For example, when the user computing device 12 selects a merchant, the user may also select a specific digital asset (e.g., Bitcoin) to use. Alternatively, a preferred digital asset is stored as a default payment method. The user computing device real-time payment information may include other metadata such as user loyalty information (e.g., a user's customer loyalty account number associated with the merchant), user account information associated with a merchant (e.g., username, password, etc.), personal information (e.g., address, name, etc.), shipping details, etc.

The method continues with steps 3a-3c which may occur concurrently or in a different order (e.g., step 3b occurs slightly before step 3a). In step 3a, the digital asset payment computing entity 16 locks the rate quote for the digital asset selected by the user computing device 12 such that the rate quote presented to the user computing device 12 (via the digital asset balance in US dollars or other digital asset) is what is used for the real-time payment even if the rate fluctuates during that time.

The method continues with step 3b where the digital asset payment computing entity 16 locks an amount of network digital asset (e.g., that was deposited by the digital asset management company associated with the digital asset management unit 22) as collateral for the real-time digital asset payment. The amount of network digital asset locked may be based on the user computing device 12 (e.g., how much the user computing device typically spends, how much digital asset the user computing device has in the digital asset management unit, etc.) and/or the merchant computing entity 14 (e.g., what type of products the merchant sells, an average price point of items the merchant sells, a default collateral amount the merchant requires, etc.).

The method continues with step 3c where the code generation module 88 of the digital asset payment computing entity 16 generates and sends a user authorization scannable code 90 to the user computing device 12. The format of the user authorization scannable code generated depends on the POS requirements of the merchant computing entity. For example, the user authorization scannable code generated depends on the scanning technology used by the merchant computing entity. A merchant may also require the digital asset payment computing entity 16 to generate and send a verification code along with a user authorization scannable code 90. For example, a verification code is an alpha numeric code that can be manually entered or scanned by the merchant computing entity.

If a verification code is required, the code generation module 88 generates and sends a temporary verification code along with the user authorization scannable code 90 to the user computing device 12. The user authorization scannable code 90 authorizes a purchase for up to a certain amount (e.g., X amount) for a time period (e.g., 5-30 seconds). The certain amount authorized may be based on one or more of the amount of network digital asset locked, the user computing device 12, and the merchant computing entity 14.

The time period may be a few seconds up to a few minutes of time depending on the user computing device 12, the type of payment, and/or the merchant computing entity 14. For example, a fast food retail payment may have a shorter time period than a car purchase payment because the car purchase may involve lengthy paperwork and identity verification checks coinciding with payment. If the time period expires prior to real-time payment confirmation, the user authorization scannable code 90 will no longer be valid and the user computing device will need to request a new user authorization scannable code. Alternatively, the digital asset payment computing entity 16 may automatically send a new user authorization scannable code to the user computing device 12 every few seconds for a time period (e.g., up to 5 minutes) before the user computing device 12 would need to request a new user authorization scannable code.

The method continues with step 4 where the user computing device 12 displays the user authorization scannable code 90 (via the scannable code module of the digital asset payment interface 25-u) on a display of the user computing device 12. The method continues with step 5 where the merchant computing entity 14 is operable to scan the user authorization scannable code 90 via a scanning device of the merchant computing entity 14. For example, a user of the user computing device 12 places the user computing device 12 display near a scanning device of the merchant computing entity 14 (e.g., the merchant computing entity 14 is a tablet and the scanning device is a front or back camera) for the merchant computing entity 14 to capture the user authorization scannable code 90. In that example, the merchant computing entity 14 may be an unattended POS register (e.g., at a retail kiosk, self-checkout location, a gas pump checkout, a vending machine, etc.).

As another example, the merchant computing entity 14 is a POS register that includes a handheld scanning device (e.g., a barcode scanner, a smart phone camera, etc.). The user of the user computing device 12 presents the user authorization scannable code 90 to an attendant of the merchant computing entity 14, and the attendant scans the user authorization scannable code 90 with the handheld scanning device.

If user metadata is included in the user authorization scannable code 90, the merchant computing entity 14 is operable to view that metadata upon scanning. For example, the user's loyalty information applies a discount to the total amount owed. As another example, a user's shipping information adjusts the shipping rate applied to the total amount owed. As another example, the user metadata authorizes a future and/or reoccurring charge (e.g., the merchant is a hotel and requires a payment method "on file"). In that example, the merchant computing entity is authorized to store limited user computing device 12 information such that the merchant computing entity can send a future request for payment to the digital asset payment computing entity when a future payment is due. The digital asset payment computing entity receives that request from the merchant computing entity and generates a push notification to send to the user computing device where the user computing device can authorize the future payment via the push notification. Authorizing a payment through a push notification is discussed in further detail with reference to FIGS. 20-21.

The method continues with step 6 where, when the merchant computing entity 14 scans the user authorization scannable code 90, the merchant computing entity 14 sends merchant computing entity real-time payment information to the digital asset payment computing entity 16. The merchant computing entity real-time payment information includes a merchant identifier (ID) and a type of desired digital asset (e.g., a fiat currency, a different cryptocurrency, etc.) it wishes to receive in the real-time payment from the user computing device 12. The merchant computing entity real-time payment information also includes the amount of the real-time payment in this example. The merchant computing entity real-time payment information may include other information and/or metadata such as discounts offered and/or applied, shipping details (rates, method, etc.), bill splitting options, etc.

When the digital asset payment computing entity 16 receives both the user computing device real-time payment information and the merchant computing entity real-time payment information and the network digital asset has been locked for the payment, the method continues with step 7 where the digital asset payment computing entity 16 provides a confirmation to the merchant computing entity 14 that the real-time payment is approved.

The method continues with step 8a where the digital asset payment computing entity 16 adjusts the amount of locked network digital asset-based on the amount of the real-time payment. The user authorization scannable code 90 implies authorization of payment to the merchant computing entity 14 but funds are not necessarily pulled from the user computing device 12 for a time period. As such, the method continues with an optional step 8b where the user computing device 12 has a certain amount of time (a few seconds to up to five minutes) to implement after-payment options. The after-payment options include switching between digital asset management units, switching the type of digital asset used, adding a tip, splitting the bill, moving items for purchase between users, etc. Further, because funds are not pulled immediately, if a network connection issue occurs (e.g., internet connection is lost for a few seconds) after payment confirmation, funds can be pulled when the network connection is reestablished. The method continues with steps similar to steps 36-44 of FIG. 2 and 38-44 of FIG. 2A.

Figure 9:
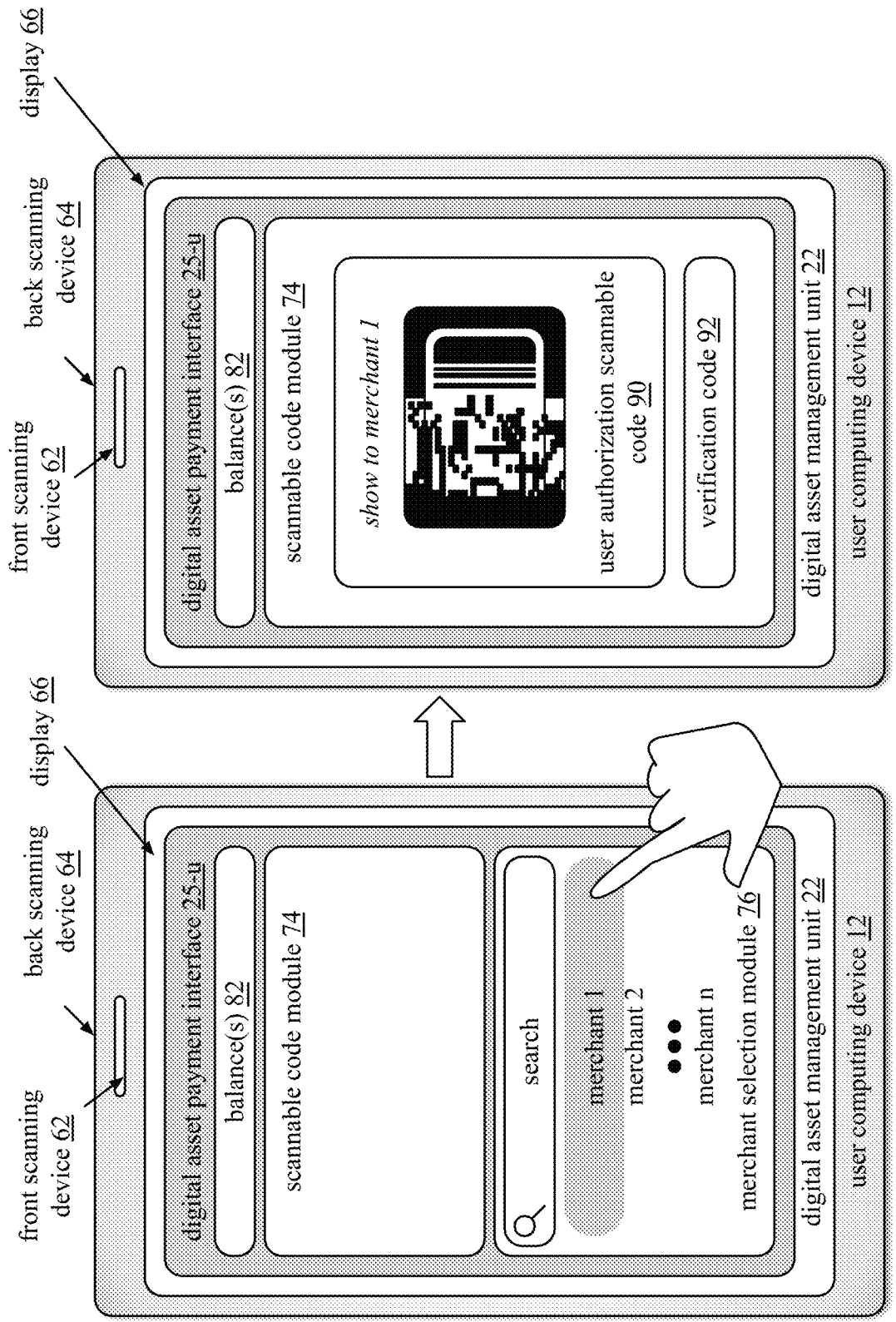
FIG. 9 is a schematic block diagram of an embodiment of a show to pay payment mode of a digital asset payment network in accordance with the present disclosure.

FIG. 9 is a schematic block diagram of an embodiment of a show to pay payment mode of a digital asset payment network. FIG. 9 depicts a user interface perspective of the user computing device 12 using the show to pay payment mode. The user computing device 12 includes the digital asset management unit 22, a display 66, a front scanning device 62, and a back scanning device 64. The digital asset management unit 22 includes a digital asset payment interface 25-u that interfaces with the digital asset payment computing entity.

In the user interface perspective, the digital asset payment interface 25-u includes the balances 82, the scannable code module 74, and the merchant selection module 76 as discussed with reference to FIGS. 6A-6B. As shown, a user of the user computing device 12 initiates a show to pay payment mode by selecting a merchant (merchant 1 in this example) from a displayed list of merchants in the merchant selection module 76. When selected, the user computing device 12 receives a user authorization code 90 and a verification code 92 (e.g., the merchant computing entity 14 requires a verification code along with the user authorization code 90 to authorize the digital asset payment network payment) from the digital asset payment computing entity. The user authorization code 90 and the verification code 92 are displayed within the scannable code module 74 of the user computing device's 12 display 66. The user computing device 12 is operable to present the user authorization code 90 and the verification code 92 to a merchant computing entity to authorize a real-time digital asset-based payment.

Figure 10:
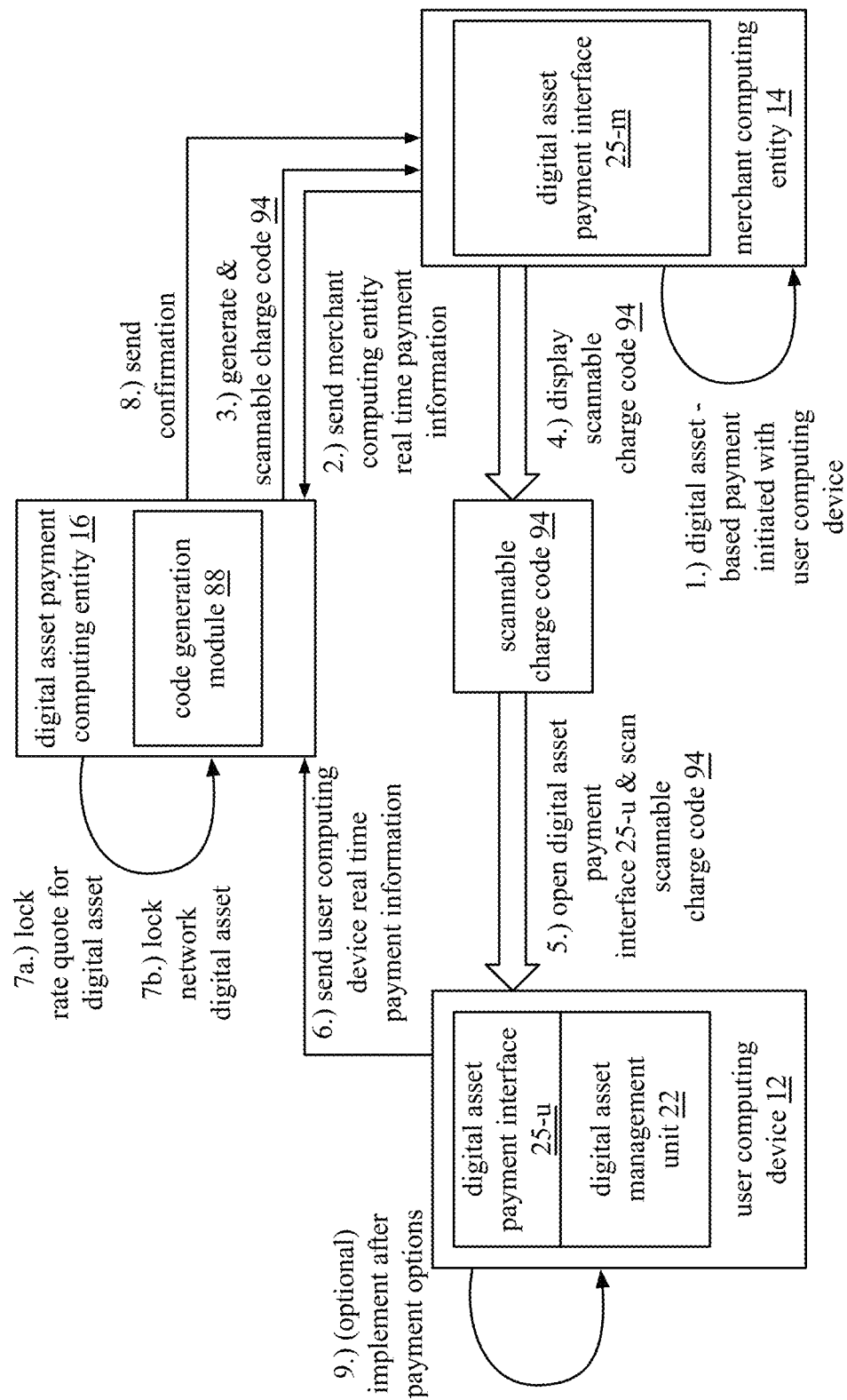
FIG. 10 is a flowchart of an example of a method for a scan to pay payment mode of a digital asset payment network in accordance with the present disclosure.

FIG. 10 is a flowchart of an example of a method for a scan to pay payment mode of the digital asset payment network. FIG. 10 includes the user computing device 12, the merchant computing entity 14, and the digital asset payment computing entity 16 of a digital asset payment network. The user computing device 12 includes a digital asset management unit 22 including a digital asset payment interface 25-u that interfaces with the digital asset payment computing entity 16 and is coupled to one or more scanning devices.

The merchant computing entity 14 includes a digital asset payment interface 25-m that interfaces with the digital asset payment computing entity 16. In this example, the merchant computing entity 14 may be any type of a merchant computing entity 14 such as a merchant POS device, an e-commerce website, an e-commerce mobile application, etc.

The digital asset payment computing entity 16 includes a code generation module 88 operable to generate and send scannable codes containing digital asset payment authorization information to one or more of the user computing device 12 and the merchant computing entity 14. A scannable code may be a one-dimensional barcode, a two-dimensional barcode (e.g., a QR code), or any type of graphical code that can be optically scanned and/or read.

For a scan to pay payment mode, the method begins with step 1 where a digital asset-based payment is initiated with the user computing device 12 by the merchant computing entity 14. For example, the merchant computing entity 14 is a POS register and one or more of the user computing device 12 and the merchant computing entity 14 select a digital asset-based payment option during checkout. As another example, the merchant computing entity 14 is an e-commerce website, and the user computing device 12 selects a digital asset-based payment option on a checkout page of the e-commerce web site.

The method continues with step 2 where, when the digital asset-based payment is initiated with the user computing device 12, the merchant computing entity 14 sends merchant computing entity real-time payment information to the digital asset payment computing entity 16. The merchant computing entity real-time payment information includes a merchant identifier (ID) and a type of desired digital asset (e.g., a fiat currency, a different cryptocurrency, etc.) it wishes to receive in the real-time payment from the user computing device 12. The merchant computing entity real-time payment information also includes the amount of the real-time payment in this example. The merchant computing entity real-time payment information may include other information and/or metadata such as discounts offered and/or applied, shipping details (rates, method, etc.), bill splitting options, a request for user computing device information, etc.

The method continues with step 3 where the code generation module 88 of the digital asset payment computing entity 16 generates and sends a scannable charge code 94 to the merchant computing entity 14. The scannable charge code 94 includes a transaction and/or terminal identifier (ID) of the merchant computing entity 14, merchant information (e.g., a merchant ID, merchant name, etc.) the amount of the payment, the digital asset requested, and other metadata. For example, scannable charge code 94 metadata includes a request for customer loyalty information, for shipping details (method, customer address), a discount applied (e.g., according to certain conditions such as when a certain digital asset is used), etc.

The method continues with step 4 where the merchant computing entity 14 displays the scannable charge code 94. For example, the merchant computing entity 14 is a POS register and displays the scannable charge code 94 on a display. As another example, the merchant computing entity 14 is a POS register and prints the scannable charge code 94 onto a receipt. As another example, the merchant computing entity 14 is an e-commerce website that presents the scannable charge code 94 on the checkout page of the e-commerce website.

The method continues with step 5 where the user computing device 12 opens a digital asset payment interface 25-u on a selected digital asset management unit 22 and scans the scannable charge code 94 via a scanning device of the user computing device 12. For example, the scanning device of the user computing device 12 scans the scannable charge code 94 presented on a display of the merchant computing entity 14 (e.g., the merchant computing entity 14 is a POS register). As another example, the scanning device of the user computing device 12 scans the scannable charge code 94 presented on a receipt of the merchant computing entity 14 (e.g., the merchant computing entity 14 is a POS register that printed the scannable charge code 94 onto a receipt).

As another example, the user of the user computing device 12 uses another user computing device (e.g., a laptop or desktop computer) to access an e-commerce website. The scannable charge code 94 is presented on a checkout page on the e-commerce website where the scanning device of the user computing device 12 is operable to scan the scannable charge code 94.

The scannable code module interprets the scanned scannable charge code 94 and may display merchant requests included in the scannable charge code information to the user computing device 12 such as a request for a shipping address and shipping method, a request for customer loyalty information, discount information, etc.

The method continues with step 6 where scanning the scannable charge code 94 sends user computing device real-time payment information to the digital asset payment computing entity 16. The user computing device real-time payment information includes a user identifier (ID) and a type of digital asset to use in a real-time payment to the merchant computing entity 14.

When merchant requests are displayed to the user computing device 12, the user computing device real-time payment information may further include user inputs in response to those merchant requests (e.g., the user computing device 12 enters in customer loyalty information, shipping details, etc.).

The method continues with steps 7a-7b which may occur concurrently or in a different order (e.g., step 7b occurs slightly before step 7a). In step 7a, the digital asset payment computing entity 16 locks the rate quote for the digital asset selected by the user computing device 12 such that the rate quote presented to the user computing device 12 (via the digital asset balance in US dollars or other digital asset) is what is used for the real-time payment even if the rate fluctuates during that time.

The method continues with step 7b where the digital asset payment computing entity 16 locks an amount of network digital asset (e.g., that was deposited by the digital asset management company associated with the digital asset management unit 22) as collateral for the digital asset payment. The amount of network digital asset locked may be based on the user computing device 12 (e.g., how much the user computing device typically spends, how much digital asset the user computing device has in the digital asset management unit, etc.) and/or the merchant computing 14 (e.g., what type of products the merchant sells, an average price point of items the merchant sells, a default collateral amount the merchant requires, etc.). In this example, the amount of the payment is known, therefore the amount of the network digital asset locked is based on that amount.

When the digital asset payment computing entity 16 receives both the user computing device real-time payment information and the merchant computing entity real-time payment information and the network digital asset has been locked for the payment, the method continues with step 8 where the digital asset payment computing entity 16 provides a confirmation to the merchant computing entity 14 that the real-time payment is approved.

The scannable charge code 94 implies authorization of payment to the merchant computing entity 14 but funds are not necessarily pulled from the user computing device 12 for a few seconds or more. As such, the method continues with an optional step 10 where the user computing device 12 has a time period (e.g., a few second or more) to implement after-payment options (e.g., switch between digital asset management units, switch the type of digital asset used, etc.). The method continues with steps similar to steps 36-44 of FIG. 2 and 38-44 of FIG. 2A.

Figure 11:
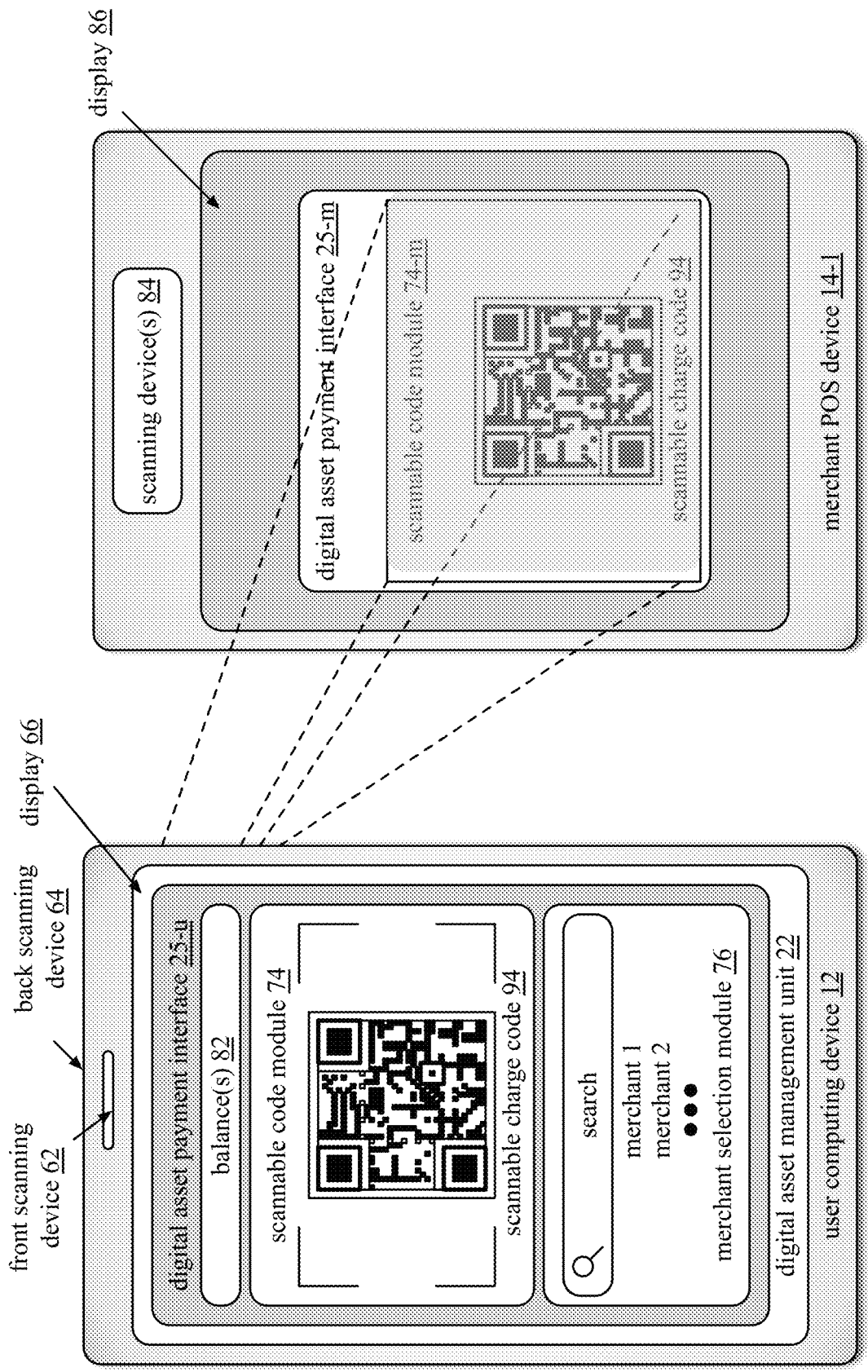
FIG. 11 is a schematic block diagram of an embodiment of a scan to pay payment mode of a digital asset payment network in accordance with the present disclosure.

FIG. 11 is a schematic block diagram of an embodiment of a scan to pay payment mode of a digital asset payment network. FIG. 11 depicts a user interface perspective of the user computing device 12 and a merchant computing entity (merchant POS device 14-1) using the scan to pay payment mode. The user computing device 12 includes the digital asset management unit 22, a display 66, a front scanning device 62, and a back scanning device 64. The digital asset management unit 22 includes a digital asset payment interface 25-*u* that interfaces with the digital asset payment computing entity.

In the user interface perspective, the digital asset payment interface 25-*u* includes balances 82, the scannable code module 74, and the merchant selection module 76 as discussed with reference to FIGS. 6A-6B. In this example, the merchant computing entity is a merchant POS device 14-1 that includes scanning device(s) 84 and a display 86. For example, the merchant POS device 14-1 is a tablet enabled as a register.

The merchant POS device 14-1 includes a digital asset payment interface 25-*m* that interfaces with the digital asset payment computing entity. The digital asset payment interface 25-*m* includes a scannable code module 74-*m* coupled to the scanning device(s) 84. The scannable code module 74-*m* is operable to receive scannable codes (e.g., from the digital asset payment computing entity), scan scannable codes (e.g., capture via the scanning device(s) 84, digitize, and bring into a frame of reference), display scannable codes on the display 86, and interpret scannable codes to determine and/or display payment information.

As shown, the merchant POS device 14-1 displays a scannable charge code 94 on a display 86 of the merchant POS device 14-1 for use in a digital asset-based payment. As another example, the merchant POS device 14-1 prints a scannable charge code 94 (e.g., onto a receipt) and provides the printed scannable charge code 94 to the user computing device 12. In that example, the merchant POS device 14-1 may not include a display 86 and operate similar to a traditional POS register.

Within the digital asset payment interface 25-*u*, the user computing device 12 is operable to scan the scannable charge code 94 via the back scanning device 64 in this example (e.g., the back camera of a smart phone). The scannable code module 74 digitizes the scannable charge code 94 and brings the scannable charge code 94 into a frame of reference. The scannable code module 74 analyzes information in the scannable charge code 94 and presents the information to the user when needed. If the scannable charge code 94 includes requests and/or notifications from the merchant computing entity, those requests and/or notifications are displayed in the scannable code module 74 or another portion of the display 66. While the merchant selection module 76 is shown here, it may collapse out of view during a scanning function. Many user interface views are possible within the digital asset payment interface 25-*u* in addition to what is shown.

Figure 12:
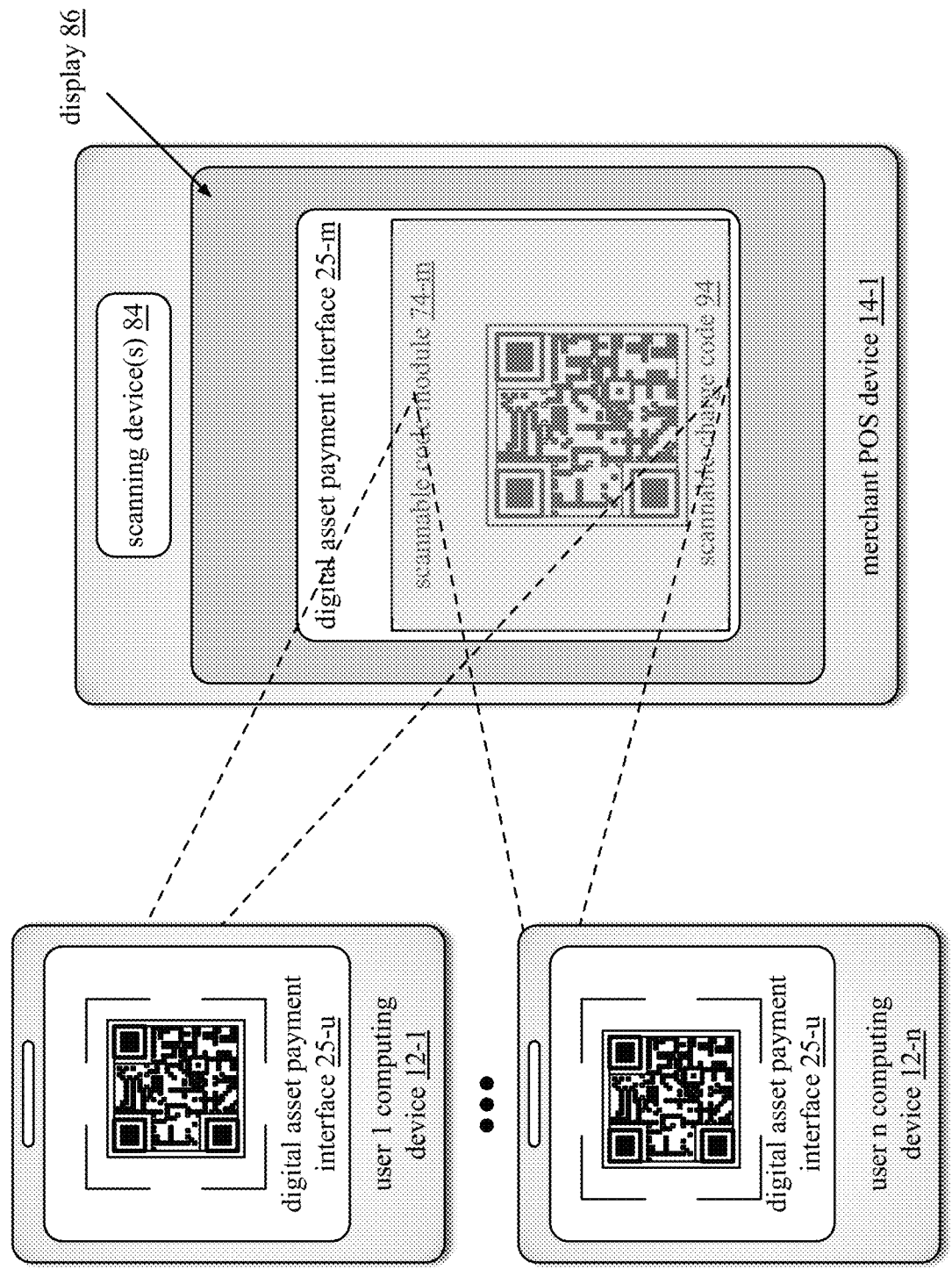
FIG. 12 is a schematic block diagram of another embodiment of a scan to pay payment mode of a digital asset payment network in accordance with the present disclosure.

FIG. 12 is a schematic block diagram of another embodiment of a scan to pay payment mode of the digital asset payment network that includes a user 1 computing device 12-1 through a user n computing device 12-*n* and a merchant computing entity (merchant POS device 14-1). FIG. 12 depicts a user interface perspective of the user computing devices 12-1 through 12-*n* and the merchant computing entity using the scan to pay payment mode. The user computing devices 12-1 through 12-*n* are shown including a simplified view of the digital asset payment interface 25-*u* performing a scanning function.

In this example, the merchant computing entity shown is a merchant POS device 14-1 that includes scanning device(s) 84 and a display 86. The merchant POS device 14-1 includes a digital asset payment interface 25-*m* that interfaces with the digital asset payment computing entity. The digital asset payment interface 25-*m* includes a scannable code module 74-*m* coupled to the scanning device(s) 84. The scannable code module 74-*m* is operable to receive scannable codes (e.g., from the digital asset payment computing entity), scan scannable codes (e.g., capture via the scanning device(s) 84, digitize, and bring into a frame of reference), display scannable codes on the display 86, and interpret scannable codes to determine and/or display payment information.

As shown, the merchant POS device 14-1 displays a scannable charge code 94 on a display 86 of the merchant computing entity 14 for use in a digital asset-based payment. As another example, the merchant POS device 14-1 prints a scannable charge code 94 (e.g., onto a receipt) and provides the printed scannable charge code 94 to the user computing devices 12-1 through 12-n. In that example, the merchant POS device 14-1 may not include a display 86.

Within the digital asset payment interfaces 25-u, the user computing devices 12-1 through 12-n are each operable to scan the scannable charge code 94 via a back scanning device in this example (e.g., the back camera of a smart phone). The scannable code modules of the digital asset payment interfaces 25-u digitize the scannable charge code 94 and bring it into a frame of reference. The scannable code modules analyze information in the scannable charge code 94 and present the information to the users when needed. If the scannable charge code 94 includes requests and/or notifications from the merchant computing entity 14, those requests and/or notifications are displayed in the scannable code module or another portion of the user computing devices 12-1 through 12-n displays.

With more than one user computing device operable to scan a scannable charge code, multiple payment options are possible (e.g., bill splitting at a restaurant, etc.). For example, depending on how many user computing devices scan the scannable charge code 94, the payment is automatically split accordingly (e.g., split equally between the users). As another example, when more than one user computing device scans a scannable charge code 94, various bill splitting options (e.g., an equal split, custom, tip adding, etc.) may be selected or automatically shown.

While the user computing devices 12-1 through 12-n are shown scanning the scannable charge code 94, a user computing device is operable to scan the scannable charge code 94 and send a request to another user computing device to split the payment. Alternatively, the user computing device is operable to scan and send the scannable charge code 94 to another user computing device having a digital asset payment interface 25-u.

Figure 13:
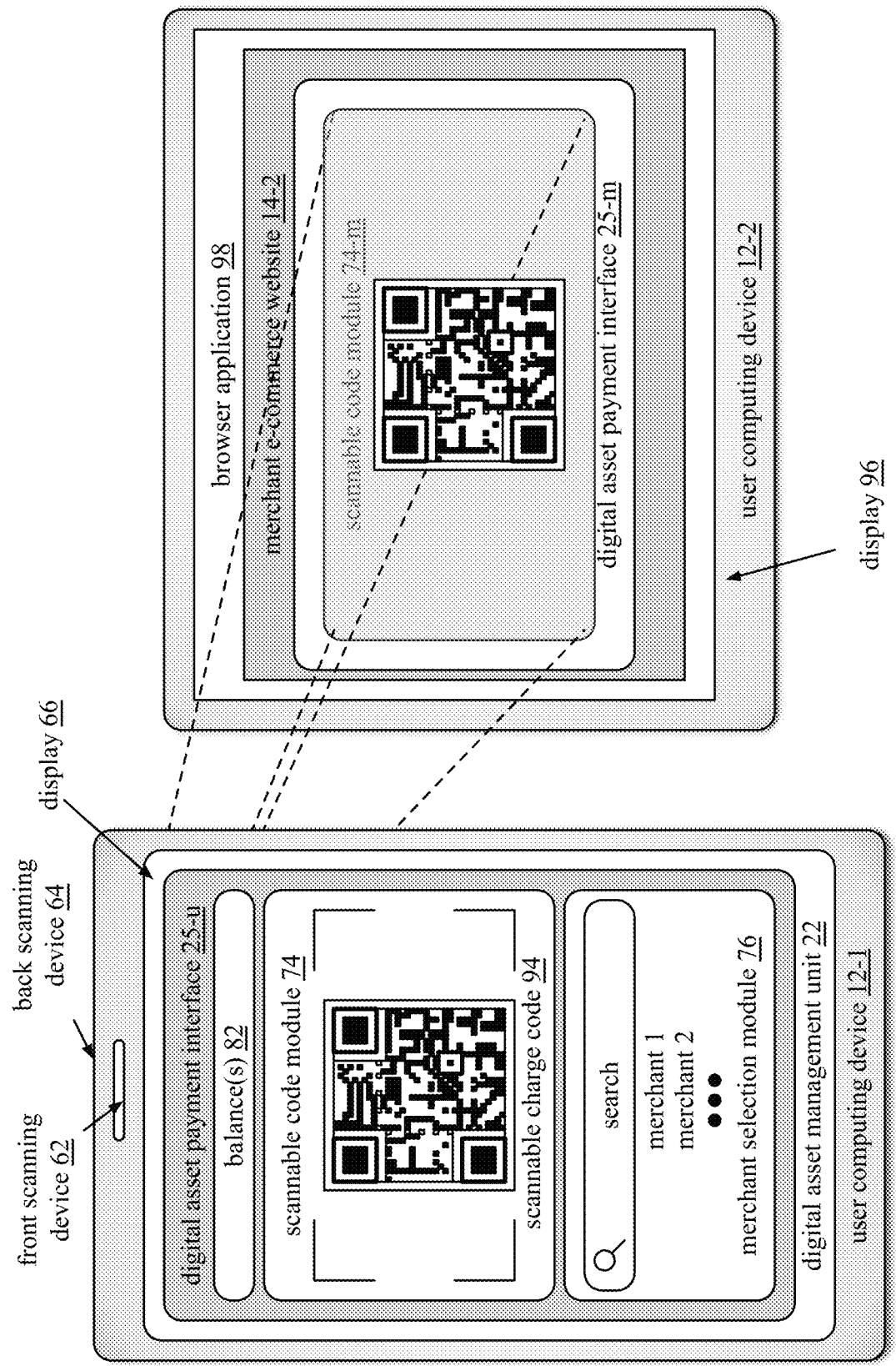
FIG. 13 is a schematic block diagram of another embodiment of a scan to pay payment mode of a digital asset payment network in accordance with the present disclosure.

FIG. 13 is a schematic block diagram of another embodiment of a scan to pay payment mode of the digital asset payment network. FIG. 13 depicts a user interface perspective of a first user computing device 12-1, a second user computing device 12-2, and a merchant computing entity (merchant e-commerce website 14-2) using the scan to pay payment mode. The first user computing device 12-1 includes the digital asset management unit 22, a display 66, a front scanning device 62, and a back scanning device 64. The digital asset management unit 22 includes a digital asset payment interface 25-u that interfaces with the digital asset payment computing entity.

In the user interface perspective, the digital asset payment interface 25-u includes balances 82, the scannable code module 74, and the merchant selection module 76 as discussed with reference to FIGS. 6A-6B. In this example, the merchant computing entity is the merchant e-commerce website 14-2 that includes a digital asset payment interface 25-m that interfaces with the digital asset payment computing entity. The digital asset payment interface 25-m includes a scannable code module 74-m operable to receive scannable/graphical codes (e.g., from the digital asset payment computing entity) and display scannable codes.

The second user computing device 12-2 is associated with the same user of the first user computing device 12-1 and may be a laptop computer, a desktop computer, a smart phone, a tablet, etc. The second user computing device 12-2 includes a display 96 and an internet browser application 98 operable to access the merchant e-commerce website 14-2 (e.g., via a network connection).

Initiating a digital asset-based payment on the merchant e-commerce website 14-2 opens the digital asset payment interface 25-m. The second user computing device 12-2, therefore, is operable to display a scannable charge code 94 from the scannable code module 74-m of the digital asset payment interface 25-m on the display 96 of the second user computing device 12-2.

The first user computing device 12-1 is operable to scan the scannable charge code 94 displayed on the second user computing device 12-2 via the back scanning device 64 in this example (e.g., the back camera of a smart phone). The scannable code module 74 digitizes the scannable charge code 94 and brings it into a frame of reference. The scannable code module 74 analyzes information in the scannable charge code 94 and presents the information to the user when necessary. If the scannable charge code 94 includes requests and/or notifications from the merchant e-commerce website 14-2, those requests and/or notifications are displayed in the scannable code module 74 or another portion of the display 66. While the merchant selection module 76 is shown here, it may collapse out of view during a scanning function.

Figures 14A, 14B:
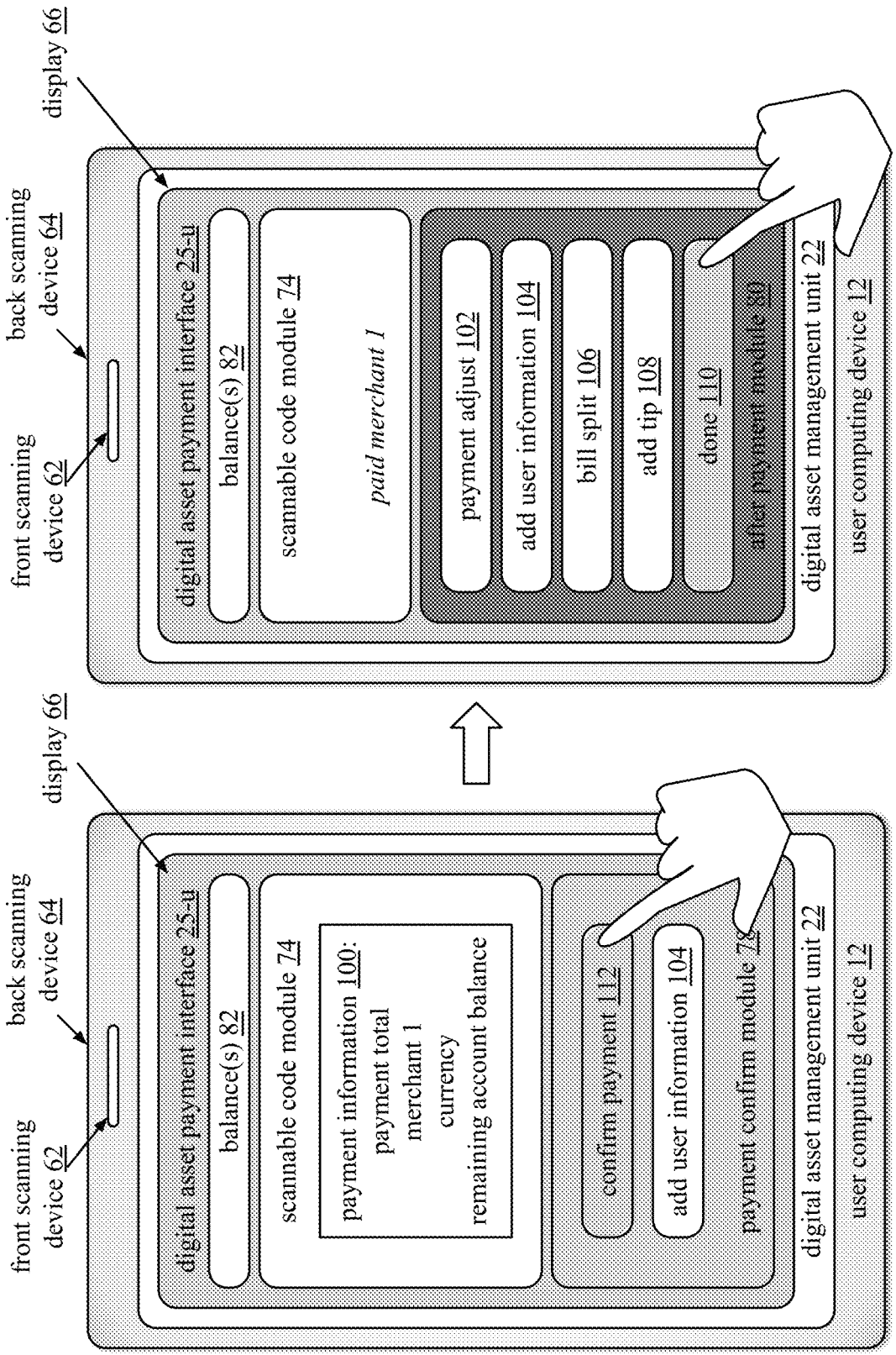
FIGS. 14A-14B are schematic block diagrams of another embodiment of a scan to pay payment mode of the digital asset payment network in accordance with the present disclosure.

FIGS. 14A-14B are schematic block diagrams of another embodiment of a scan to pay payment mode of the digital asset payment network. FIGS. 14A-14B depict a user interface perspective of the user computing device 12 after a scannable charge code has been scanned and interpreted in a scan to pay payment mode. The user computing device 12 includes the digital asset management unit 22, a display 66, a front scanning device 62, and a back scanning device 64. The digital asset management unit 22 includes a digital asset payment interface 25-u that interfaces with the digital asset payment computing entity.

In the user interface perspective, the digital asset payment interface 25-u includes balances 82 and the scannable code module 74 as discussed with reference to FIGS. 6A-6B and also includes a payment confirm module 78. In FIG. 14A, a scannable charge code has been scanned and interpreted by the scannable code module 74. The scannable code module 74 may display a summary of the payment information 100 interpreted from the scannable charge code. For example, the payment information 100 includes the payment total, the merchant paid (e.g., merchant 1), the digital asset used, and a remaining account balance of the digital asset used. The payment information 100 may also include one or more requests (e.g., one or more fields for user data input) for user information (e.g., customer loyalty information, shipping details, coupons, etc.).

The payment confirm module 74 in the user interface perspective is visible after a scannable charge code is scanned and interpreted where payment confirmation options are presented. For example, the payment confirm module 78 includes a confirm payment 112 option and an add user information 104 option however more or less options are possible. When the scannable charge code includes one or more requests for user information, one or more fields for user data input may be displayed via the payment confirm module 78 or the scannable code module 74 as mentioned above.

In this example, a user of the user computing device 12 selects the confirm payment 112 option. In an alternative example, when no additional user information is requested and/or according to a default payment setting, scanning the scannable charge code completes the purchase with no need to confirm the payment.

After a payment is confirmed, the user computing device 12 has a certain amount of time (a few seconds to up to five minutes) to implement after-payment options. For example, FIG. 14B shows that after the payment is confirmed (automatically or by user input), the digital asset payment interface 25-u displays an after-payment module 80. Options within the after-payment module 80 may not be available after the certain amount of time is complete.

Alternatively, when no after-payment options are available or according to a default payment setting, no after-payment module is displayed, and the payment is complete. As another example, options of the after-payment module 80 are not displayed until selected and/or requested by the user of the user computing device (e.g., via a drop down menu, initiating a digital asset change, etc.).

The after-payment module 80 includes a payment adjust 102 option, an add user information 104 option, a bill split 106 option, an add tip 108 option, and a done 110 option. The after-payment module 80 may include more or less options depending on the type of payment, the item(s) purchased, and the merchant (e.g., based on metadata included in the scannable charge code scanned).

For example, when the merchant is a restaurant, the after-payment module 80 may present the bill split 106 option, the add tip 108 option, and the done 110 option. As another example, when the merchant is a retail store, the after-payment module 80 may present the add user information 104 option (e.g., add shipping details) and the done 110 option. As another example, no after-payment options are shown, and the payment is complete.

In this example, the user of the user computing device 12 selects the done 110 option of the after-payment module 80 to complete the payment. The digital asset payment interface 25-u may display a message that the merchant involved was paid successfully (e.g., as shown here within the scannable code module 74).

FIGS. 15A-15D are schematic block diagrams of an embodiment of a scan to pay payment mode with shipping options. FIGS. 15A-15D depict a user interface perspective of the user computing device 12 after a scannable charge code has been scanned and interpreted in a scan to pay payment mode. The user computing device 12 includes the digital asset management unit 22, a display 66, a front scanning device 62, and a back scanning device 64. The digital asset management unit 22 includes a digital asset payment interface 25-u that interfaces with the digital asset payment computing entity.

Figures 15A, 15B:
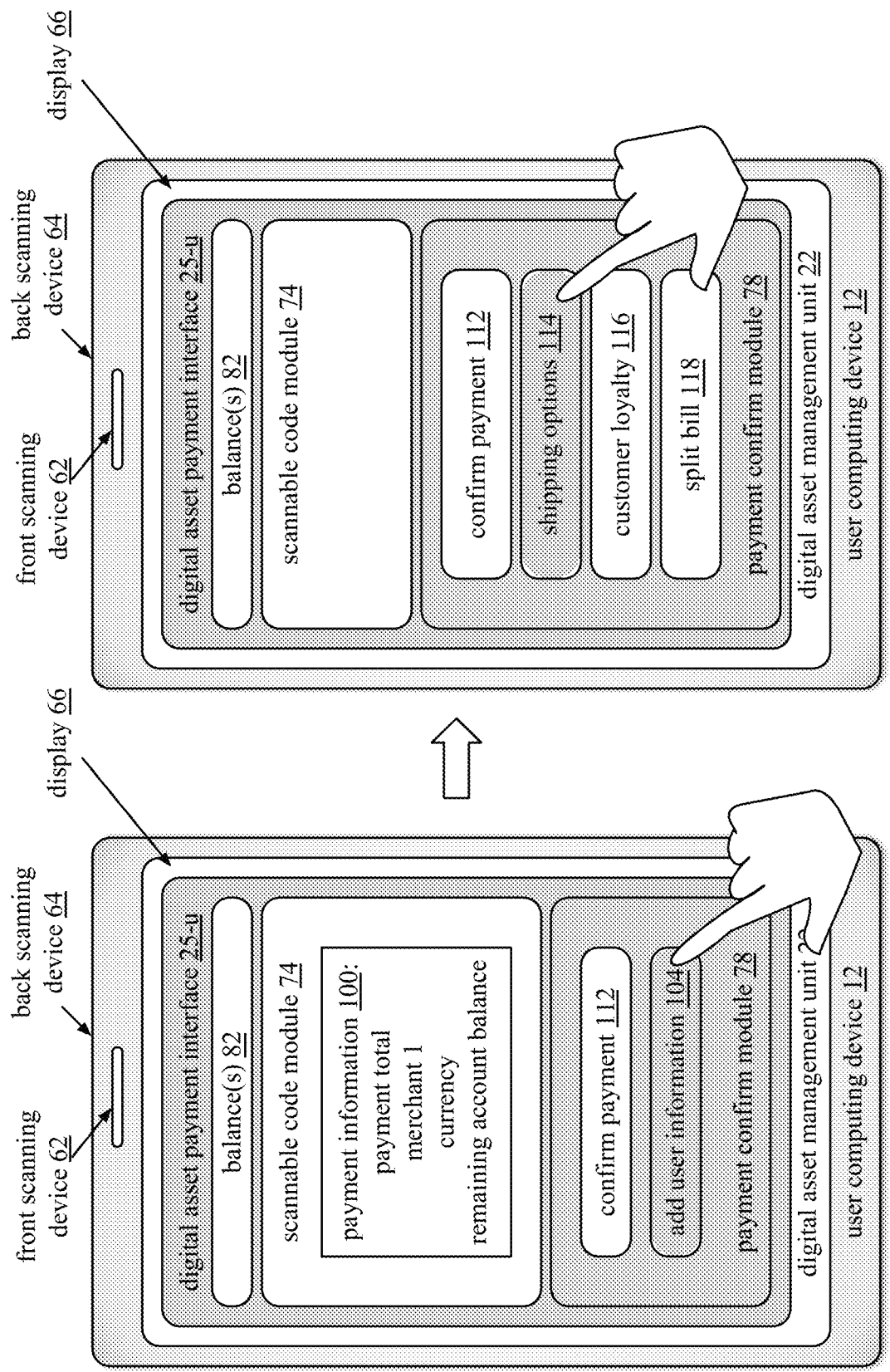

In the user interface perspective, the digital asset payment interface 25-u includes balances 82 and the scannable code module 74 as discussed with reference to FIGS. 6A-6B and also includes a payment confirm module 78. In FIG. 15A, a scannable charge code has been scanned and interpreted. The scannable code module 74 may show a summary of the payment information 100 interpreted from the scannable charge code. For example, the payment information 100 includes the payment total, the merchant paid (e.g., merchant 1), the digital asset used, and a remaining account balance of the digital asset used. The payment information 100 may also include one or more requests (e.g., one or more fields for user data input) for user information (e.g., customer loyalty information, shipping details, coupons, etc.).

The payment confirm module 74 in the user interface perspective is visible after a scannable charge code is scanned and presents payment confirm options. For example, the payment confirm module 78 includes a confirm payment 112 option and an add user information 104 option however more or less options are possible. When the scannable charge code includes a request for user information, a field for user data input may be provided in the payment confirm module 78 or the scannable code module 74 as mentioned above.

In this example, a user of the user computing device 12 selects the add user information 104 option. For example, the scannable charge code did not include a request for user information however, based on the type of purchase, adding in certain user information is optional to the user.

When the add user information 104 option is selected, the payment confirm module 78 displays user information options such as shipping options 114, customer loyalty 116, split bill 118, and a confirm payment 112 option (e.g., if the user decides to not add additional information). The user information options relate to what is available based on the purchase and the merchant involved and may include more or less options than what is shown.

In this example, the user of the user computing device 12 selects the shipping options 114 option of the payment confirm module 78 to add shipping options and complete the payment. While icon links are shown, the payment confirm module 78 may include data input fields (e.g., drop down and select options, data entry fields, etc.) or other user selection methods (e.g., a swipe to reveal options, etc.).

In FIG. 15C, when the user computing device 12 selects the shipping options 114, the shipping options 114 are presented within the payment confirm module 78. For example, the shipping options 114 include addresses 120 and methods 122. In this example, the addresses 120 include a home and a work address option. For example, the digital asset payment interface 25-u is granted access to an address book stored by the user computing device to access the user's addresses. As another example, the user stores shipping and billing addresses in the digital asset payment interface 25-u for use in digital asset-based payments. As another example, a user of the user computing device 12 is prompted to enter in a preferred shipping address.

The shipping methods 122 include ground and expedited in this example and depend on what shipping methods the merchant offers. In this example, a user of the user computing device selects the home address and the expedited shipping method as shipping options 114.

In FIG. 15D, after the shipping options are selected, the payment confirm module 74 again presents a confirm payment 112 option and an add user information 104 option however more or less options are possible. In this example, the user of the user computing device 12 selects the confirm payment 112 to confirm the real time digital asset-based payment. Alternatively, when no other user information can be added, the payment may be confirmed once the shipping details are entered. Alternatively, a confirm payment option may be included in the example of FIG. 15C such that the user can add shipping options 114 and confirm payments on the same page.

FIGS. 16A-16D are schematic block diagrams of an embodiment of a scan to pay payment mode with tip options. FIGS. 16A-16D depicts a user interface perspective of the user computing device 12 after a scannable charge code has been scanned and interpreted in a scan to pay payment mode. The user computing device 12 includes the digital asset management unit 22, a display 66, a front scanning device 62, and a back scanning device 64. The digital asset management unit 22 includes a digital asset payment interface **25-*u*** that interfaces with the digital asset payment computing entity.

Figures 16A, 16B:
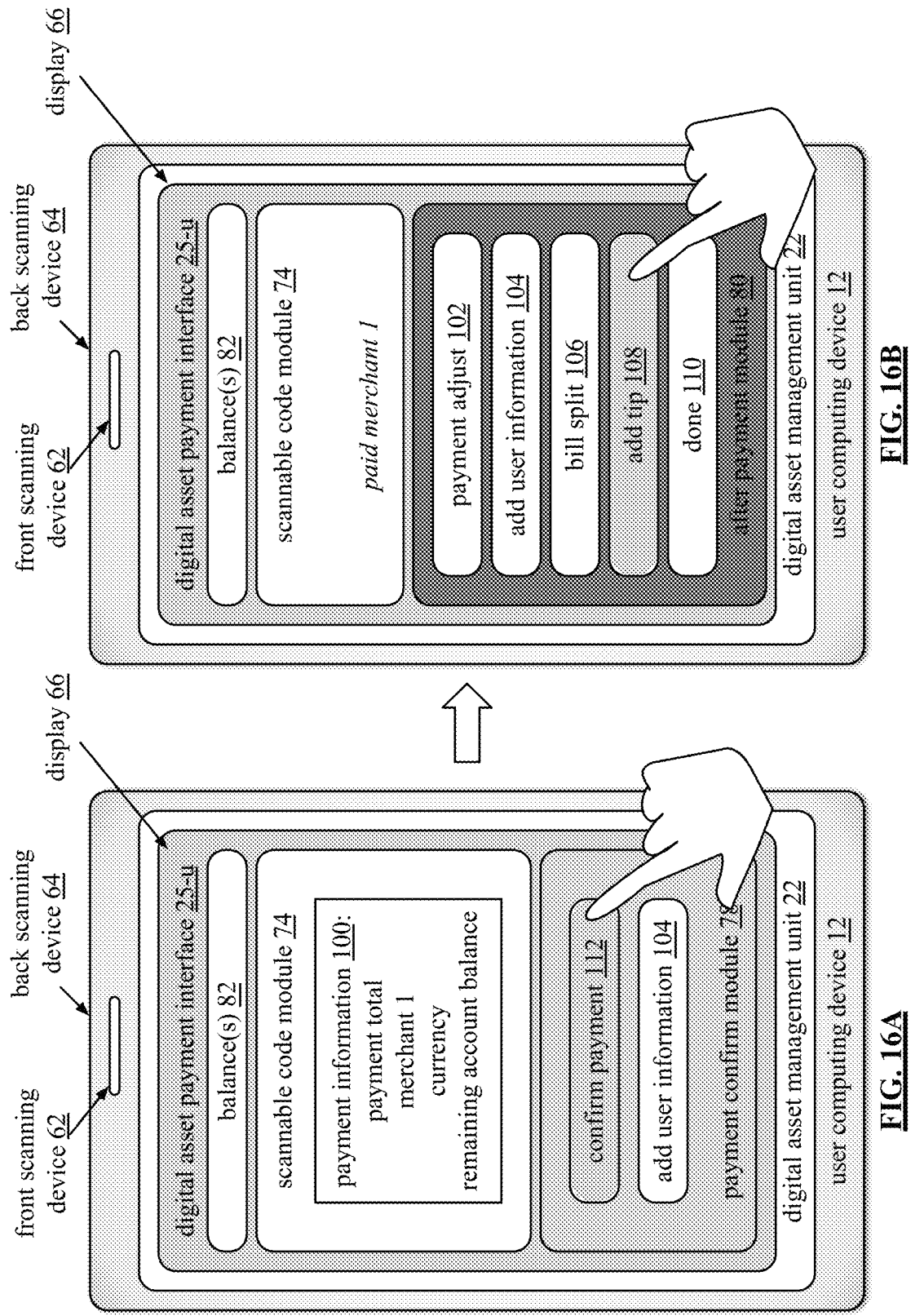

In FIG. 16A, the digital asset payment interface **25-*u* includes balances 82 and the scannable code module 74 as discussed with reference to FIGS. 6A-6B and also includes a payment confirm module 78. In this example, a scannable charge code has been scanned and interpreted. The scannable code module 74 may show a summary of the payment information 100 interpreted from the scannable charge code. For example, the payment information 100 includes the payment total, the merchant paid (e.g., merchant 1), the digital asset used, and a remaining account balance of the digital asset used. The payment information 100** may also include one or more requests (e.g., one or more fields for user data input) for user information (e.g., customer loyalty information, shipping details, coupons, etc.).

The payment confirm module 74 in the user interface perspective is visible after a scannable charge code is scanned and presents payment confirm options. For example, the payment confirm module 78 includes a confirm payment 112 option and an add user information 104 option, however, more or less options are possible. When the scannable charge code includes a request for user information, a field for user data input may be provided in the payment confirm module 78 or the scannable code module 74 as mentioned above.

In this example, a user of the user computing device 12 selects the confirm payment 112 option. In an alternative example, when no additional user information is requested and/or according to a default payment setting, scanning the scannable charge code completes the purchase with no need to confirm the payment.

In FIG. 16B, after the payment is confirmed (automatically or by user input), the digital asset payment interface **25-*u* may display an after-payment module 80. Alternatively, when no after-payment options are available or according to a default payment setting, no after-payment module is displayed, and the payment is complete. The user computing device 12 may also display a message that the merchant involved was paid successfully (e.g., as shown here within the scannable code module 74**).

The after-payment module 80 includes a payment adjust 102 option, an add user information 104 option, a bill split 106 option, an add tip 108 option, and a done 110 option. The after-payment module 80 may include more or less options depending on the type of payment, the item(s) purchased, and the merchant involved. For example, when the merchant is a restaurant, the after-payment module 80 may present the bill split 106 option, the add tip 108 option, and the done 110 option. As another example, when the merchant is a retail store, the after-payment module 80 may present the add user information 104 option and the done 110 option. As another example, no after-payment options are shown, and the payment is complete.

In this example, the user of the user computing device 12 selects the add tip 108 option of the after-payment module 80. In FIG. 16C, the after-payment module 80 displays tip options such as 20%, 25%, or an option to add a custom amount. As another example, the add tip 108 option of FIG. 16B may include a customary tip amount (e.g., add 20% tip).

In this example, the user of the user computing device 12 selects the option to add 20% tip to the payment. In FIG. 16D, the 20% tip is added to the confirmed payment and digital asset payment interface **25-*u* may display a message that tip was added successfully (e.g., as shown here within the scannable code module 74). The payment may be complete or the after-payment module 80 may display further options such as the done 110 option, bill split 106, and the payment adjust 102 as shown here. In this example, the user of the user computing device 12 selects the done 110** option to complete the payment with the added tip.

FIGS. 17A-17D are schematic block diagrams of an embodiment of a scan to pay payment mode with bill splitting options. FIGS. 17A-17D depict a user interface perspective of the user computing device 12 after a scannable charge code has been scanned and interpreted in a scan to pay payment mode. The user computing device 12 includes the digital asset management unit 22, a display 66, a front scanning device 62, and a back scanning device 64. The digital asset management unit 22 includes a digital asset payment interface **25-*u*** that interfaces with the digital asset payment computing entity.

Figure 17B:
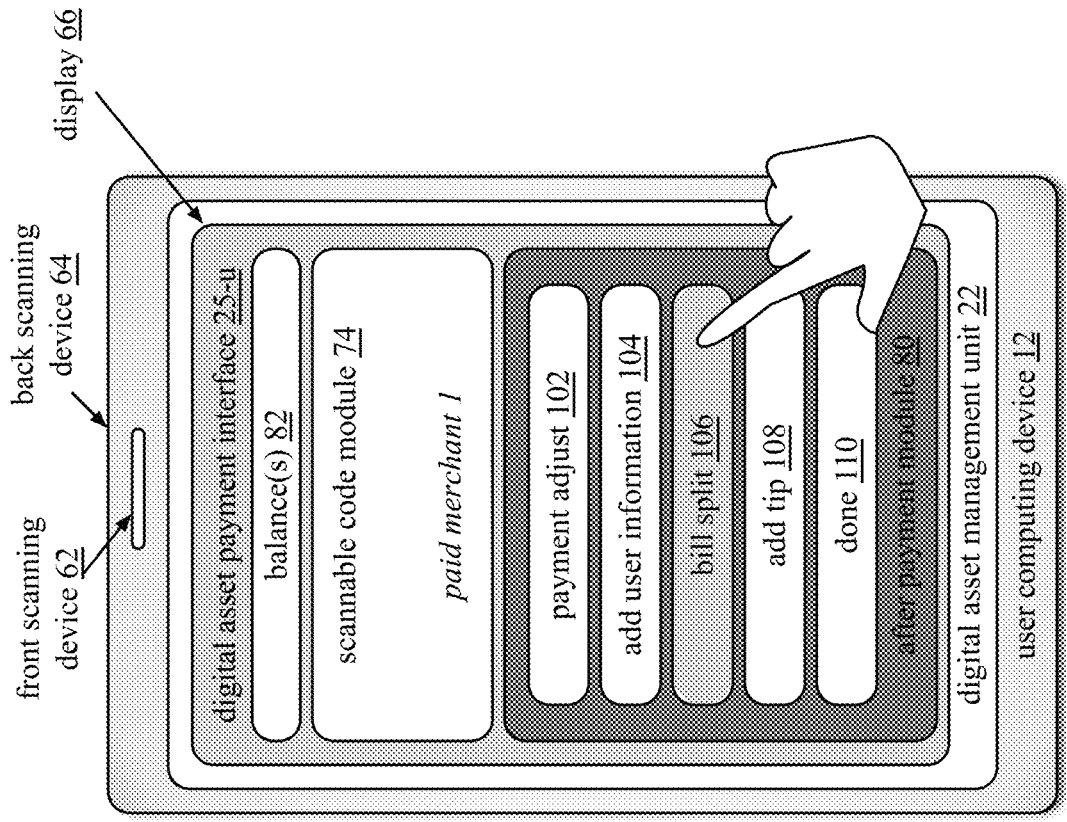
Figure 17A:
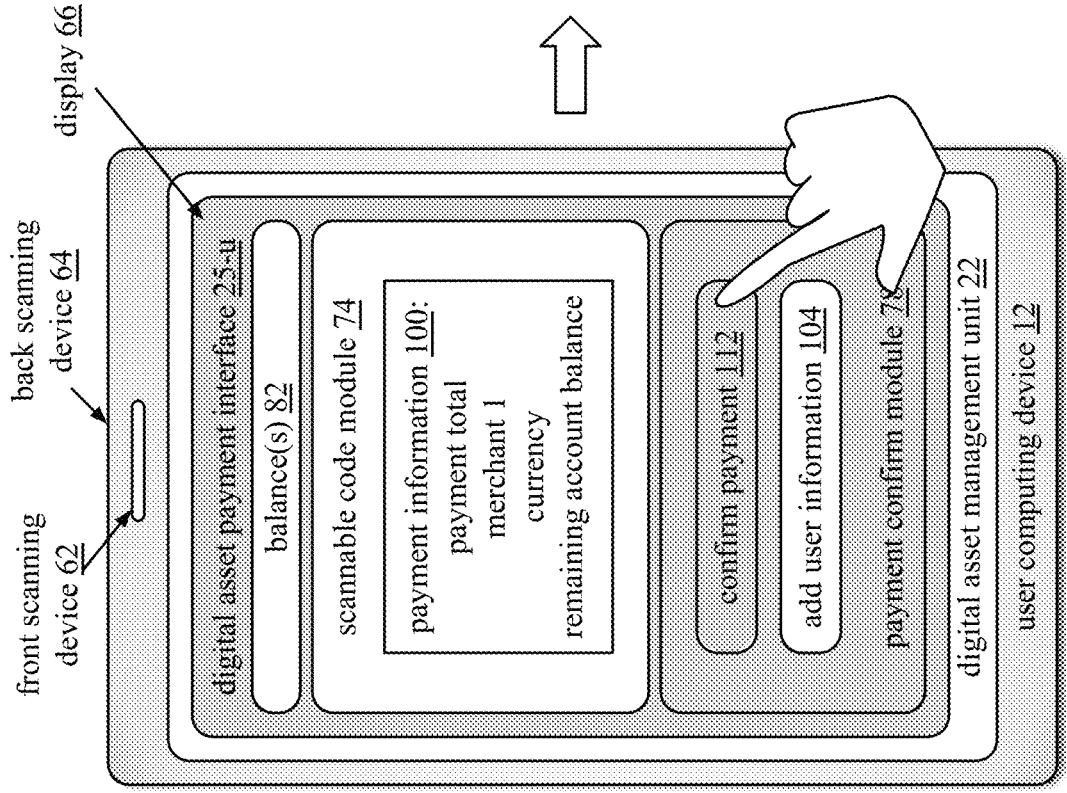

In FIG. 17A, the digital asset payment interface **25-*u* includes balances 82 and the scannable code module 74 as discussed with reference to FIGS. 6A-6B and also includes a payment confirm module 78. In this example, a scannable charge code has been scanned and interpreted. The scannable code module 74 may show a summary of the payment information 100 interpreted from the scannable charge code. For example, the payment information 100 includes the payment total, the merchant paid (e.g., merchant 1), the digital asset used, and a remaining account balance of the digital asset used. The payment information 100** may also include one or more requests (e.g., one or more fields for user data input) for user information (e.g., customer loyalty information, shipping details, coupons, etc.).

The payment confirm module 74 in the user interface perspective is visible after a scannable charge code is scanned and presents payment confirm options. For example, the payment confirm module 78 includes a confirm payment 112 option and an add user information 104 option, however, more or less options are possible. When the scannable charge code includes a request for user information, a field for user data input may be provided in the payment confirm module 78 or the scannable code module 74 as mentioned above.

In this example, a user of the user computing device 12 selects the confirm payment 112 option. In an alternative example, when no additional user information is requested and/or according to a default payment setting, scanning the scannable charge code completes the purchase with no need to confirm the payment.

In FIG. 17B, after the payment is confirmed (automatically or by user input), the digital asset payment interface **25-*u* may display an after-payment module 80. Alternatively, when no after-payment options are available or according to a default payment setting, no after-payment module is displayed, and the payment is complete. The user computing device 12 may also display a message that the merchant involved was paid successfully (e.g., as shown here within the scannable code module 74**).

The after-payment module 80 includes a payment adjust 102 option, an add user information 104 option, a bill split 106 option, an add tip 108 option, and a done 110 option. The after-payment module 80 may include more or less options depending on the type of payment, the item(s) purchased, and the merchant involved. In this example, the user of the user computing device 12 selects the bill split 106 option of the after-payment module 80. In an alternative example, when more than one user computing device scan the same scannable charge code as discussed with reference to FIG. 12, a bill splitting function may be automatically initiated prior to confirming the payment. In another embodiment, the bill split option could occur within the payment confirm module prior to payment authorization. In another example, when more than one user computing device scan the same scannable charge code bill splitting options may be listed in the payment confirm module 78 (e.g., "split with user 1 and confirm"). In another example, the bill split 106 option may list one or more users associated with the digital asset payment network located nearby.

In FIG. 17C, a user 1 has been identified and listed as an option to split the bill with (e.g., the user 1 is associated with the digital asset payment network and is located nearby, user 1 information is stored by the digital asset payment interface 25-u as a default and/or preferred party for bill splitting, the user 1 scanned the scannable charge code, the user 1 is associated with the digital asset payment network and shares a connection with the user computing device 12 (e.g., a Bluetooth connection, etc.), etc.). More than one user may be identified for bill splitting. The after-payment module 80 may display a user search module 124 where a user of the user computing device 12 can search for specific users to split a bill/payment with.

When the user 1 is identified, the after-payment module 80 displays bill split options with the user 1 such as "split with user 1" and "custom split with user 1." In this example, the user of the user computing device 12 selects the "split with user 1" option which splits the payment equally between the user 1 and the user computing device 12. For example, the bill split may occur when both the user computing device 12 and the user 1 confirm the split. Alternatively, the user computing device 12 initiates the bill split, and a request is sent to user 1 to split the bill where the user 1 can accept or decline. If declined, one or more remedy options are possible. For example, a request to pay the remaining amount is sent to the user computing device 12. Alternatively, the digital asset payment computing entity treats the declined payment as a failed transaction and consumes network digital asset associated with user 1 to cover the remaining amount.

If the custom split option was selected, the user computing device 12 could enter in a specific amount to pay. Other bill split options are possible. For example, an itemized list of items (e.g., menu items) purchased may be listed where the users can select individual items to pay for. The bill split options may also include options to add and split a tip.

The scannable charge code implies authorization of payment to the merchant computing entity, but funds are not necessarily pulled from the user computing device 12 for 5-10 seconds. If a bill splitting option is selected after funds are pulled from the user computing device 12, bill splitting may still be possible. In that example, the user computing device 12 may be able to request a reimbursement from the user 1.

In FIG. 17D, a request to split the bill is sent to the user 1, the user 1 accepts, and the bill is split successfully within a time window before funds are pulled from the user computing device 12. The digital asset payment interface 25-u may display a message that the merchant 1 was paid and that the payment was split with the user 1 (e.g., as shown here within the scannable code module 74).

The payment may be complete or the after-payment module 80 may display further options such as the payment adjust 102, add tip 108, add user information 104, and the done 110 option as shown here. In this example, the user of the user computing device 12 selects the done 110 option to complete the payment with the bill split.

Figures 18A, 18B:
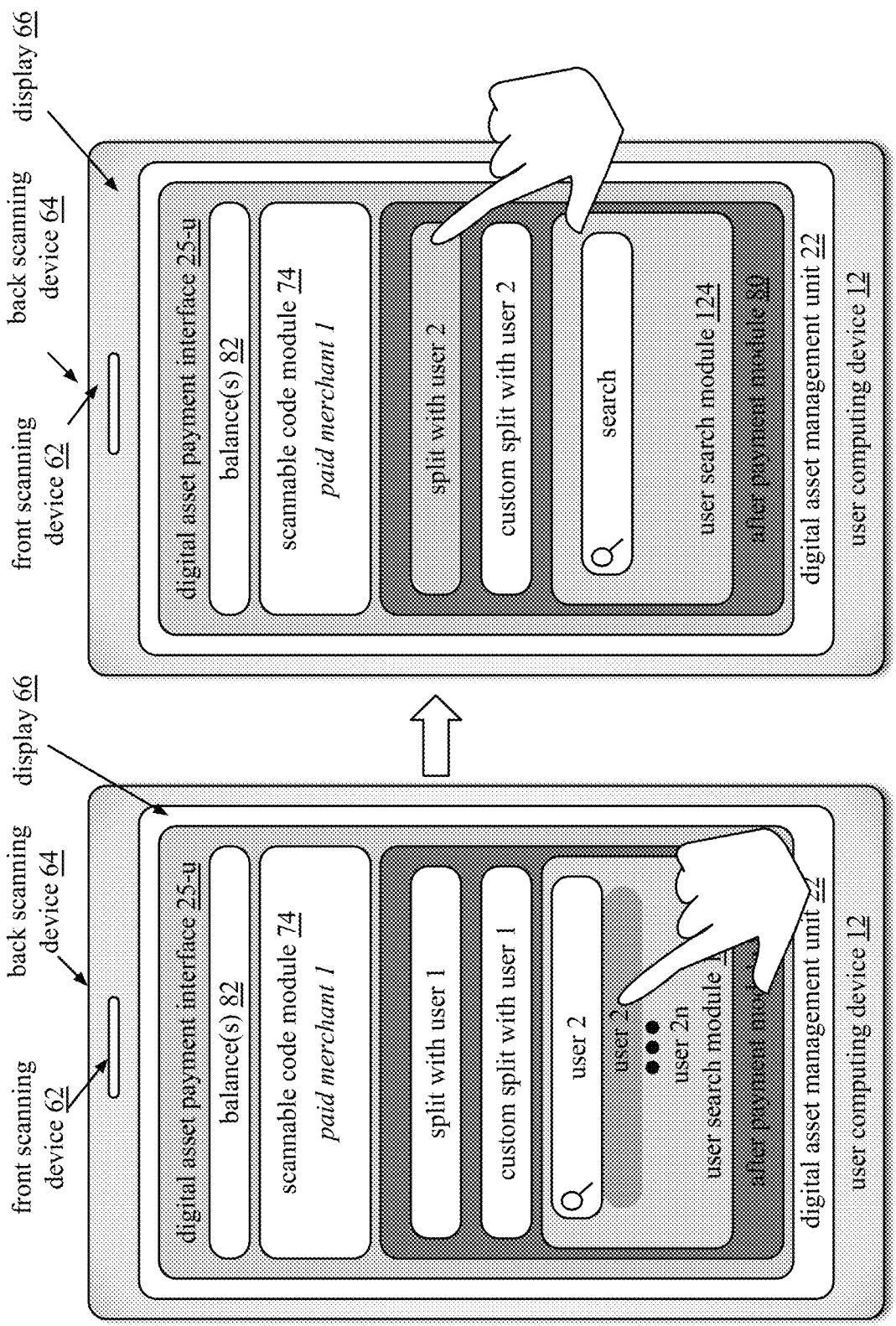
FIGS. 18A-18B are schematic block diagrams of another embodiment of a scan to pay payment mode with bill splitting options in accordance with the present disclosure.

FIGS. 18A-18B are schematic block diagrams of another embodiment of a scan to pay payment mode with bill splitting options. FIGS. 18A-18B continue the example of FIGS. 17A-17B where a user of the user computing device 12 has selected a bill split option within the after-payment module 80.

In FIG. 18A, a user 1 has been identified and listed as an option to split the bill with (e.g., the user 1 is associated with the digital asset payment network and is located nearby, user 1 information is stored by the digital asset payment interface 25-u as a default and/or preferred party for bill splitting, the user 1 scanned the scannable charge code, the user 1 is associated with the digital asset payment network and shares a connection with the user computing device 12 (e.g., a Bluetooth connection, etc.), etc.). When the user 1 is identified, the after-payment module 80 displays bill split options with the user 1 such as "split with user 1" and "custom split with user 1."

However, in this example, the user of the user computing device 12 wishes to split the bill with a user 2 who is not listed (e.g., the user is not nearby, etc.). The user of the user computing device 12 searches for user 2 in the user search module 124 of the after-payment module 80 and selects the correct user 2 from the list displayed.

In FIG. 18B, when the user 2 is identified, the after-payment module 80 displays bill split options with the user 2 such as "split with user 2" and "custom split with user 2." In this example, the user of the user computing device 12 selects the "split with user 2" option which splits the payment equally between the user 2 and the user computing device 12. For example, a request is sent to user 2 requesting a payment amount and the user 2 accepts. In an example where the user 2 declines, the user computing device 12 receives an error message and the bill split fails. If the custom split option was selected, the user computing device 12 could enter in a specific amount to pay. Other bill split options are possible. For example, an itemized list of items (e.g., menu items) purchased may be listed where the users can select individual items to pay for. The bill split options may also include options to add and split a tip.

FIGS. 19A-19D are schematic block diagrams of another embodiment of a scan to pay payment mode with payment adjust options. FIGS. 19A-19D depicts a user interface perspective of the user computing device 12 after a scannable charge code has been scanned in a scan to pay payment mode. The user computing device 12 includes the digital asset management unit 22, a display 66, a front scanning device 62, and a back scanning device 64. The digital asset management unit 22 includes a digital asset payment interface 25-u that interfaces with the digital asset payment computing entity.

Figure 19B:
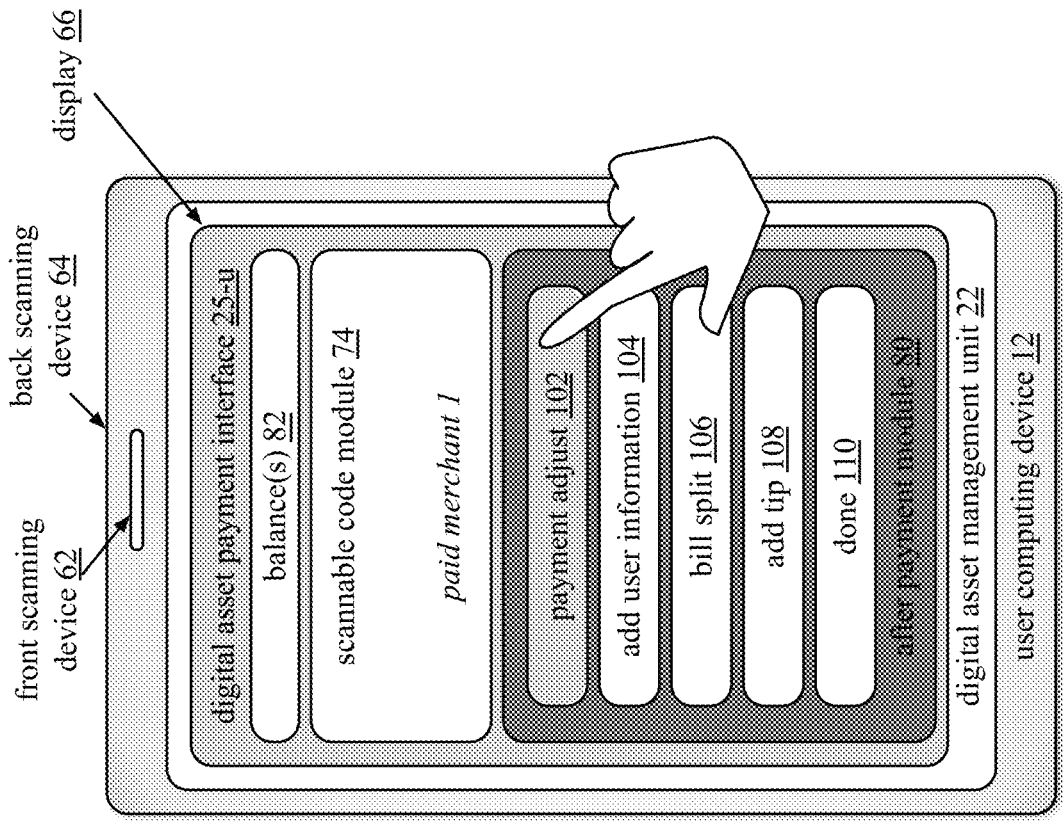
FIGS. 19A-19D are schematic block diagrams of another embodiment of a scan to pay payment mode with payment adjust options in accordance with the present disclosure.
Figure 19A:
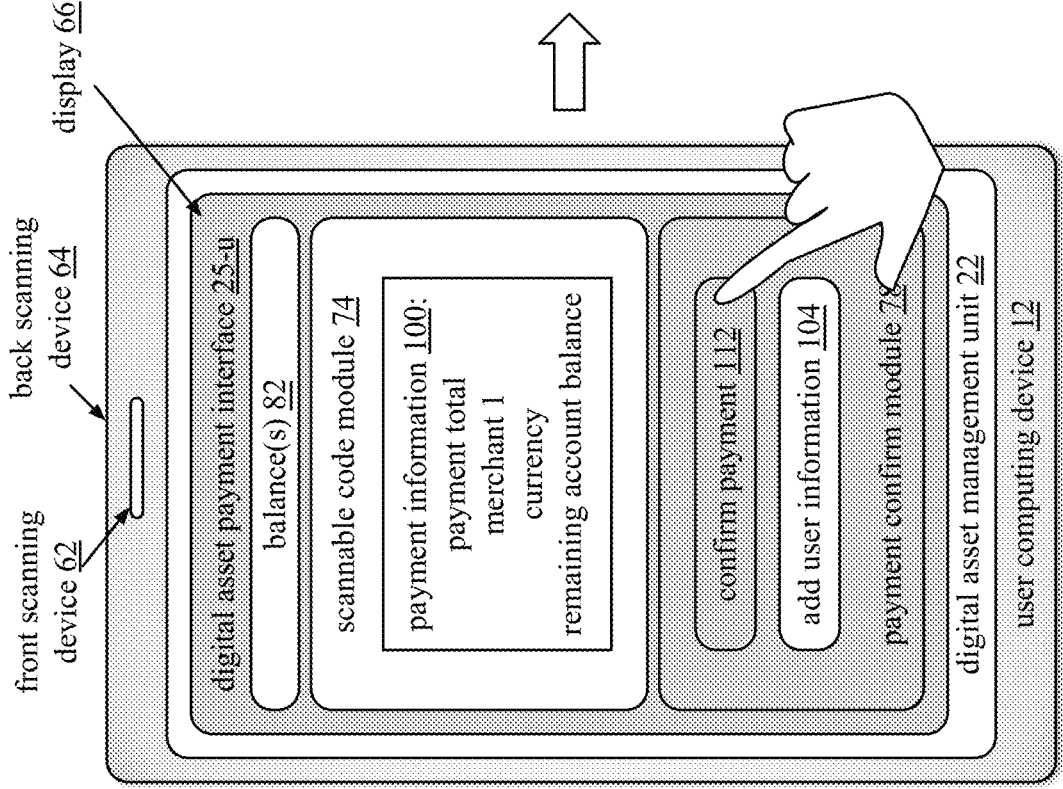

In FIG. 19A, the digital asset payment interface 25-u includes balances 82 and the scannable code module 74 as discussed with reference to FIGS. 6A-6B and also includes a payment confirm module 78. In this example, a scannable charge code has been scanned and interpreted. The scannable code module 74 may show a summary of the payment information 100 interpreted from the scannable charge code. For example, the payment information 100 includes the payment total, the merchant paid (e.g., merchant 1), the digital asset used, and a remaining account balance of the digital asset used. The payment information 100 may also include one or more requests (e.g., one or more fields for user data input) for user information (e.g., customer loyalty information, shipping details, coupons, etc.).

The payment confirm module 78 in the user interface perspective is visible after a scannable charge code is scanned and presents payment confirm options. For example, the payment confirm module 78 includes a confirm payment 112 option and an add user information 104 option, however, more or less options are possible. When the scannable charge code includes a request for user information, a field for user data input may be provided in the payment confirm module 78 or the scannable code module 74 as mentioned above.

In this example, a user of the user computing device 12 selects the confirm payment 112 option. In an alternative example, when no additional user information is requested and/or according to a default payment setting, scanning the scannable charge code completes the purchase with no need to confirm the payment.

In FIG. 19B, after the payment is confirmed (automatically or by user input), the digital asset payment interface 25-*u* may display an after-payment module 80. Alternatively, when no after-payment options are available or according to a default payment setting, no after-payment module is displayed, and the payment is complete. The digital asset payment interface 25-*u* may also display a message that the merchant involved was paid successfully (e.g., as shown here within the scannable code module 74).

The after-payment module 80 includes a payment adjust 102 option, an add user information 104 option, a bill split 106 option, an add tip 108 option, and a done 110 option. In this example, the user of the user computing device 12 selects the payment adjust 102 option of the after-payment module 80. The scannable charge code implies authorization of payment to the merchant computing entity, but funds are not necessarily pulled from the user computing device 12 for 5-10 seconds. As such, the user computing device 12 has a few seconds to conduct payment adjust options (e.g., switch between digital asset management units or switch the type of digital asset used) and still achieve a successful real-time payment. As another example, the payment adjust options may be specifically listed in the after-payment module 80 (e.g., switch to different digital asset, etc.).

Figure 19D:
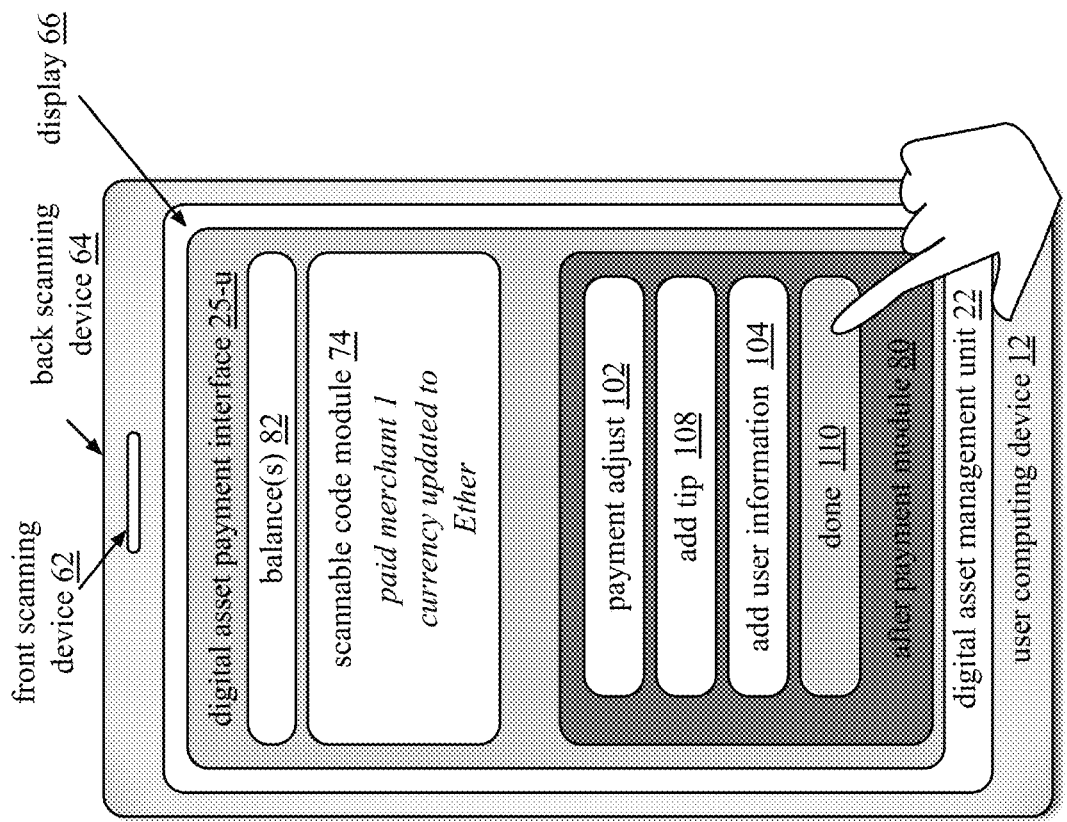
Figure 19C:
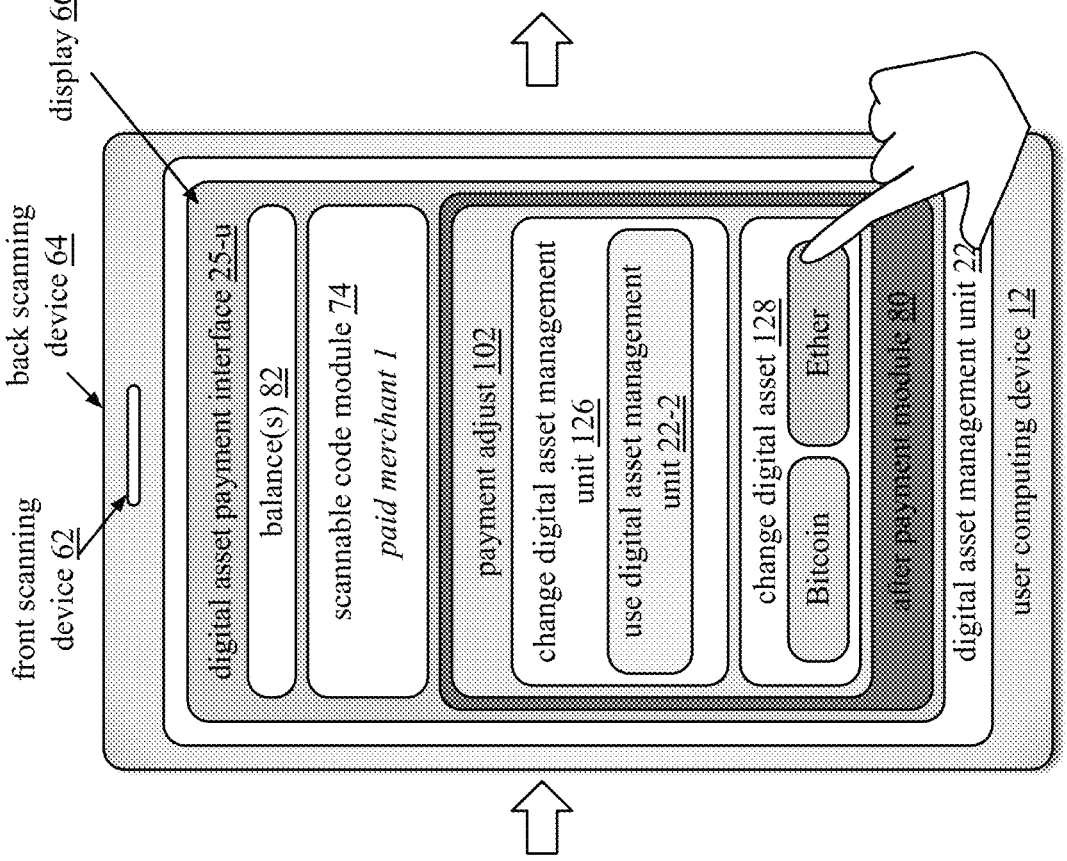

In FIG. 19C, the after-payment module 80 displays payment adjust 102 options such as change digital asset management unit 126 and change digital asset 128. The change digital asset management unit 126 option lists an alternative digital asset management unit 22-2 available for use on the user computing device 12. The user of the user computing device 12 may wish to switch to a different digital asset management unit based on balance information (e.g., the other digital asset management unit is better funded), discount information (e.g., the merchant offers a discount if a particular digital asset management unit is used), a particular desired digital asset is available in the other digital asset management unit, etc.

The change digital asset 128 option lists other digital asset options to complete the payment. In this example, Bitcoin and Ether are listed. The user of the user computing device 12 may wish to switch to a different digital asset based on balance information, discount information (e.g., the merchant offers a discount if a particular digital asset is used), a rate quote, etc. In this example, the user of the user computing device 12 selects to change the digital asset used to Ether.

In FIG. 19D, the digital asset is changed to Ether before funds are pulled from the user computing device 12. The user computing device 12 displays a message that the merchant 1 was paid and that the payment was changed to Ether (e.g., as shown here within the scannable code module 74).

The after-payment module 80 may display further options such as the payment adjust 102, add tip 108, add user information 104, and the done 110 option as shown here. In this example, the user of the user computing device 12 selects the done 110 option to complete the payment with the digital asset change.

Figure 20:
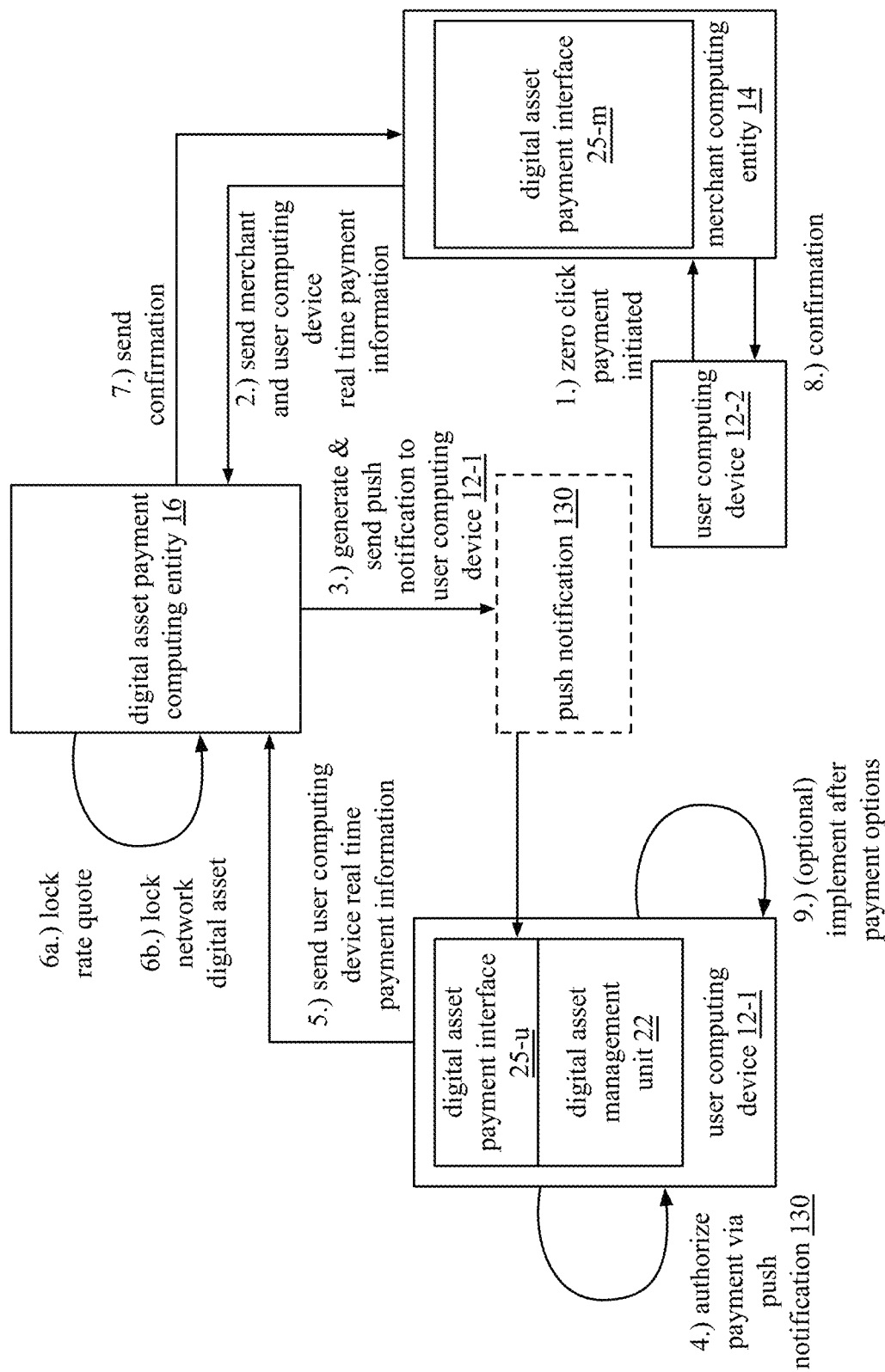
FIG. 20 is a flowchart of an example of a method for a zero click payment mode of a digital asset payment network in accordance with the present disclosure.

FIG. 20 is a flowchart of an example of a method for a zero click payment mode of the digital asset payment network. This method is referred to as a "zero click" payment mode because a user can authorize a payment through a merchant e-commerce website that is accessed on a device (e.g., a desktop or laptop) without clicking having to "click" a button/icon on that device (e.g., the payment is authorized using a digital asset payment interface enabled user device such as the user's smartphone).

FIG. 20 includes user computing devices 12-1 and 12-2, the merchant computing entity 14, and the digital asset payment computing entity 16 of a digital asset payment network. The user computing device 12-1 includes a digital asset management unit 22 that includes a digital asset payment interface 25-*u* that interfaces with the digital asset payment computing entity 16 and is coupled to one or more scanning devices. The user computing device 12-2 is associated with the user of the user computing device 12-1 and may or may or may not include a digital asset management unit with a digital asset payment interface. For example, the user computing device 12-1 is a user's smart phone and the user computing device 12-2 is the user's laptop or tablet.

The merchant computing entity 14 includes a digital asset payment interface 25-*m* that interfaces with the digital asset payment computing entity 16. In this example, the merchant computing entity 14 may be a merchant e-commerce website or a merchant mobile app. For example, the merchant computing entity 14 is a merchant e-commerce website and the user computing device 12-2 is operable to connect to the merchant e-commerce web site via an internet browser application and a network connection.

For the zero click payment mode, the method begins with step 1 where a digital asset-based payment is initiated by the user computing device 12-2 via the merchant computing entity 14 (e.g., an e-commerce website or app). For example, the user computing device 12 selects a digital asset-based payment option during checkout on an e-commerce website. To initiate the zero click payment mode, the user computing device 12-2 provides a user ID that associates the digital asset-based payment with the user computing device 12-1.

The method continues with step 2 where, when the digital asset-based payment is initiated with the user computing device 12, the merchant computing entity 14 sends merchant computing entity real-time payment information and at least some user computing device real-time payment information (e.g., the user ID) to the digital asset payment computing entity 16. The merchant computing entity real-time payment information includes a merchant identifier (ID) and a type of desired digital asset (e.g., a fiat currency, a different cryptocurrency, etc.) it wishes to receive in the real-time payment from the user computing device 12. The merchant computing entity real-time payment information also includes the amount of the real-time payment in this example. The merchant computing entity real-time payment information may include other information and/or metadata such as discounts offered and/or applied, shipping details (rates, method, etc.), bill splitting options, a request for user computing device information, etc.

The method continues with step 3 where the digital asset payment computing entity 16 generates and sends a push notification 130 to the user computing device 12-1 via the digital asset payment interface 25-*u*. For example, the digital asset payment computing entity 16 looks up a user account associated with the user ID provided in the user real-time payment information and sends the push notification 130 to the user computing device 12-1 associated with that user ID via the digital asset payment interface 25-*u*. A push notification is a message that automatically displays on a mobile device. The digital asset payment interface 25-*u* can send a push notification at any time such that the user of the user computing device 12 does not have to be in the digital asset management unit 22 or using user computing device 12 to receive them.

The push notification 130 includes a transaction and/or terminal identifier (ID) of the merchant computing entity 14, merchant information (e.g., a merchant ID, merchant name, etc.) the amount of the payment, the digital asset requested, and other metadata that may or may not be displayed to the user of the user computing device 12 (e.g., the user can select "show details" to view this information). For example, push notification 130 metadata includes a request for customer loyalty information, for shipping details (method, customer address), a discount applied (e.g., according to certain conditions such as when a certain digital asset is used), etc.

The method continues with step 4 where the user computing device 12-1 authorizes the real-time payment via the push notification 130. For example, the user computing device 12-1 selects a "yes" or "no" to the push notification 130 asking to confirm the purchase. Authorization via the user computing device 12-1's digital asset payment interface 25-*u* provides a security element (e.g., the user of the user computing device 12-1 unlocks the device (e.g., via a face ID) to interact with the push notification) and convenience to a payment initiated on the user computing device 12-2.

The method continues with step 5 where, when the real-time payment is authorized by the user computing device 12-1, the user computing device 12-1 sends user computing device real-time payment information to the digital asset payment computing entity 16. The user computing device real-time payment information includes additional user computing device information such as a type of digital asset to use in a real-time payment to the merchant computing entity 14, personal preferences, loyalty information, default shipping settings, etc. The user computing device real-time payment information may be default settings set by the user computing device 12-1, accessible through applications on the user computing device 12-1 (e.g., addresses), and/or selected and/or entered in by user input.

The method continues with steps 6a and 6b which may occur concurrently or in a different order (e.g., step 6b occurs slightly before step 6a). In step 6a, the digital asset payment computing entity 16 locks the rate quote for the digital asset selected by the user computing device 12-1 such that the rate quote presented to the user computing device 12-1 (via the digital asset balance in US dollars or other digital asset) is what is used for the real-time payment even if the rate fluctuates during that time.

The method continues with step 6b where the digital asset payment computing entity 16 locks an amount of network digital asset (e.g., that was deposited by the digital asset management company associated with the digital asset management unit 22) as collateral for the digital asset payment. The amount of network digital asset locked may be based on the user computing device 12-1 (e.g., how much the user computing device typically spends, how much digital asset the user computing device has in the digital asset management unit, etc.) and/or the merchant computing 14 (e.g., what type of products the merchant sells, an average price point of items the merchant sells, a default collateral amount the merchant requires, etc.). In this example, the amount of the payment is known, therefore the amount of the network digital asset locked is most likely based on the amount of the payment.

When the digital asset payment computing entity 16 receives both the user computing device real-time payment information and the merchant computing entity real-time payment information and the network digital asset has been locked for the payment, the method continues with step 7 where the digital asset payment computing entity 16 provides a confirmation to the merchant computing entity 14 that the real-time payment is approved.

The push notification acceptance implies authorization of payment to the merchant computing entity 14 but funds are not necessarily pulled from the user computing device 12-1 for 5-10 seconds. As such, the method continues with an optional step 9 where the user computing device 12-1 has a few seconds implement after payment options (e.g., switch between digital asset management units, switch the type of digital asset used, etc.). The method continues with steps similar to steps 36-44 of FIG. 2 and 38-44 of FIG. 2A.

Figure 21:
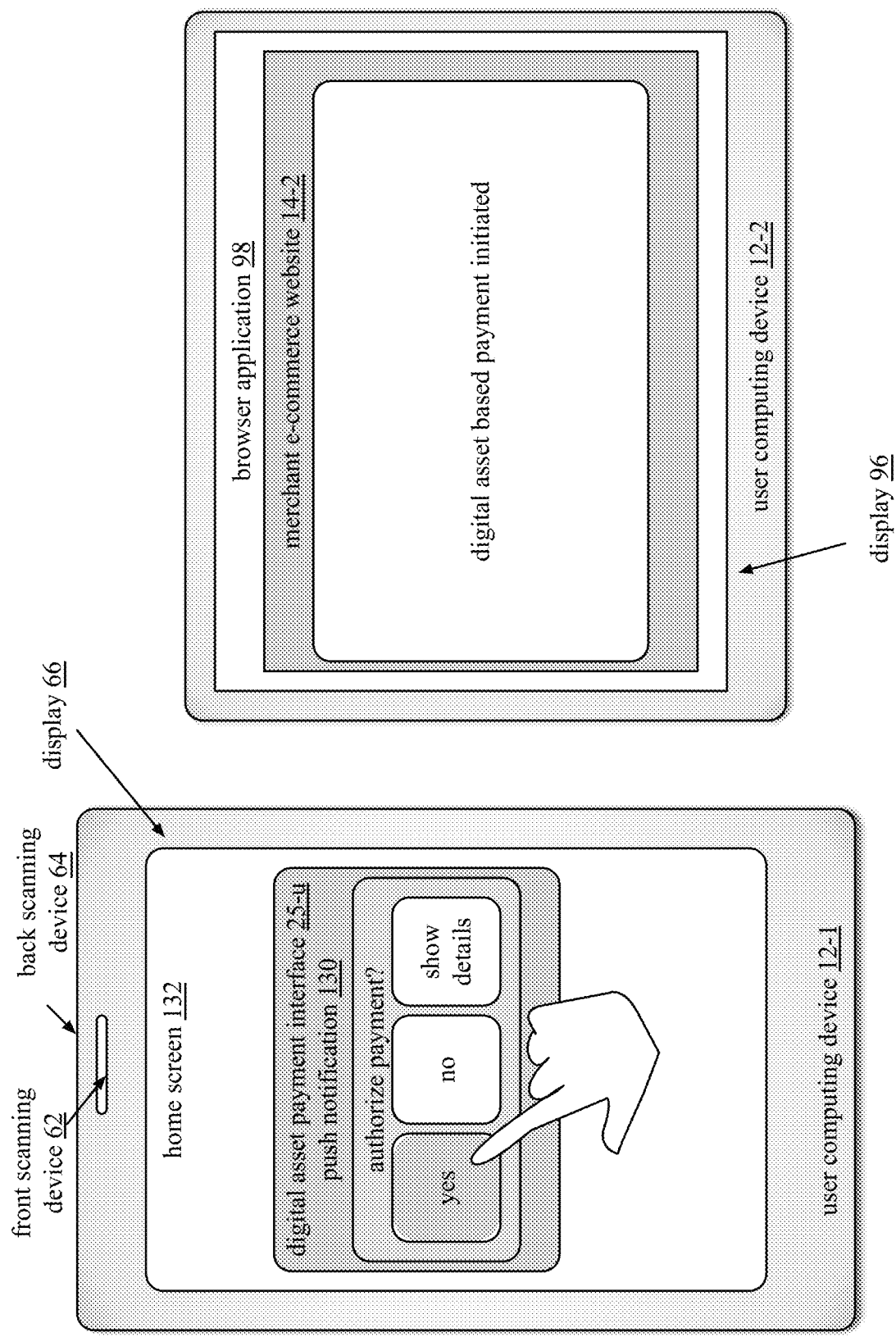
FIG. 21 is a schematic block diagram of an embodiment of a zero click payment mode of a digital asset payment network in accordance with the present disclosure.

FIG. 21 is a schematic block diagram of an embodiment of a zero click payment mode of the digital asset payment network. FIG. 21 depicts a user interface perspective of user computing devices 12-1 and 12-2 and a merchant computing entity (merchant e-commerce website 14-2) using the zero click payment mode as described with reference to FIG. 20. The user computing device 12-1 includes the digital asset management unit 22, a display 66, a front scanning device 62, and a back scanning device 64. The digital asset management unit 22 includes a digital asset payment interface 25-*u* that interfaces with the digital asset payment computing entity.

In this example, the digital asset management unit 22 of the user computing device 12-1 is not open and a home screen 132 (locked or unlocked) of the user computing device 12-1 is shown. In this example, the merchant computing entity is a merchant e-commerce website 14-2 that includes a digital asset payment interface 25-*m* that interfaces with the digital asset payment computing entity.

The user computing device 12-2 is associated with the same user of the user computing device 12-1 and may be a laptop computer, a desktop computer, a smart phone, a tablet, etc. The user computing device 12-2 includes a display 96 and an internet browser application 98 operable to access the merchant e-commerce web site 14-2 with a network connection. Initiating a digital asset-based payment on the merchant e-commerce website 14-2 establishes a connection to the digital asset payment computing entity via the digital asset payment interface 25-*m* such that merchant and user real time payment information is sent to the digital asset payment computing entity. The digital asset payment computing entity generates and sends a digital asset payment interface push notification 130 based on the merchant and user real time payment information.

The digital asset payment computing entity sends the push notification 130 to the user computing device 12-2 and the user computing device 12-1 receives the digital asset payment interface push notification 130 as a pop-up notification on the locked or unlocked home screen 132 as shown. The digital asset payment interface push notification 130 may be displayed in a different location on the user computing device 12-1 or in a different manner than what is shown and may be in accordance with the user's push notification preferences (e.g., the digital asset payment interface push notification 130 pops up then minimizes such that the user has to swipe to bring it back on the display). In this example, the digital asset payment interface push notification 130 includes options to authorize the payment, decline the payment, or to show the payment details.

In another example, the digital asset payment interface push notification 130 may include a message such as "payment authorization for payment X is requested" and clicking on the message opens the digital asset payment interface of a preferred digital asset management unit to complete the authorization. Many other push notification format options are possible. In this example, the user of the user computing device 12-1 selects to authorize the payment within the digital asset payment interface push notification.

Figure 22:
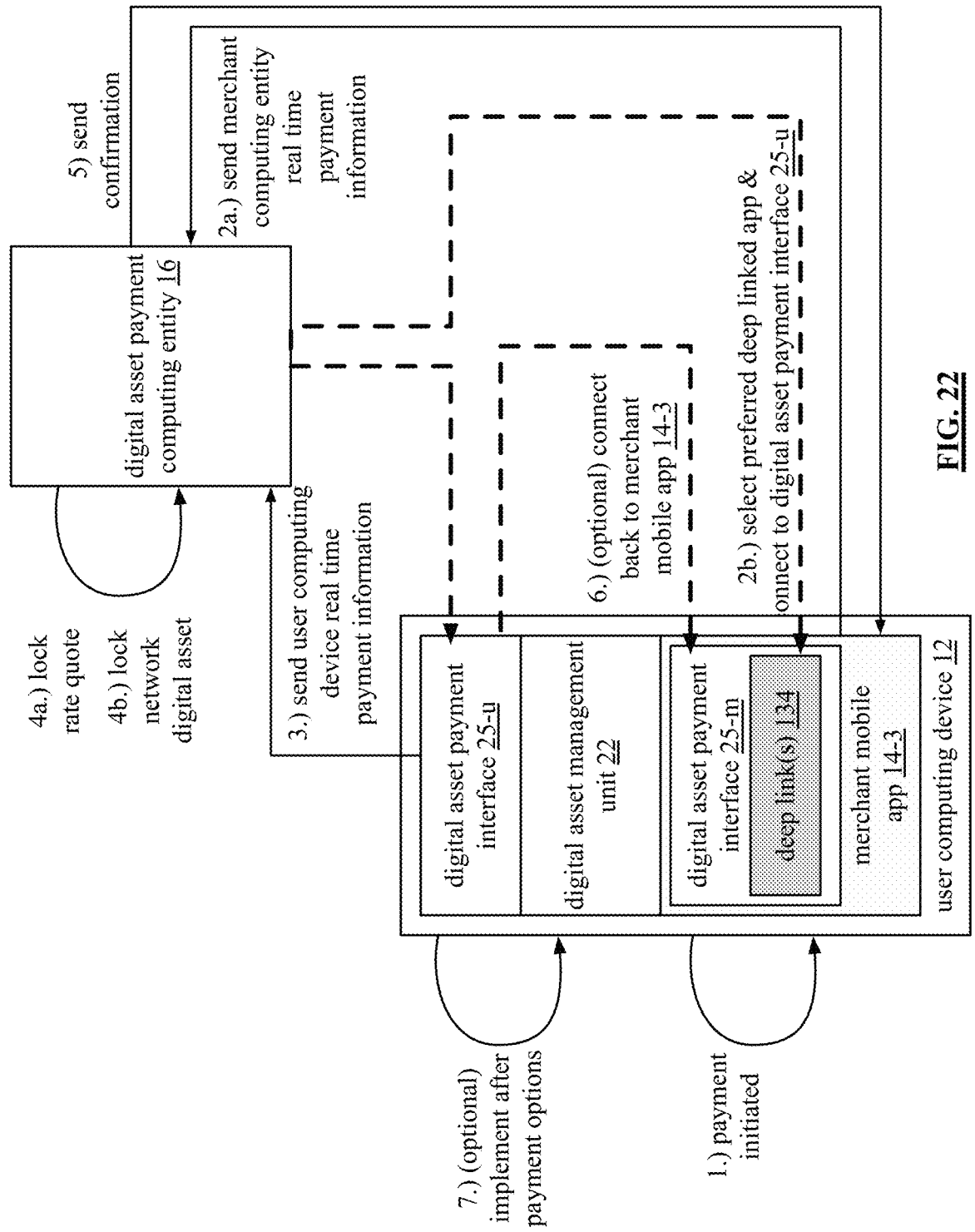
FIG. 22 is a flowchart of an example of a method for a deep link payment mode of a digital asset payment network in accordance with the present disclosure.

FIG. 22 is a flowchart of an example of a method for a deep link payment mode of the digital asset payment network that includes user computing devices 12, the merchant computing entity (merchant mobile app 14-3), and the digital asset payment computing entity 16. The user computing device 12 includes a digital asset management unit 22 that includes a digital asset payment interface 25-u that interfaces with the digital asset payment computing entity 16 and is coupled to one or more scanning devices. In this example, the user computing device 12 includes an installed merchant mobile app 14-3. In another embodiment, the merchant computing entity is a merchant e-commerce web site accessed on a browser application of the user computing device 12.

The merchant mobile app 14-3 includes a digital asset payment interface 25-m that interfaces with the digital asset payment computing entity 16. The digital asset payment interface 25-m includes one or more deep link(s) 134 that provide live connections between the digital asset payment interface 25-m and the digital asset payment computing entity 16 and a digital asset payment interface 25-u of a preferred digital asset management unit 22.

A link is a digital address that allows a user to connect from one digital location to another. For example, a hyperlink is an element in an electronic document that links to another place in the same document or to a different document. Typically, a user clicks on the hyperlink to follow the link. A Uniform Resource Identifier (URI) is a string of characters that identifies a particular resource. For example, a URL (Uniform Resource Locator) is a type of URI and is a link to a location of a resource on the internet. A resource can be a file (e.g., a Hypertext Markup Language (HTML) page), a database, an Application Programming Interface (API), etc. A typical URL specifies the protocol used to access the resource (e.g., Hyper Text Transfer Protocol (HTTP)), the name of the host computer on which it is located, and the path of the resource.

A deep link is a special type of URL that routes to a specific location on a website or in an app. Mobile deep linking is a technology that launches an app and opens a specific page once a user clicks a URL on a web page or in another app. A default deep link directs users to an app if it is already installed. Deferred deep links can direct users to an app store if the user does not have the app installed or to another desired location such as the app's website for more information.

For example, a deep link directs a user using an external app (e.g., the merchant mobile app 14-3) or mobile website (e.g., a merchant e-commerce website) directly to a specific in-app location (e.g., the digital asset payment interface 25-u) of a preferred digital asset management unit 22 and optionally back to the external app or mobile website after a desired action is complete (e.g., the payment authorization is completed). Deep links are achieved by specifying a custom URL scheme (e.g., Universal Link functionality in iOS applications), an intent URL (e.g., on Android devices), etc., that opens the in-app location if the app is installed or (optionally) directs the user to an app store to purchase the app.

For the deep link payment mode, the method begins with step 1 where a digital asset-based payment is initiated by the user computing device 12 within the merchant mobile app 14-3. For example, the user computing device 12 selects a digital asset-based payment option during checkout on the merchant mobile app 14-3.

The method continues with steps 2a and 2b which may occur concurrently or in a different order (e.g., step 2b occurs slightly before step 2a). In step 2a, when the user computing device 12 initiates the digital asset-based payment, the merchant computing entity 14 sends merchant computing entity real-time payment information to the digital asset payment computing entity 16. The merchant computing entity real-time payment information includes a merchant identifier (ID) and a type of desired digital asset (e.g., a fiat currency, a different cryptocurrency, etc.) it wishes to receive in the real-time payment from the user computing device 12. The merchant computing entity real-time payment information also includes the amount of the real-time payment in this example. The merchant computing entity real-time payment information may include other information and/or metadata such as discounts offered and/or applied, shipping details (rates, method, etc.), bill splitting options, a request for user computing device information, etc.

The method continues with step 2b where the user selects a preferred digital asset management unit 22 and connects to the digital asset payment interface 25-u of the digital asset management unit 22 through the deep link 134 on the merchant mobile app 14-3. For example, selecting the digital asset-based payment option connects to the digital asset payment computing entity 16 and presents the user with various digital asset management units that can be accessed via the deep link 134 connection.

Alternatively, the user of the user computing device 12 may establish a default digital asset management unit when using the merchant mobile app 14-3 and the digital asset payment interface 25-u of the default digital asset management unit automatically opens via the deep link 134 when a digital asset-based payment is initiated.

When the desired digital asset management unit is selected, the digital asset payment interface 25-u automatically opens. If the user of the user computing device 12 selects a desired digital asset management unit that is not installed on the user computing device 12, an error message is generated, or the user may be directed to an app store to download the desired digital asset management unit. In this example, the user of the user computing device 12 has selected the digital asset management unit 22 as the preferred digital asset management unit (or set it as a default).

The method continues with step 3 where, by accessing the digital asset payment interface 25-u, the user computing device 12 sends user computing device real-time payment information to the digital asset payment computing entity 16. The user computing device real-time payment information includes a user identifier (ID), a type of digital asset to use in a real-time payment to the merchant computing entity, personal preferences, loyalty information, default shipping settings, etc.

The method continues with steps 4a and 4b which may occur concurrently or in a different order (e.g., step 4b occurs slightly before step 4a). In step 4a, the digital asset payment computing entity 16 locks the rate quote for the digital asset selected by the user computing device 12 such that the rate quote presented to the user computing device 12 (via the digital asset balance in US dollars or other digital asset) is what is used for the real-time payment even if the rate fluctuates during that time.

The method continues with step 4b where the digital asset payment computing entity 16 locks an amount of network digital asset (e.g., that was deposited by the digital asset management company associated with the digital asset management unit 22) as collateral for the digital asset payment. The amount of network digital asset locked may be based on the user computing device 12 (e.g., how much the user computing device typically spends, how much digital asset the user computing device has in the digital asset management unit, etc.) and/or the merchant computing entity (e.g., what type of products the merchant sells, an average price point of items the merchant sells, a default collateral amount the merchant requires, etc.). In this example, the amount of the payment is known, therefore the amount of the network digital asset locked is based on that amount.

When the digital asset payment computing entity 16 receives both the user computing device real-time payment information and the merchant computing entity real-time payment information and the network digital asset has been locked for the payment, the method continues with step 5, where the digital asset payment computing entity 16 provides a confirmation to the merchant mobile app 14-3 that the real-time payment is approved The method continues with step 6 where the user computing device 12 is returned to the merchant mobile app 14-3 (e.g., automatically or by selection) via the deep link connection 134. The user computing device 12 may add in additional information on the merchant mobile app 14-3 such as shipping information, bill splitting, adding a tip, etc.

The payment confirmation via the deep link connection implies authorization of payment to the merchant computing entity but funds are not necessarily pulled from the user computing device 12 for 5-10 seconds. As such, the method continues with an optional step 8 where the user computing device 12 has a few seconds implement after payment options (e.g., switch between digital asset management units, switch the type of digital asset used, etc.). The method continues with steps similar to steps 36-44 of FIG. 2 and 38-44 of FIG. 2A.

Figure 23B:
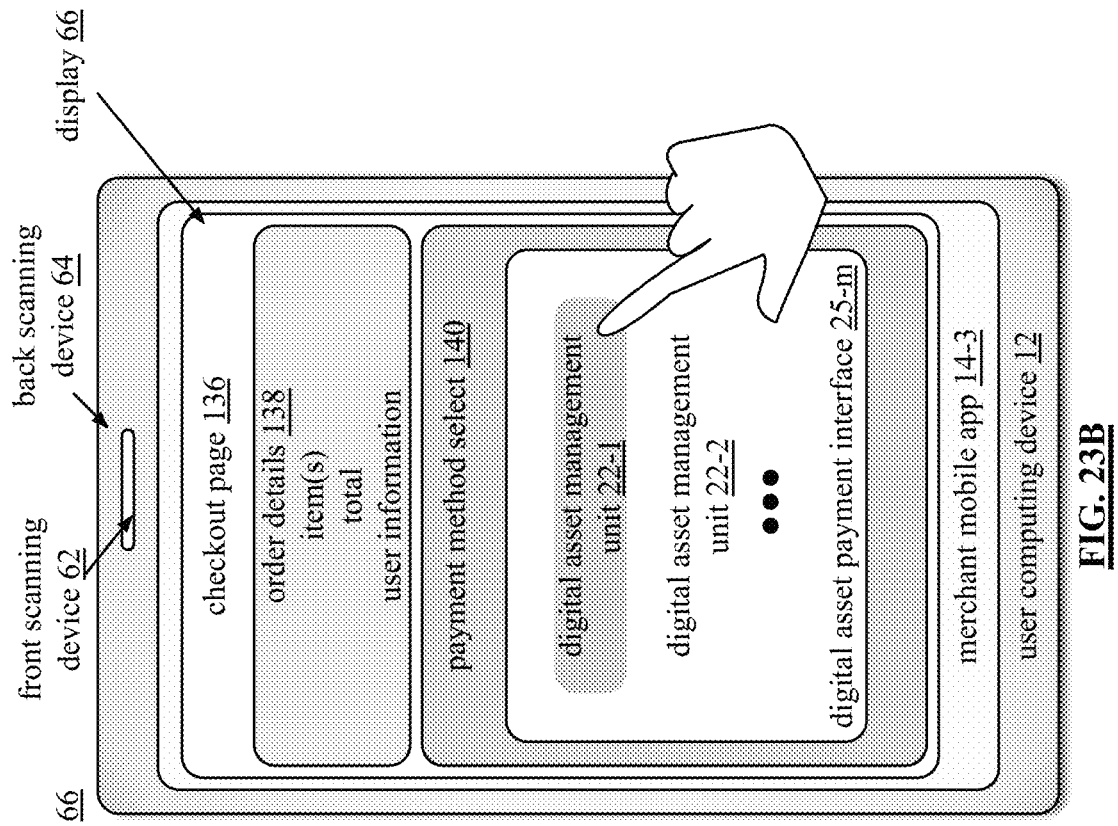
Figure 23A:
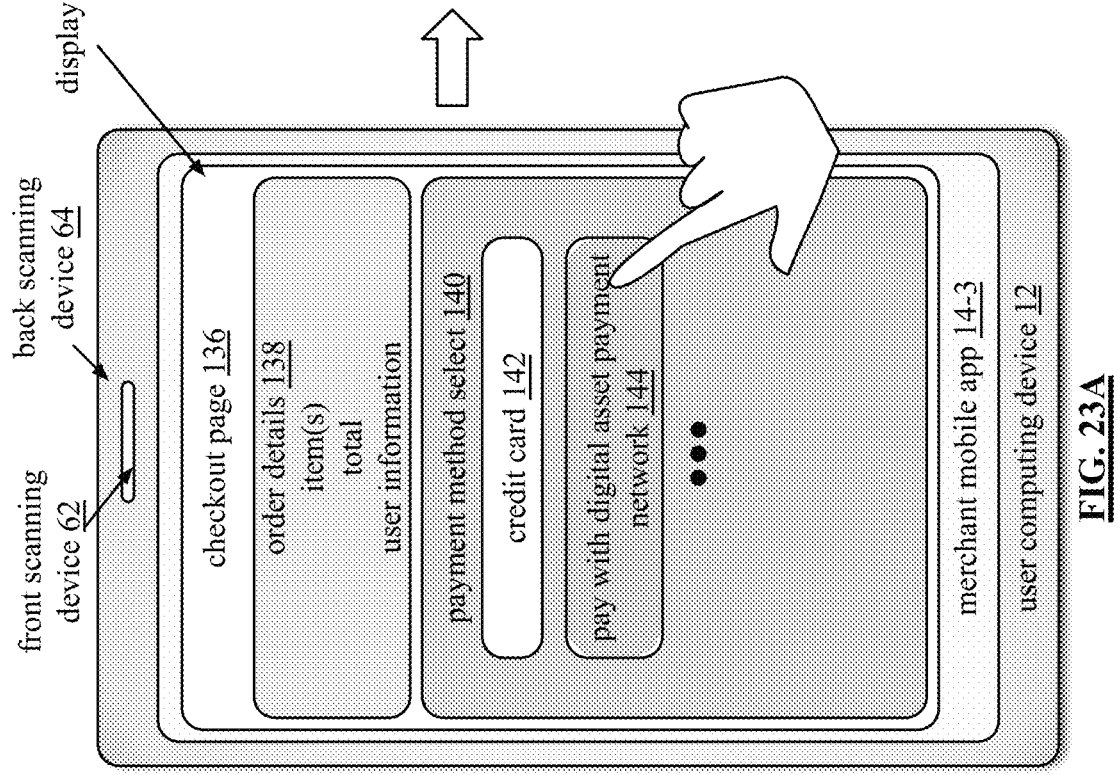

FIGS. 23A-23D are schematic block diagrams of an embodiment of a deep link payment mode of the digital asset payment network. In FIG. 23A, the user computing device 12 includes a display 66, a front scanning device 62, a back scanning device 64, and an installed merchant mobile app 14-3 that displays a checkout page 136 view from a user interface perspective. For example, the user of the user computing device 12 has selected items for purchase on the merchant mobile app 14-3, added the items to a shopping cart, and selected an option to checkout.

The checkout page 136 includes software operable to facilitate a payment from the user computing device to the merchant computing entity. From the user interface perspective, the checkout page 136 includes order details 138 and a payment method select 140 module but could include more or less features displayable to the user (e.g., shipping details, etc.).

In this example, the order details 138 include the item(s) to be purchased (e.g., a list, a list with a description, a list with links to the items, etc.), a total for the item(s) (e.g., a subtotal, total with tax included, total with tax and shipping and handling rates included, etc.), and user information (e.g., shipping address, customer loyalty information, customer account information, etc.).

The payment method select 140 module lists payment options available to complete the purchase. For example, the payment method select 140 module includes a credit card 142 option and an option to pay with the digital asset payment network 144. In this example, the user of the user computing device 12 selects the option to pay with the digital asset payment network 144.

In FIG. 23B, selecting the option to pay with the digital asset payment network 144 opens the digital asset payment interface 25-m of the merchant mobile app 14-3 that includes one or more deep link(s) 134 to digital asset management units associated with the digital asset payment computing entity. Alternatively, the user may see options for the digital asset management units in FIG. 23A without first selecting the option to pay with the digital asset payment network 144. Alternatively, the user computing device 12 has set a default digital asset management unit such that selecting the option to pay with the digital asset payment network 144 automatically opens to the default asset management unit via a deep link.

In this example, the user selects the digital asset management unit 22-1 from a list of digital asset management units.

In FIG. 23C, the user of the user computing device 12 is directed via deep link to the selected the digital asset management unit 22-1 where the digital asset payment interface 25-u of the digital asset management unit 22-1 opens. In the user interface perspective, the digital asset payment interface 25-u shows a link to return to the merchant mobile app and a payment confirm module 78.

The payment confirm module 78 includes digital asset options 146, a confirm payment 112 option, and an add user information 104 option however more or less options are possible. The digital asset options 146 in this example include Bitcoin and Ether. The current balance and rate quote in terms of US dollars (or other desired digital asset) for Bitcoin and Ether may also be visible in this view. Alternatively, a default digital asset is set in which case the balance and rate quote for the default digital asset may be displayed. The payment confirm module 78 may include one or more requests for user information (e.g., via one or more fields for user data input) depending on information received from the merchant mobile app (e.g., a request for customer loyalty information, shipping address, shipping rate selection, etc.).

In this example, a user of the user computing device 12 selects Bitcoin as the digital asset and then selects the confirm payment 112 option. An example of selecting add user information 104 is discussed with reference to FIGS. 15A-15D.

In FIG. 23D, after the payment is confirmed, the digital asset payment interface 25-u may display an after-payment module 80. Alternatively, when no after-payment options are available or according to a default payment setting, no after-payment module is displayed, and the payment is complete. In that example, the user may be directed back to the merchant mobile app 14-3 via deep link after the confirm payment 112 option is selected.

The after-payment module 80 includes a payment adjust 102 option, an add user information 104 option, a bill split 106 option, an add tip 108 option, and a done 110 option. The after-payment module 80 may include more or less options depending on the type of payment, the item(s) purchased, and the merchant involved. For example, when the merchant is a restaurant, the after-payment module 80 may present the bill split 106 option, the add tip 108 option, and the done 110 option. As another example, when the merchant is a retail store, the after-payment module 80 may present the add user information 104 option and the done 110 option. As another example, no after-payment options are shown, and the payment is complete.

In this example, the user of the user computing device 12 selects the done 110 option of the after-payment module 80 to complete the payment. The digital asset payment interface 25-u may display a message that the merchant involved was paid successfully (e.g., as shown here within the payment confirm module 78). An example of selecting payment adjust 102 is discussed with reference to FIGS. 19A-19D. An example of selecting bill split 106 is discussed with reference to FIGS. 17A-18B. An example of selecting add tip 108 is discussed with reference to FIGS. 16A-16D. In this example, the user of the user computing device 12 selects a link to return to the merchant mobile app 14-3. Alternatively, the user is directed back to the merchant mobile app 14-3 via deep link after the done 110 option is selected.

Figure 23E:
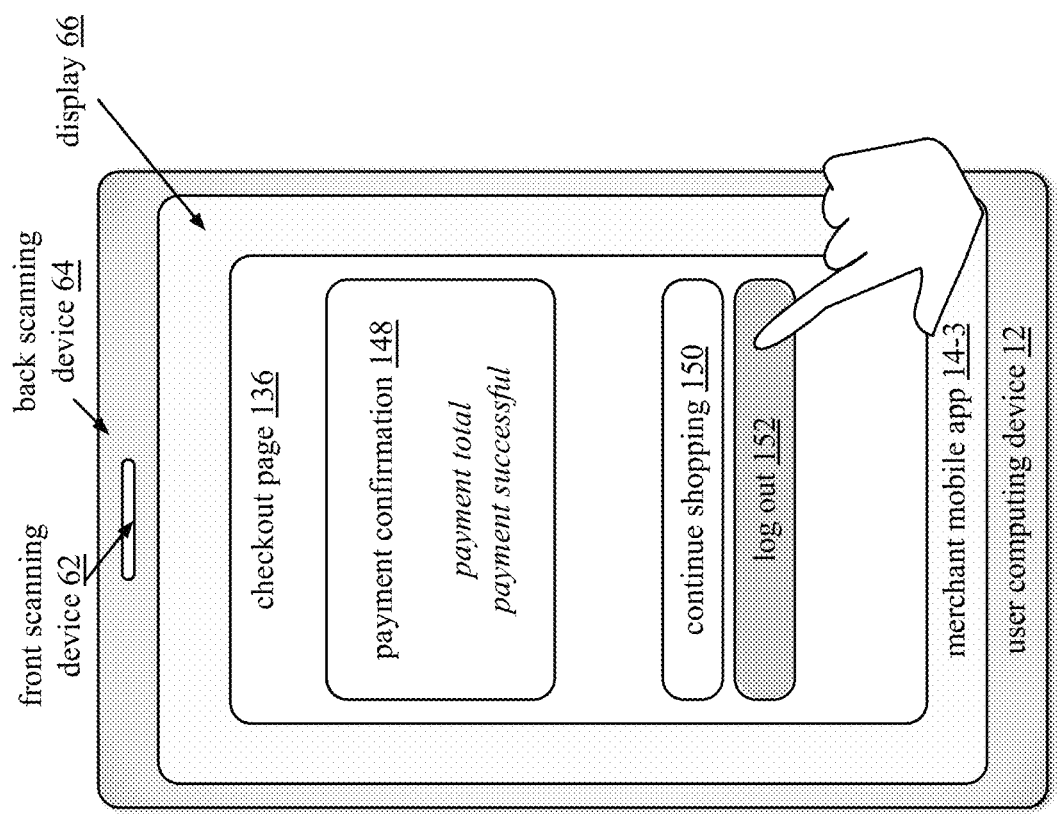

In FIG. 23E, the user of the user computing device 12 is directed to the checkout page 136 of the merchant mobile app 14-3 via deep link after selecting the link to return to the merchant mobile app 14-3 (or automatically after payment authorization) within the digital asset management unit 22-1. The checkout page 136 displays a payment confirmation 148 with a summary of the payment (e.g., a total, the payment was successful, etc.). If additional information is desired, one or more fields for data input and/or one or more links to fields for data input may be displayed. For example, the user of the user computing device may be prompted to open an account with the merchant mobile app 14-3 if one does not already exist, sign up for email promotions, send purchase details to a friend, post about the merchant on social media, leave a review, etc.

The checkout page 136 includes a continue shopping 150 option which directs the user of the user computing device 12 out of the checkout page and to a home page (or previously visited page) of the merchant mobile app 14-3 and a log out 152 option (e.g., if the user is logged into a customer account). In this example, the user of the user computing device 12 selects the log out 152 to log out of the user's customer account on the merchant mobile app 14-3.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   initiating, by a merchant computing entity of a digital asset payment network, a digital asset-based payment from a user computing device of the digital asset payment network to the merchant computing entity, wherein the user computing device pays with a digital asset, wherein the merchant computing entity accepts a desired asset, and wherein the digital asset-based payment includes a real-time digital asset-based payment process for providing the desired asset to the merchant computing entity;
   sending, by the merchant computing entity, merchant real-time payment information regarding the digital asset-based payment to a digital asset payment computing entity of the digital asset payment network;
   generating, by the digital asset payment computing entity, a scannable charge code representative of at least a portion of the merchant real-time payment information;
   sending, by the digital asset payment computing entity, the scannable charge code to the merchant computing entity;
   providing, by the merchant computing entity, the scannable charge code to the user computing device; and when the scannable charge code is scanned by the user computing device:
    sending, by the user computing device, user computing device real-time payment information regarding the digital asset-based payment to the digital asset payment computing entity;
    locking, by the digital asset payment computing entity, an amount of network digital assets as collateral for the digital asset provided by the user computing device;
    executing a nonreal-time digital asset-based payment process by implementing a verification process associated with the digital asset to verify the digital asset; and
    when the amount of digital asset from the user computing device is verified by the verification process:
        unlocking the amount of the network digital assets; and
    when the amount of digital asset from the user computing device is not verified by the verification process:
        consuming the amount of the network digital assets; and
    providing, by the digital asset payment computing entity, a confirmation to the merchant computing entity that the digital asset-based payment is approved.

2. The method of claim 1, wherein the real-time digital asset-based payment process includes:
    obtaining, by the digital asset payment computing entity, a payment amount of the digital asset from the user computing device;
    exchanging, by the digital asset payment computing entity, the payment amount of the digital asset for a substantially equivalent payment amount of the desired asset; and
    sending, by the digital asset payment computing entity, the substantially equivalent payment amount of the desired asset to the merchant computing entity.

3. The method of claim 1 further comprises:
    locking, by the digital asset payment computing entity, a rate quote for the digital asset during the digital asset-based payment.

4. The method of claim 1, wherein the user computing device real-time payment information includes:
    a user computing device identifier (ID) associated with the user computing device; and
    a type of digital asset of the digital asset.

5. The method of claim 1, wherein the merchant computing device real-time payment information includes:
    a merchant computing entity identifier (ID) associated with the merchant computing entity;
    a type of asset of the desired asset; and
    a payment amount of the digital asset-based payment.

6. The method of claim 5, wherein the merchant computing device real-time payment information further includes metadata representative of one or more of:
    a request for shipping information;
    a request for personal information;
    a request for customer loyalty information; and
    discount information.

7. The method of claim 1, wherein the providing the scannable charge code to the user computing device includes one or more of:
    displaying, by the merchant computing entity, the scannable charge code on a display of the merchant computing entity;
    printing, by the merchant computing entity, the scannable charge code on a printable material;
    displaying, by the merchant computing entity, the scannable charge code on a display of another user computing device associated with a user of the user computing device; and
    sending, by the merchant computing entity, the scannable charge code to the user computing device via an interface means.

8. The method of claim 1, wherein the merchant computing entity includes one or more of:
    a fixed point of sale (POS) computing device;
    a portable POS computing device; and
    an e-commerce platform.

9. The method of claim 1 further comprises:
    providing, by the merchant computing entity, the scannable charge code to a second user computing device of the digital asset payment network; and
    when the scannable charge code is scanned by the second user computing device:
        sending, by the second user computing device, second user computing device real-time payment information regarding the digital asset-based payment to the digital asset payment computing entity;
        locking, by the digital asset payment computing entity, a second amount of the network digital assets associated with the second user computing device, wherein the amount of the network digital assets is associated with the user computing device; and
        adjusting, by the digital asset payment computing entity, the amount of the network digital assets locked based on the second amount of the network digital assets.

10. The method of claim 1 further comprises:
    when the confirmation is provided to the merchant computing entity:
        initiating, by the user computing device, one or more after-payment options, wherein the after-payment options allow the user computing device to adjust details of the digital asset-based payment within a certain time period after the digital asset-based payment is approved.

11. A non-transitory computer readable memory comprises:
    a first memory element that stores operational instructions that, when executed by merchant computing entity of a digital asset payment network, causes the merchant computing entity to:
        initiate a digital asset-based payment from a user computing device of the digital asset payment network to the merchant computing entity, wherein the user computing device pays with a digital asset, wherein the merchant computing entity accepts a desired asset, and wherein the digital asset-based payment includes a real-time digital asset-based payment process for providing the desired asset to the merchant computing entity; and
        send merchant real-time payment information regarding the digital asset-based payment to a digital asset payment computing entity of the digital asset payment network;
    a second memory element that stores operational instructions that, when executed by the digital asset payment computing entity, causes the digital asset payment computing entity to:

generate a scannable charge code representative of at least a portion of the merchant real-time payment information; and
send the scannable charge code to the merchant computing entity; and
a fourth memory element that stores operational instructions that, when executed by the user computing device, causes the user computing device to:
when the scannable charge code is scanned by the user computing device:
send user computing device real-time payment information regarding the digital asset-based payment to the digital asset payment computing entity;
a fifth memory element that stores operational instructions that, when executed by the digital asset payment computing entity, causes the digital asset payment computing entity to:
lock an amount of network digital assets as collateral for the digital asset provided by the user computing device;
execute a nonreal-time digital asset-based payment process by implementing a verification process associated with the digital asset to verify the digital asset; and
when the amount of digital asset from the user computing device is verified by the verification process:
unlock the amount of the network digital assets; and
when the amount of digital asset from the user computing device is not verified by the verification process:
consume the amount of the network digital assets; and
provide a confirmation to the merchant computing entity that the digital asset-based payment is approved.

12. The non-transitory computer readable memory of claim 11, wherein the real-time digital asset-based payment process includes:
obtaining, by the digital asset payment computing entity, a payment amount of the digital asset from the user computing device;
exchanging, by the digital asset payment computing entity, the payment amount of the digital asset for a substantially equivalent payment amount of the desired asset; and
sending, by the digital asset payment computing entity, the substantially equivalent payment amount of the desired asset to the merchant computing entity.

13. The non-transitory computer readable memory of claim 11, wherein the fifth memory element further stores operational instructions that, when executed by the digital asset payment computing entity, causes the digital asset payment computing entity to:
lock a rate quote for the digital asset during the digital asset-based payment.

14. The non-transitory computer readable memory of claim 11, wherein the user computing device real-time payment information includes:
a user computing device identifier (ID) associated with the user computing device; and
a type of digital asset of the digital asset.

15. The non-transitory computer readable memory of claim 11, wherein the merchant computing device real-time payment information includes:

a merchant computing entity identifier (ID) associated with the merchant computing entity;
a type of asset of the desired asset; and
a payment amount of the digital asset-based payment.

16. The non-transitory computer readable memory of claim 15, wherein the merchant computing device real-time payment information further includes metadata representative of one or more of:
a request for shipping information;
a request for personal information;
a request for customer loyalty information; and
discount information.

17. The non-transitory computer readable memory of claim 11, wherein the fifth memory element further stores operational instructions that, when executed by the digital asset payment computing entity, causes the digital asset payment computing entity to provide the scannable charge code to the user computing device by one or more of:
displaying the scannable charge code on a display of the merchant computing entity;
printing the scannable charge code on a printable material;
displaying the scannable charge code on a display of another user computing device associated with a user of the user computing device; and
sending the scannable charge code to the user computing device via an interface means.

18. The non-transitory computer readable memory of claim 11, wherein the merchant computing entity includes one or more of:
a fixed point of sale (POS) computing device;
a portable POS computing device; and
an e-commerce platform.

19. The non-transitory computer readable memory of claim 11 further comprises:
the fifth memory element further stores operational instructions that, when executed by the digital asset payment computing entity, causes the digital asset payment computing entity to:
provide the scannable charge code to a second user computing device of the digital asset payment network; and
a sixth memory element that stores operational instructions that, when executed by the second user computing device, causes the second user computing device to:
when the scannable charge code is scanned by the second user computing device:
send second user computing device real-time payment information regarding the digital asset-based payment to the digital asset payment computing entity; and
a seventh memory element that stores operational instructions that, when executed by the digital asset payment computing entity, causes the digital asset payment computing entity to:
lock a second amount of the network digital assets associated with the second user computing device, wherein the amount of the network digital assets is associated with the user computing device; and
adjust the amount of the network digital assets locked based on the second amount of the network digital assets.

20. The non-transitory computer readable memory of claim 11 further comprises:

a sixth memory element that stores operational instructions that, when executed by the user computing device, causes the user computing device to:
  when the confirmation is provided to the merchant computing entity:
initiate one or more after-payment options, wherein the after-payment options allow the user computing device to adjust details of the digital asset-based payment within a certain time period after the digital asset-based payment is approved.

* * * * *